US007920902B2

(12) United States Patent
Carroll

(10) Patent No.: US 7,920,902 B2
(45) Date of Patent: Apr. 5, 2011

(54) MOBILE PERSONAL AUDIO DEVICE

(76) Inventor: David W. Carroll, Grantsburg, WI (US)

( * ) Notice: Subject to any disclaimer, the term of this patent is extended or adjusted under 35 U.S.C. 154(b) by 539 days.

(21) Appl. No.: 12/098,247

(22) Filed: Apr. 4, 2008

(65) Prior Publication Data

US 2009/0318198 A1 Dec. 24, 2009

Related U.S. Application Data

(60) Provisional application No. 60/910,197, filed on Apr. 4, 2007, provisional application No. 60/987,278, filed on Nov. 12, 2007, provisional application No. 61/019,471, filed on Jan. 7, 2008.

(51) Int. Cl.
*H04M 1/00* (2006.01)
*H04R 1/10* (2006.01)
*G10L 15/00* (2006.01)

(52) U.S. Cl. ............... 455/569.1; 455/575.1; 455/575.2; 381/74; 704/270

(58) Field of Classification Search ............... 455/569.1, 455/575.1; 361/679.1; 381/71.2, 334
See application file for complete search history.

(56) References Cited

U.S. PATENT DOCUMENTS

2007/0147628 A1* 6/2007 Benway .................. 381/71.2
2007/0160245 A1* 7/2007 Peng ....................... 381/334
* cited by examiner

*Primary Examiner* — Kent Chang
*Assistant Examiner* — Kashif Siddiqui
(74) *Attorney, Agent, or Firm* — Dicke, Billig & Czaja, PLLC

(57) ABSTRACT

A mobile personal audio device including a case maintaining a power source, first and second speakers, a microcontroller, and first and second stem assemblies. The stem assemblies extend from opposite sides of the case, respectively, and each include a tube having a first end adjacent and open to a corresponding one of the speakers and terminating at a second end. The stem assemblies are configured such that the tube is positionable in a user-selected extended state in which the second end of the tube is displaced from the case, and a collapsed state in which the second end is in close proximity to the case. In the extended state, the case is locatable at the back of the user's neck, with the tubes extending along opposite sides of the user's head. The microcontroller operates the speakers to generate audio sounds waves that are delivered to the user's ears.

32 Claims, 45 Drawing Sheets

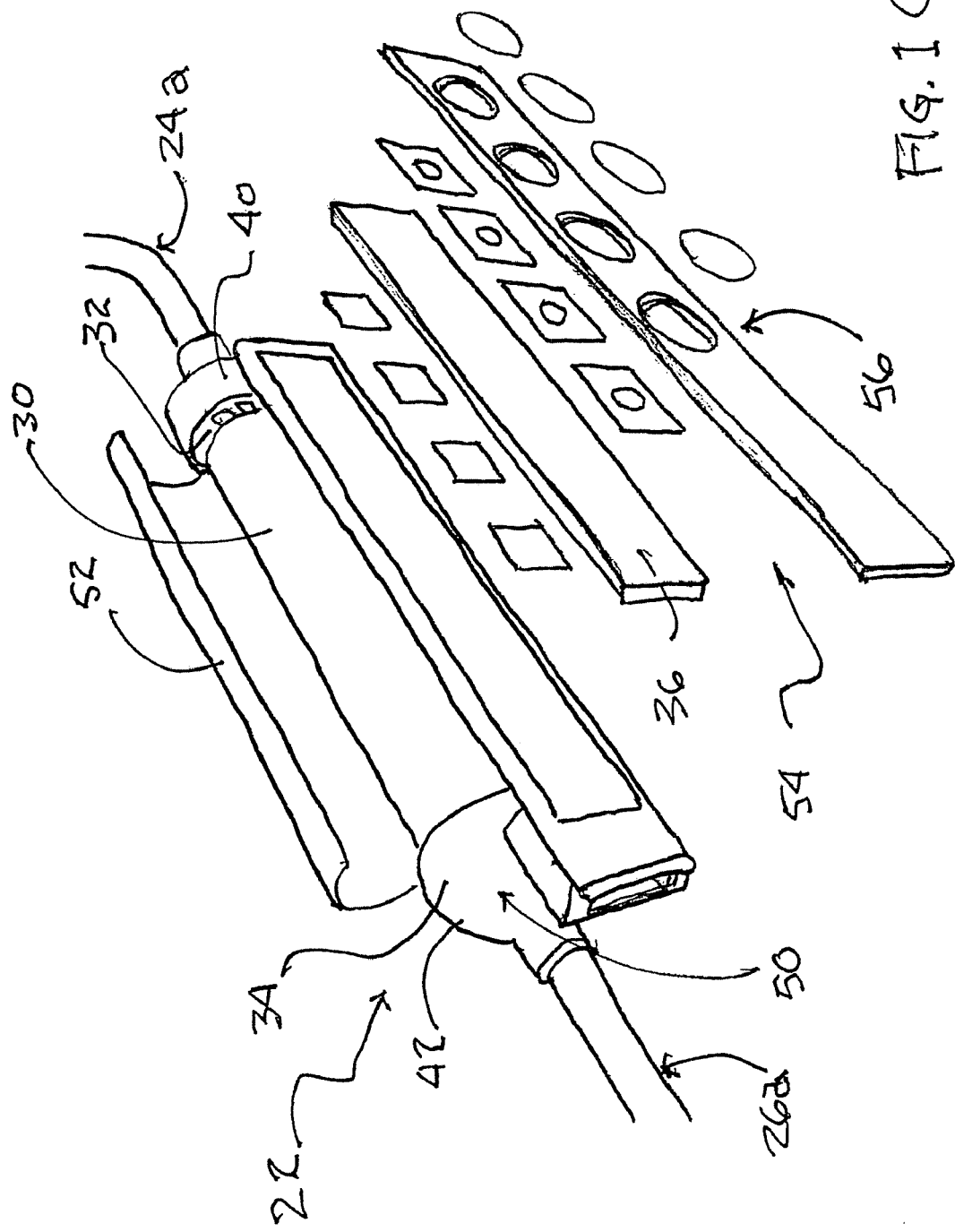

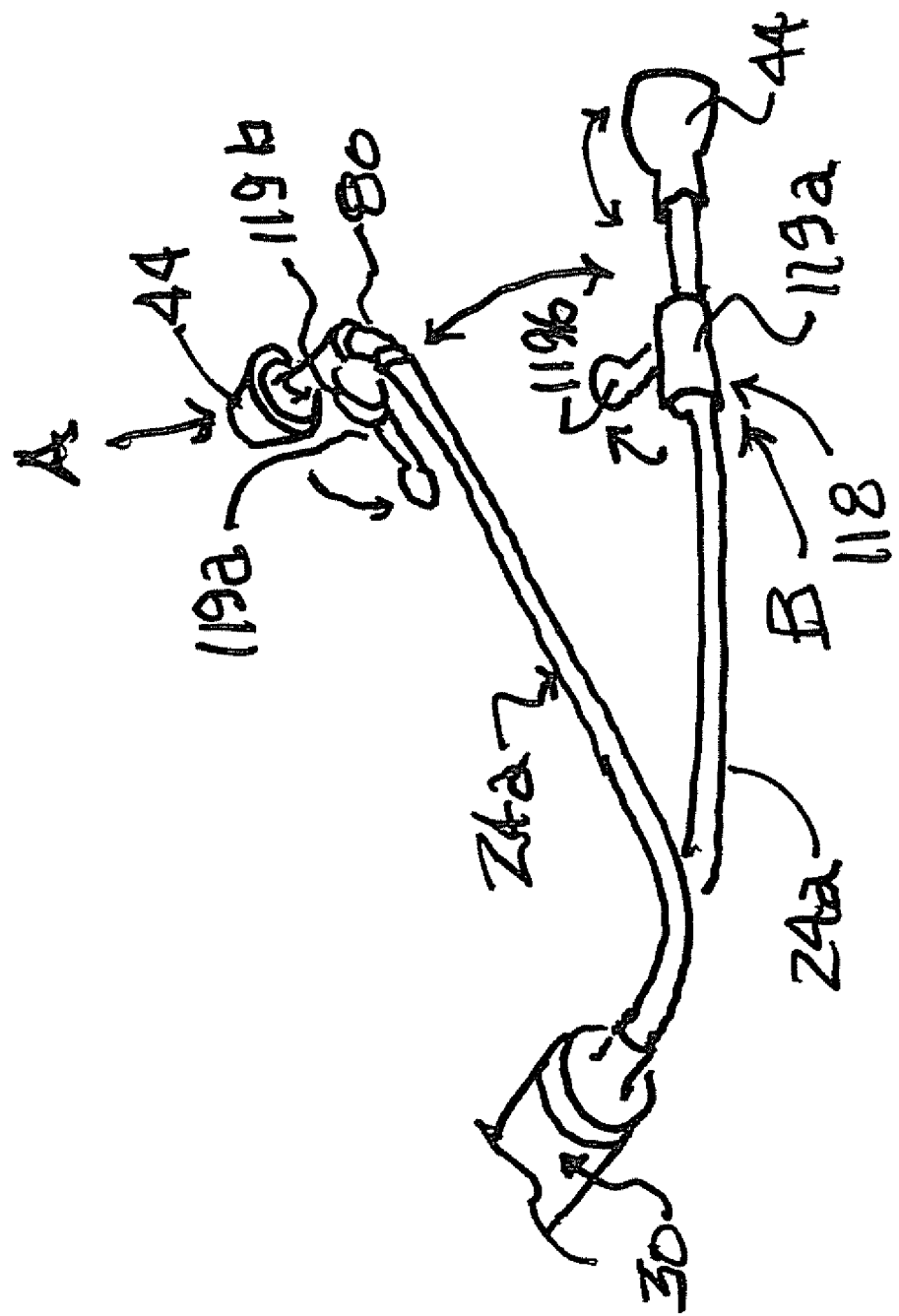

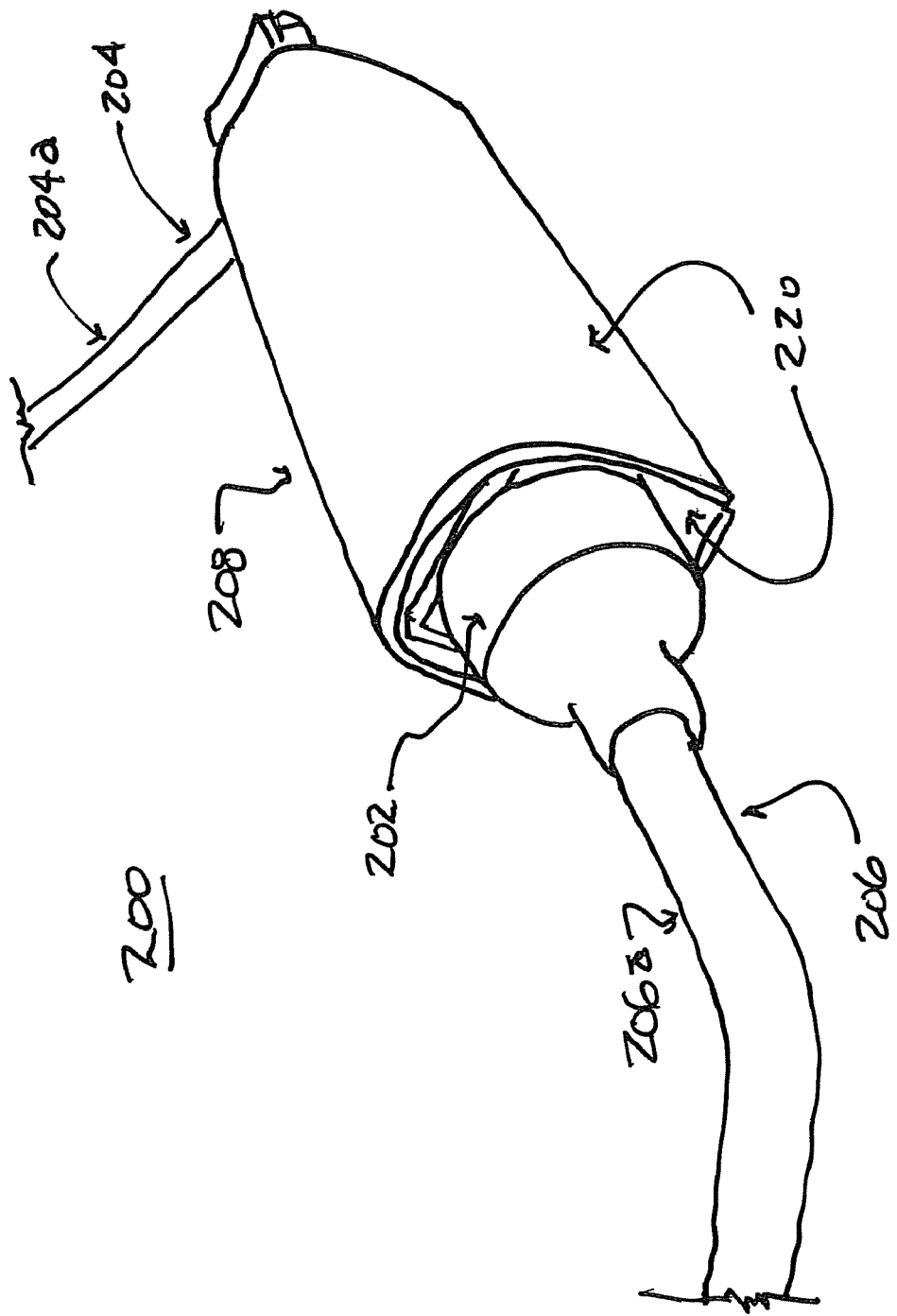

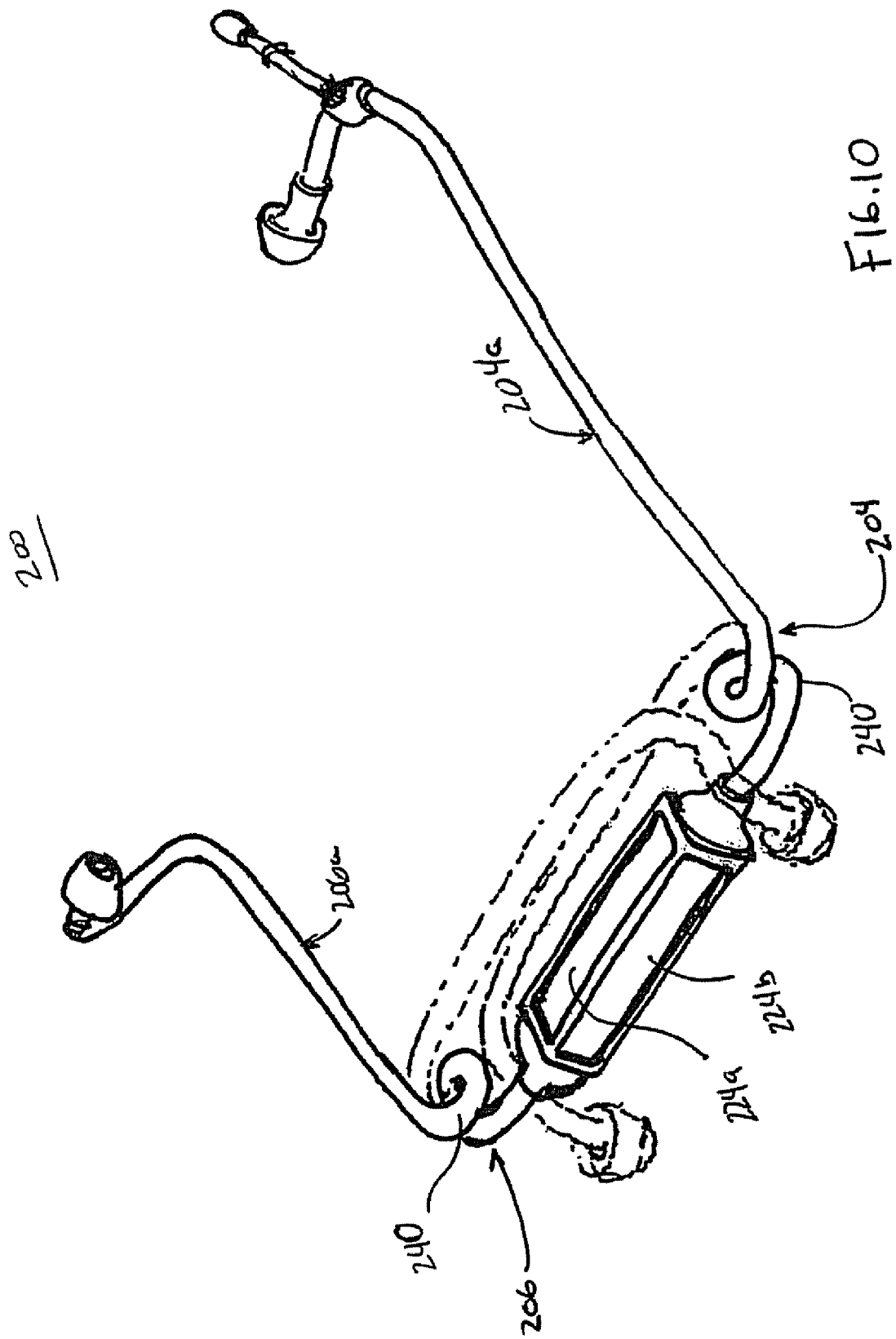

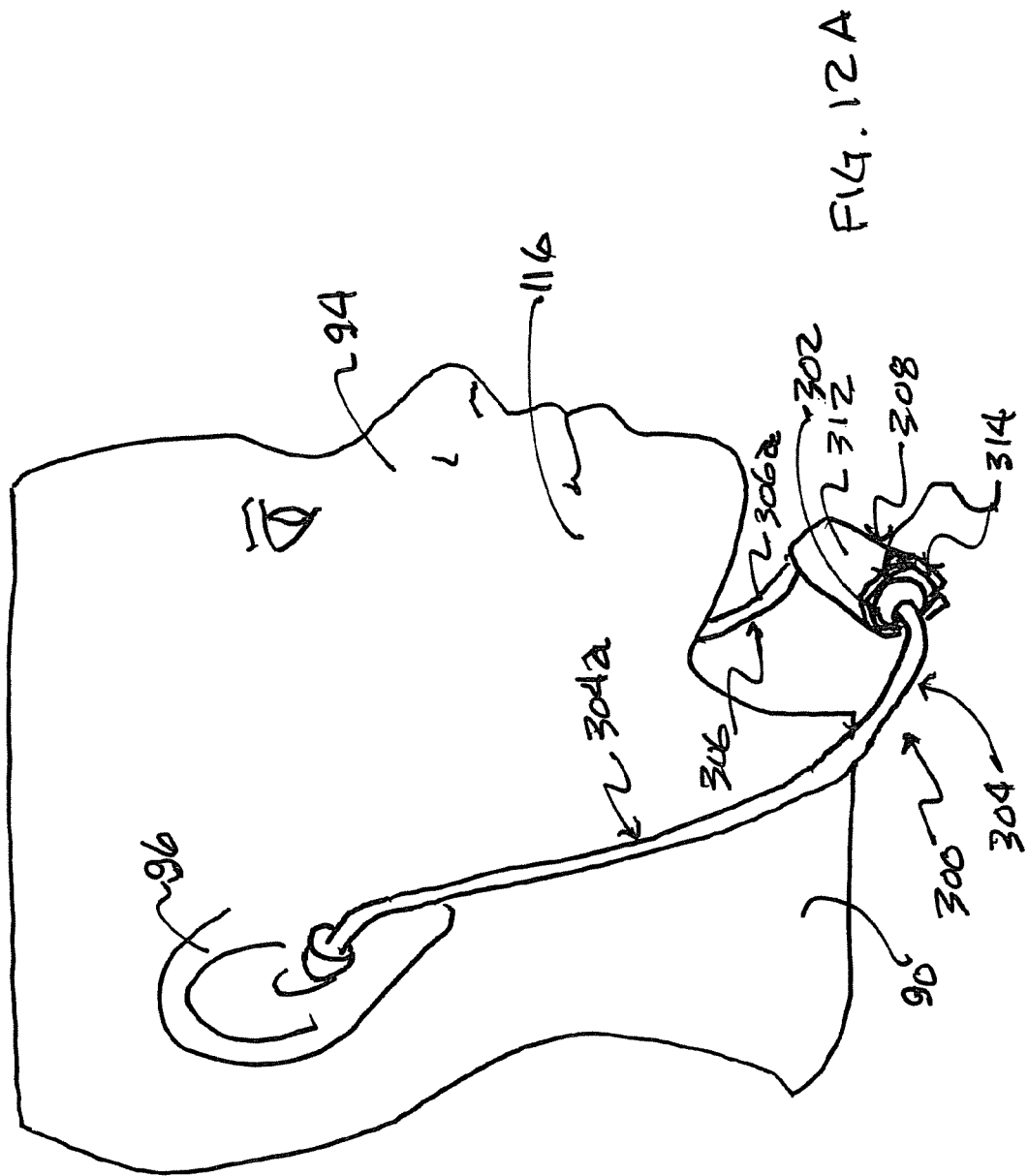

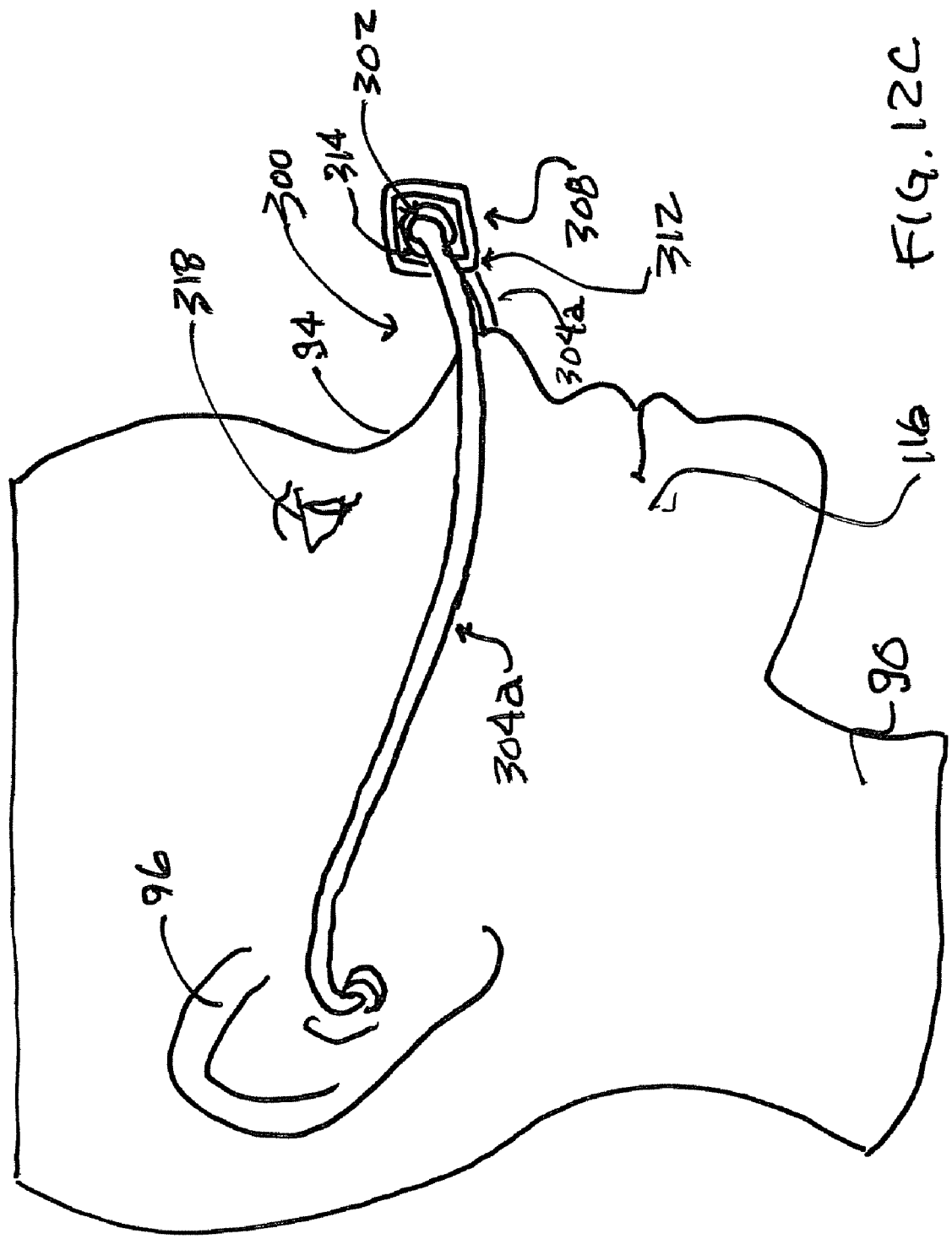

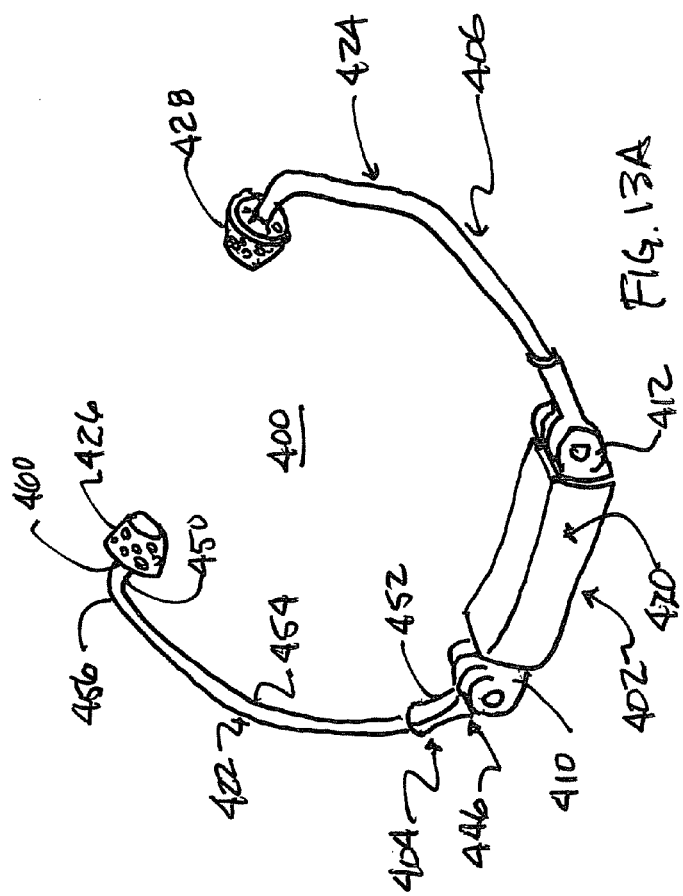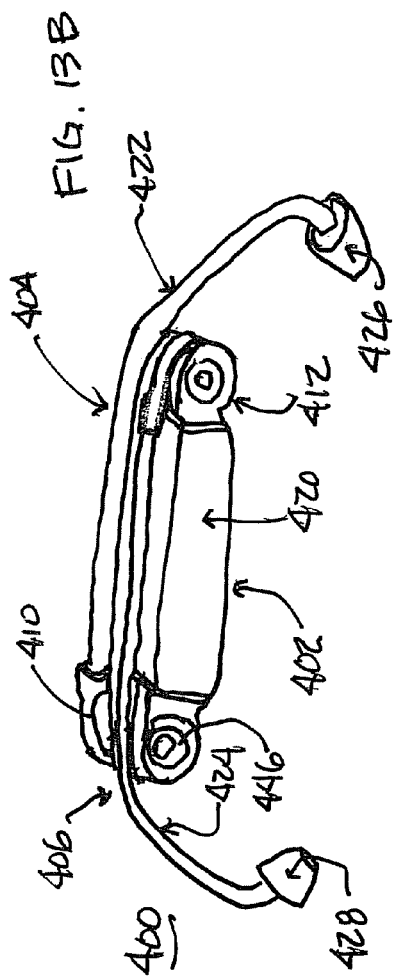

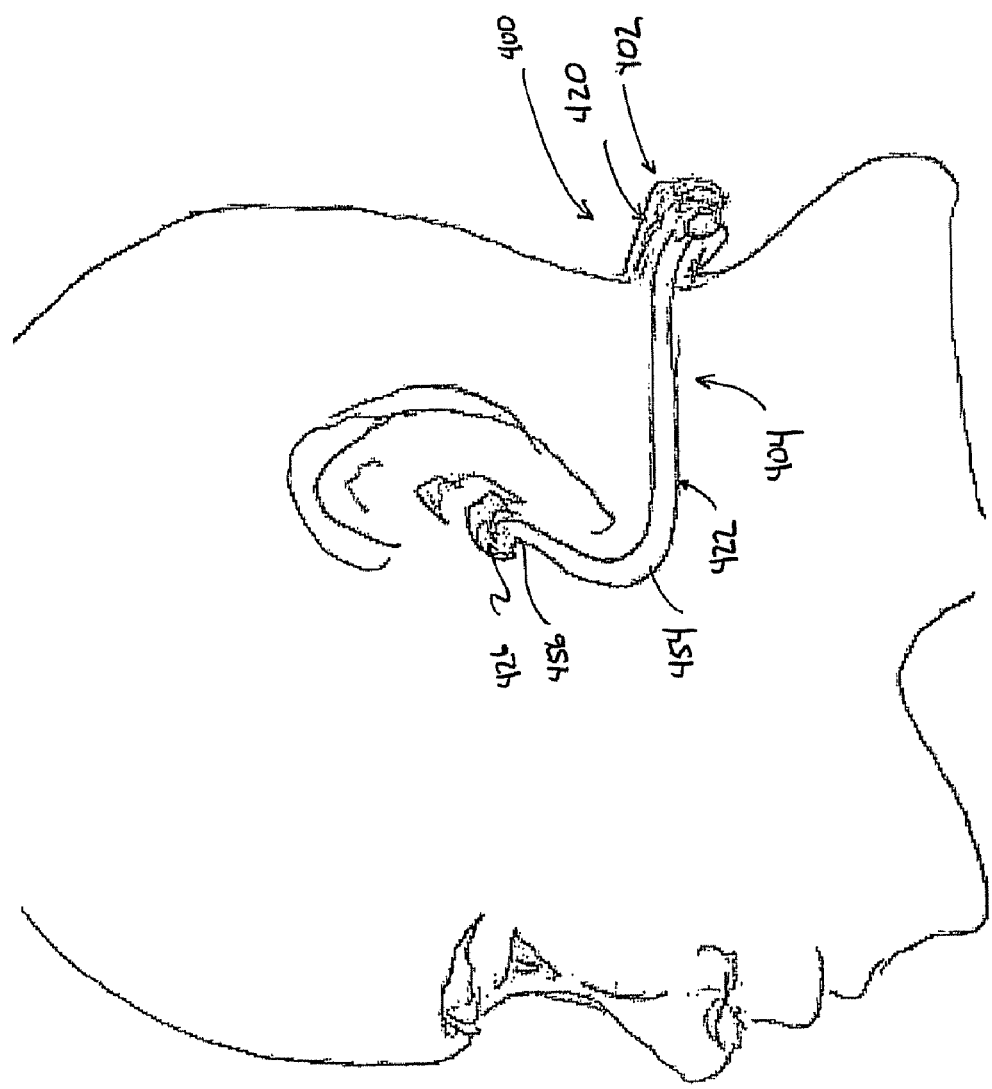

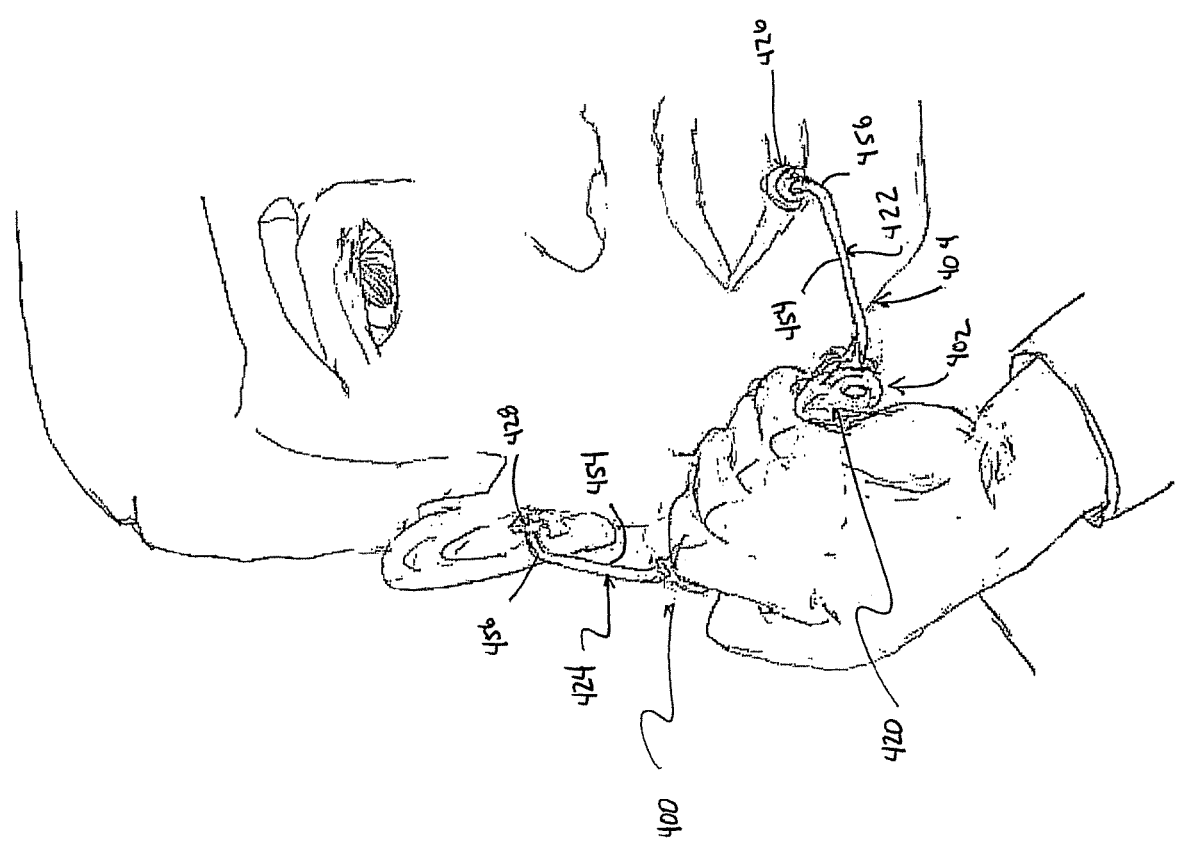

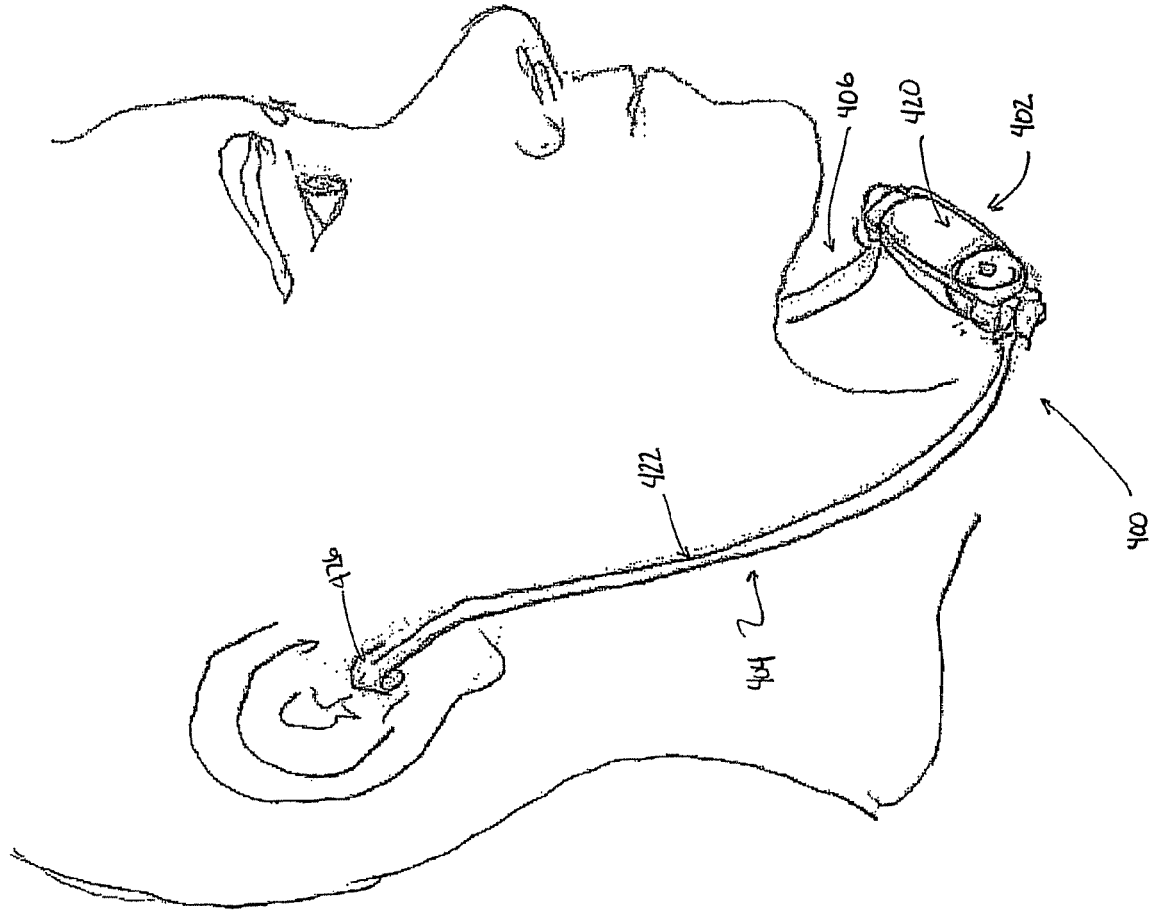

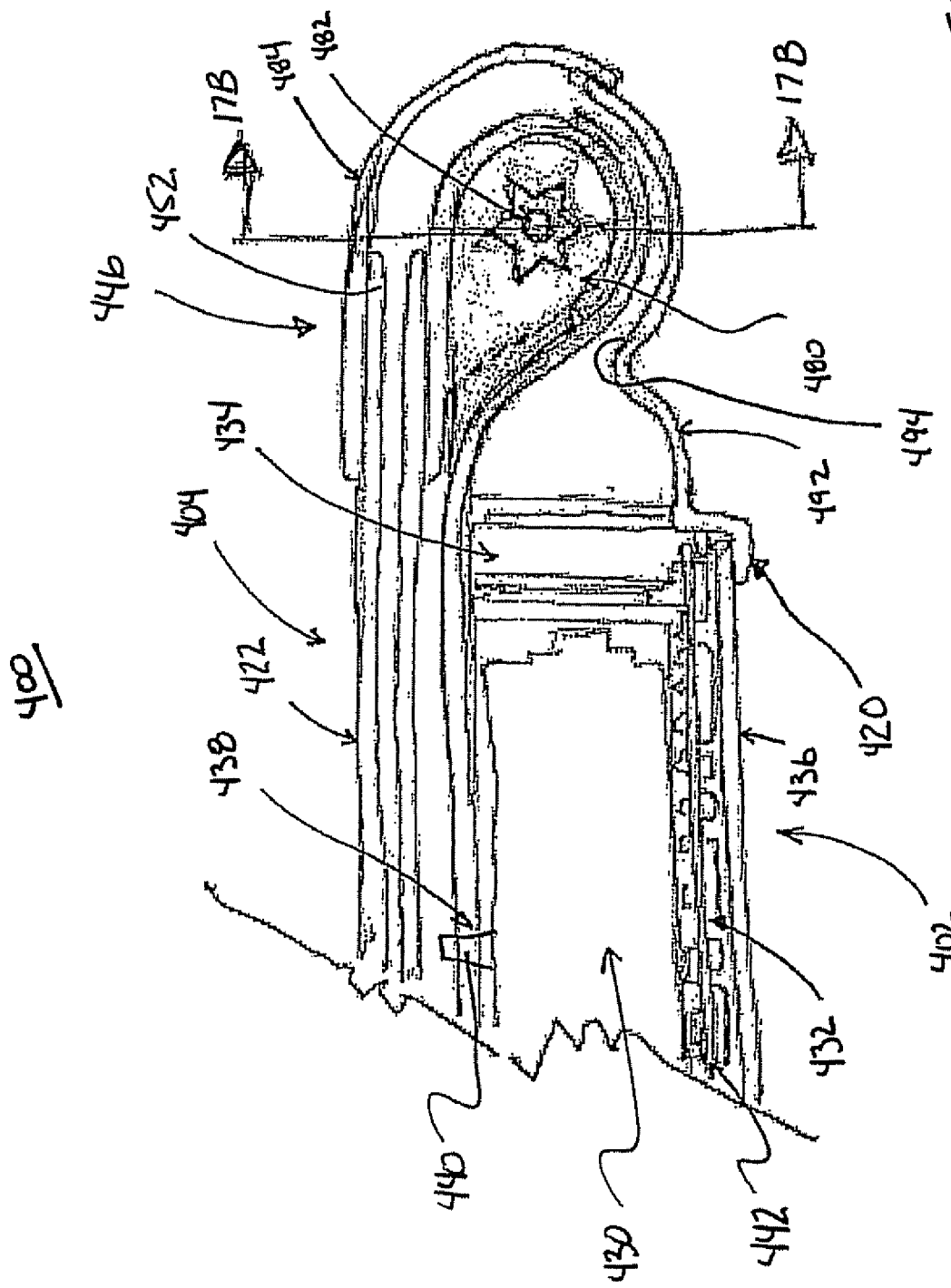

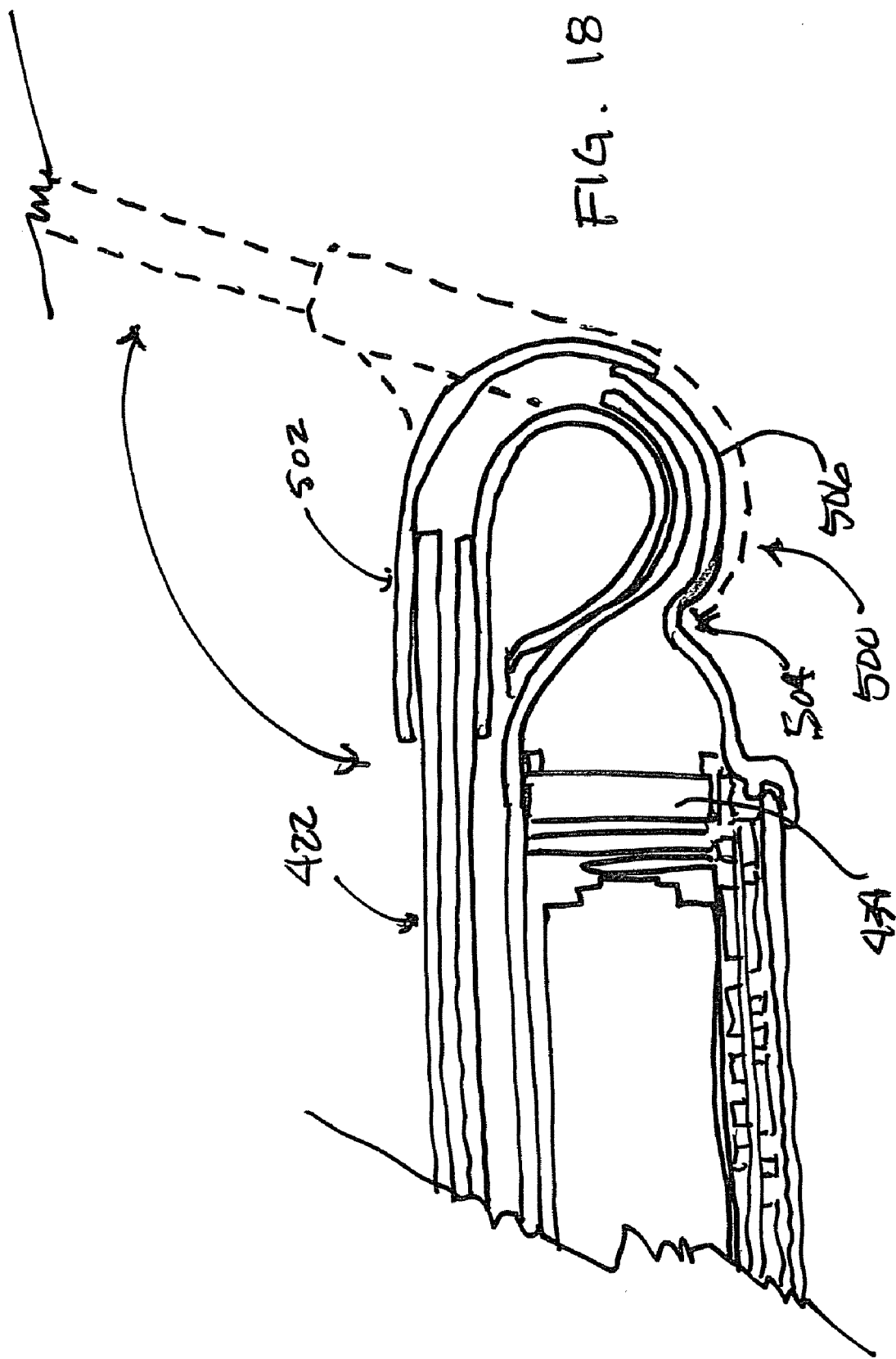

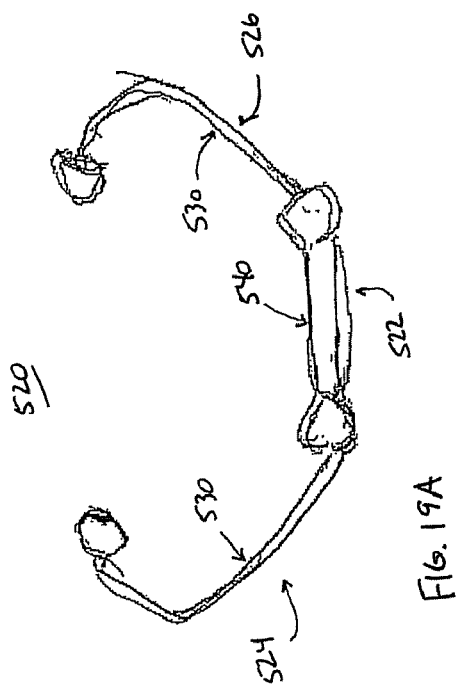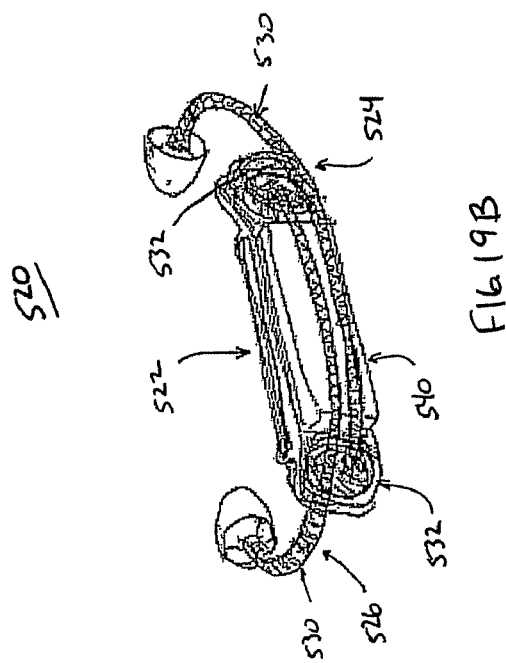

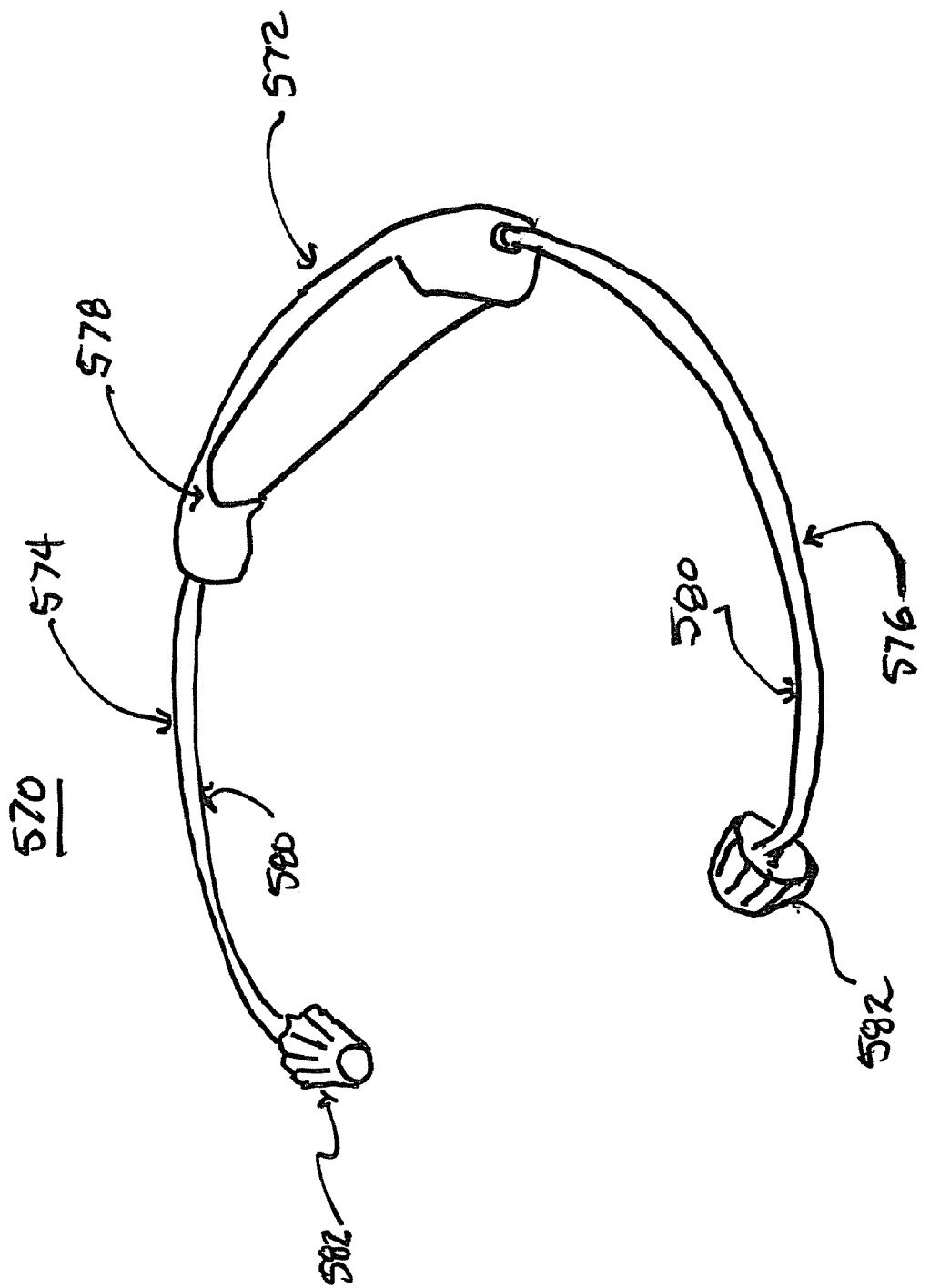

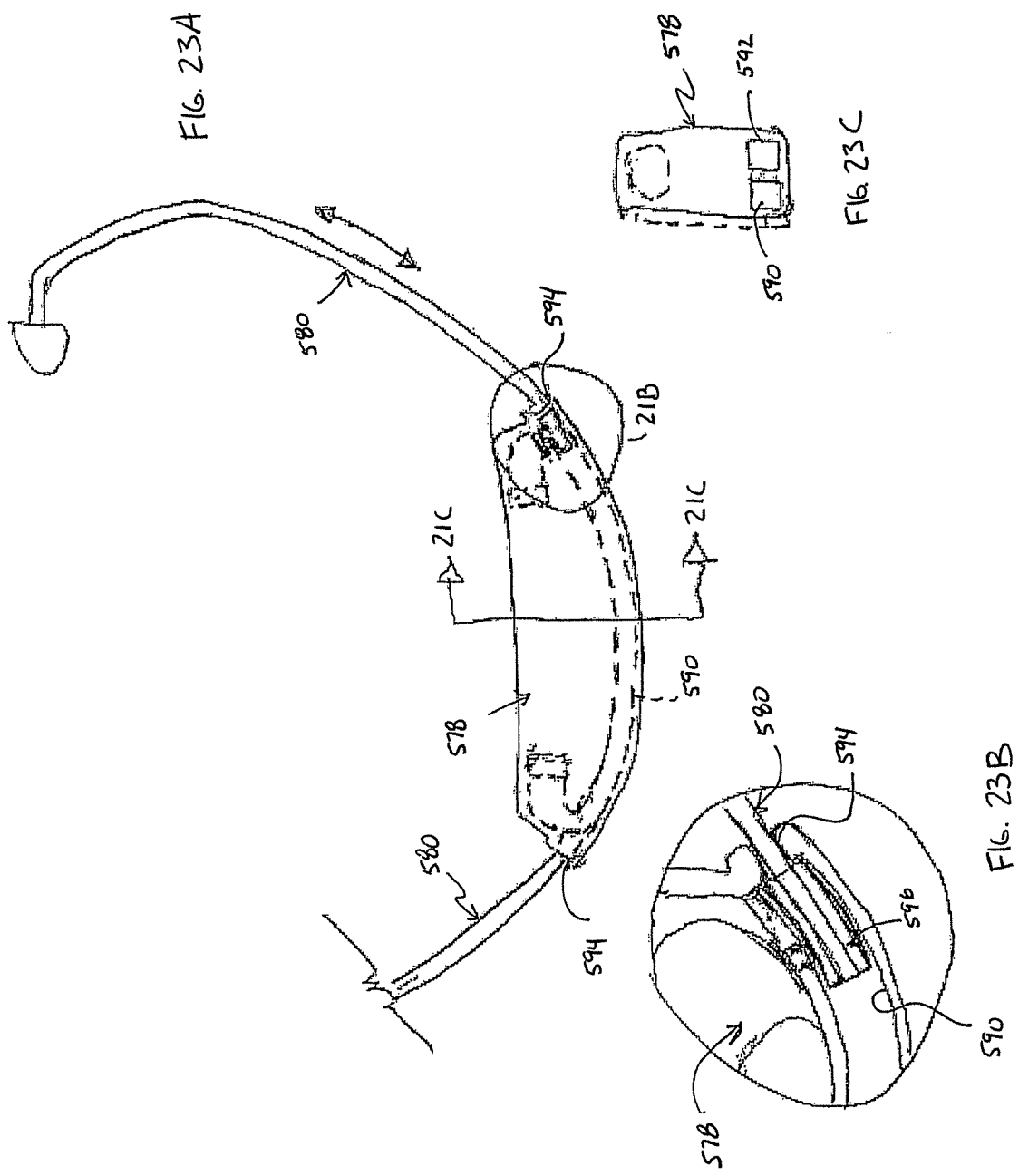

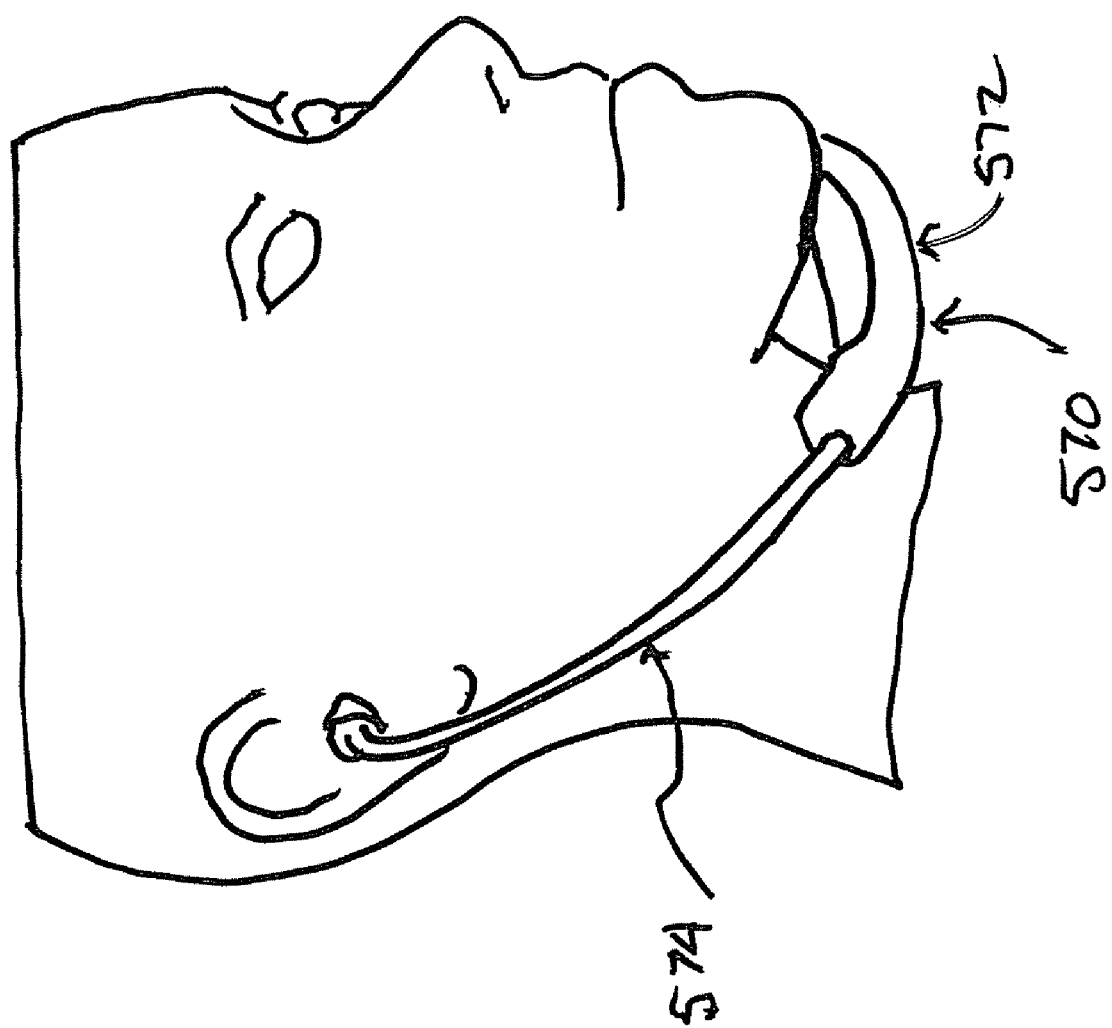

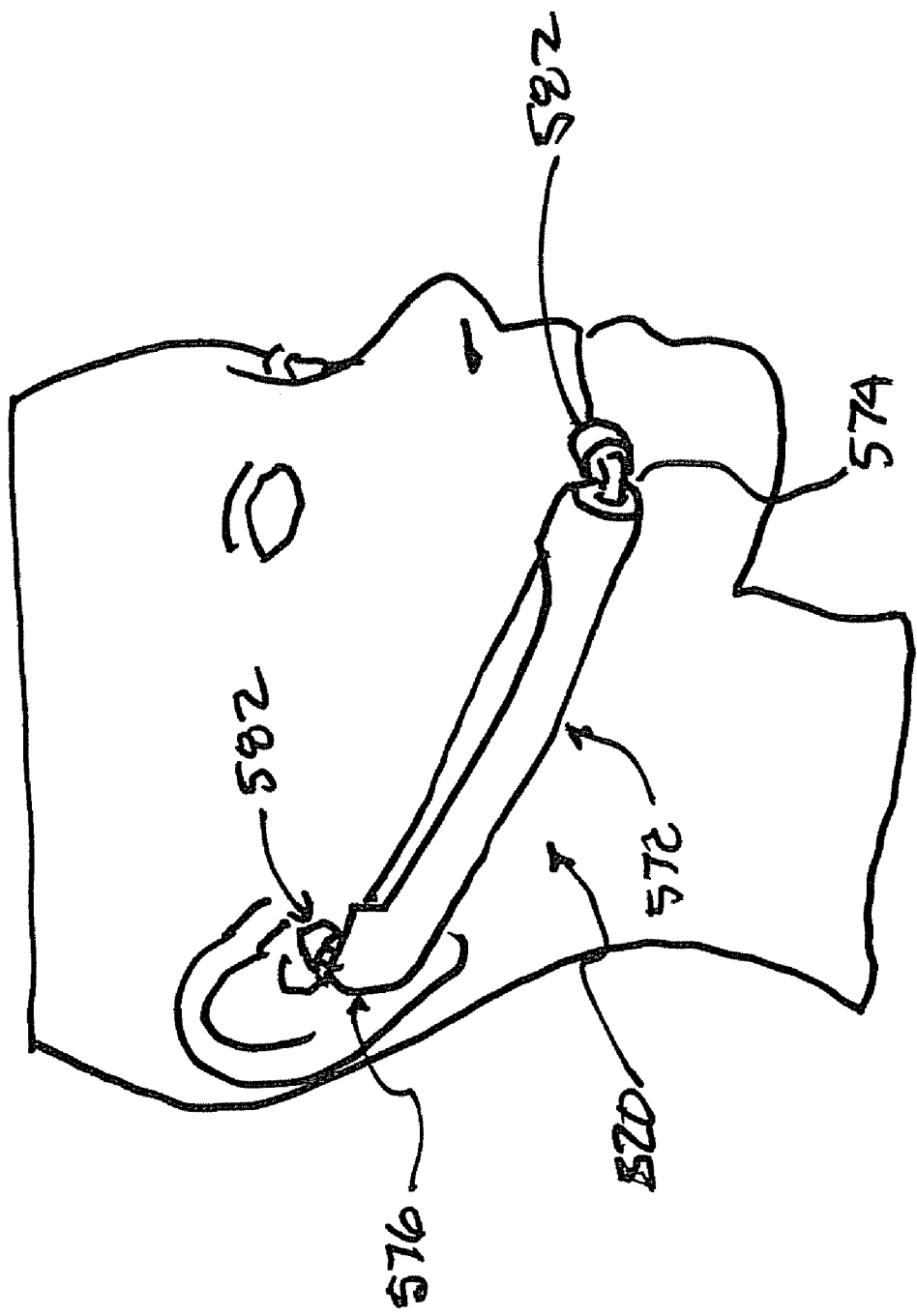

MOBILE PERSONAL AUDIO DEVICE

CROSS-REFERENCE TO RELATED APPLICATIONS

This application claims priority under 35 U.S.C. §119(e)(1) to U.S. Provisional Patent Application Ser. No. 60/910,197, filed Apr. 4, 2007, entitled "Multiple Tube Head or Neck Mounted Audio Device," U.S. Provisional Patent Application Ser. No. 60/987,278, filed Nov. 12, 2007, entitled "Mobile Personal Audio Device," and U.S. Provisional Patent Application Ser. No. 61/019,471, filed Jan. 7, 2008, entitled "Handheld and Wearable Personal Audio Device," the entire teachings of all which are incorporated herein by reference.

BACKGROUND

Personal mobile audio devices, such as digital music players and cell phones, are virtually commonplace in today's society. Continued advancements in related technologies and components have reduced the physical size, increased performance, lowered costs, and improved convenience of such devices. Improvements in speaker quality, memory (faster, smaller format, and larger data capacity), easier user interfaces, and on-line audio content purchasing processes (e.g., Apple iTunes) are examples. These have greatly enhanced the user experience and device capabilities, and elevated the transition from larger forms of portable music players and/or mobile phones to body-worn, digital device-based systems. Pointedly, smaller communication device formats are also highly pervasive.

Notwithstanding the above enhancements, one drawback to the mobility intended with digital music players and small format cell phones (or other communication devices) is the requirement of ear bud speakers connected with wires. Many mobile users do not like to wear current forms of ear bud speakers, as they find them uncomfortable, difficult to keep in the ear, and aesthetically off-putting. With the wired ear bud approach, the wires often become tangled when stored (e.g., in the user's pocket). Further, the exposed and flexible wires are easily and routinely damaged when stored in confined areas and/or when inadvertently "caught" on the user's arms, clothing, etc. Also, with cell phone and other communication device applications, the wired ear bud provides a poor format for achieving optimal microphone placement and durable mounting during use. While less popular, wired headsets present similar problems. The wires leading to the speakers carried by the headset can become frayed, and the earpiece moldings within which the speakers are maintained are relatively large and thus uncomfortable when worn (i.e., placed in the user's ear).

In addition, wired ear bud-type mobile telephone devices are not conducive to convenient use for relatively short phone calls and/or answering an unexpected, incoming phone call. As a point of reference, when not being worn by the user, the wired ear bud(s) and/or microphone are wound or otherwise stored along with a remainder of the device in the user's pocket, purse, briefcase, etc. To place (or receive) a phone call with the device initially in this stored arrangement, the wires must be untangled, the ear bud(s) placed in the user's ear, and other steps must be taken to secure the device to the user's body. This is a time-consuming process, and can be overtly frustrating for a user intending to only briefly use the mobile phone. Similarly, it can be difficult to quickly answer an incoming phone call for these same reasons.

In light of the above, a need exists for mobile personal audio devices that are more conducive to performing desired audio-type activities (e.g., digital music player, wireless cell phone, or wireless cell phone interface) with more durability, less tangling, easier mounting and storing, improved aesthetics, and simplified use.

SUMMARY

Some aspects in accordance with the present disclosure relate to a mobile personal audio device including a case, a power source, first and second speakers, a microcontroller, and first and second stem assemblies. The case maintains the power source, the microcontroller, and the speakers, with the first speaker maintained to a first side of the case, and the second speaker maintained at an opposite side of the case. The first and second stem assemblies extend from opposite sides of the case, respectively, and each include a tube having a first end adjacent and open to a corresponding one of the speakers and terminating at a second end. In this regard, each of the stem assemblies are configured such that the corresponding tube is positionable in a user-selected extended state in which the second end of the tube is displaced from the case, and a collapsed state in which the second end is in close proximity to the case. With this construction, the device is configured such that in the extended state, the case is locatable at the back of the user's neck, with the tubes extending along opposite sides of the user's head for selective placement of the second ends near a respective one of the user's ears. In this extended state, the microcontroller operates to cause the speakers to generate audio sounds waves that are delivered to the user's ears via the corresponding tubes. In some embodiments, the tubes are insertable relative to the case, and provide a framework for supporting the device on the user's head. With similar embodiments, the distance between the ends of the tubes in the extended state correlate with ear-to-ear human form factors, whereas in the collapsed state, the distance correlates with ear-to-mouth human form factors.

BRIEF DESCRIPTION OF THE DRAWINGS

FIG. 1C is an exploded view of a portion of the device of FIG. 1A;

FIG. 5B is a perspective view of a portion of another embodiment stem assembly useful with the audio devices of the present disclosure;

FIGS. 9A-9C illustrate portions of another embodiment mobile personal audio device in accordance with aspects of the present disclosure;

FIG. 10 is a perspective view of another embodiment mobile personal audio device including an alternative tube construction;

FIG. 13A is a perspective view of another personal mobile audio device in accordance with principles of the present disclosure in a wearable, extended format;

FIG. 13B is a perspective view of the device of FIG. 13A in a handheld, collapsed format;

FIGS. 14A-14C illustrate use of the device of FIGS. 13A and 13B by a user;

FIG. 15 is an enlarged, cross-sectional view of a portion of the device of FIG. 13A;

FIG. 18 is an enlarged, cross-section view of a portion of an alternative coupling arrangement useful with the device of FIG. 13A;

FIGS. 19A and 19B are simplified perspective views of an alternative mobile personal audio device in accordance with principles of the present disclosure;

FIG. 22A is a perspective view of an alternative mobile personal audio device in accordance with principles of the present disclosure in a wearable, extended format;

FIGS. 23A-23C illustrate assembly of the device of FIGS. 22A and 22B;

FIGS. 25A-25D illustrate use of the device of FIGS. 22A and 22B by a user;

DETAILED DESCRIPTION

Figure 1A:
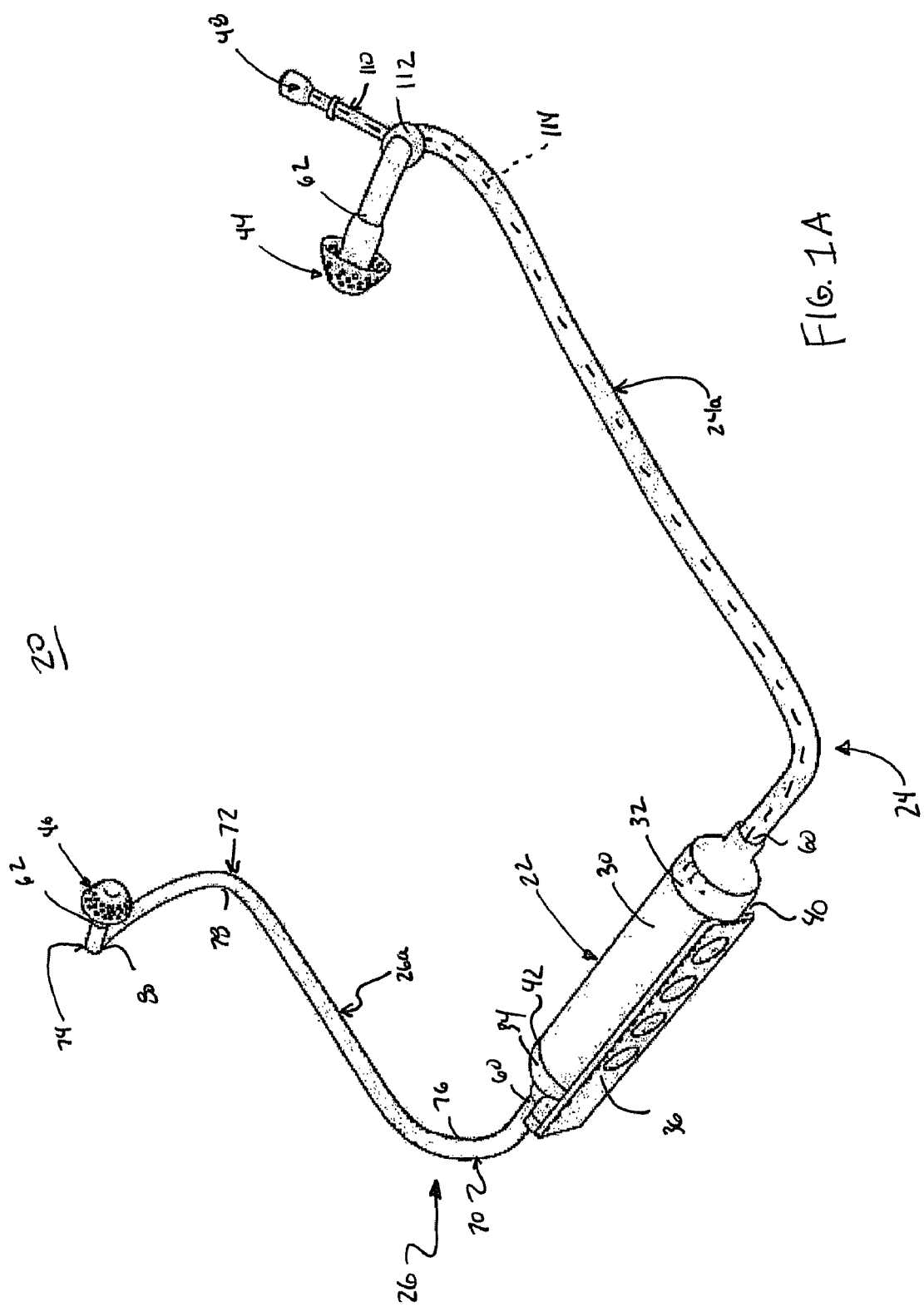
FIG. 1A is a rear side perspective view of a mobile personal audio device in accordance with aspects of the present disclosure in a deployed state.
Figure 1B:
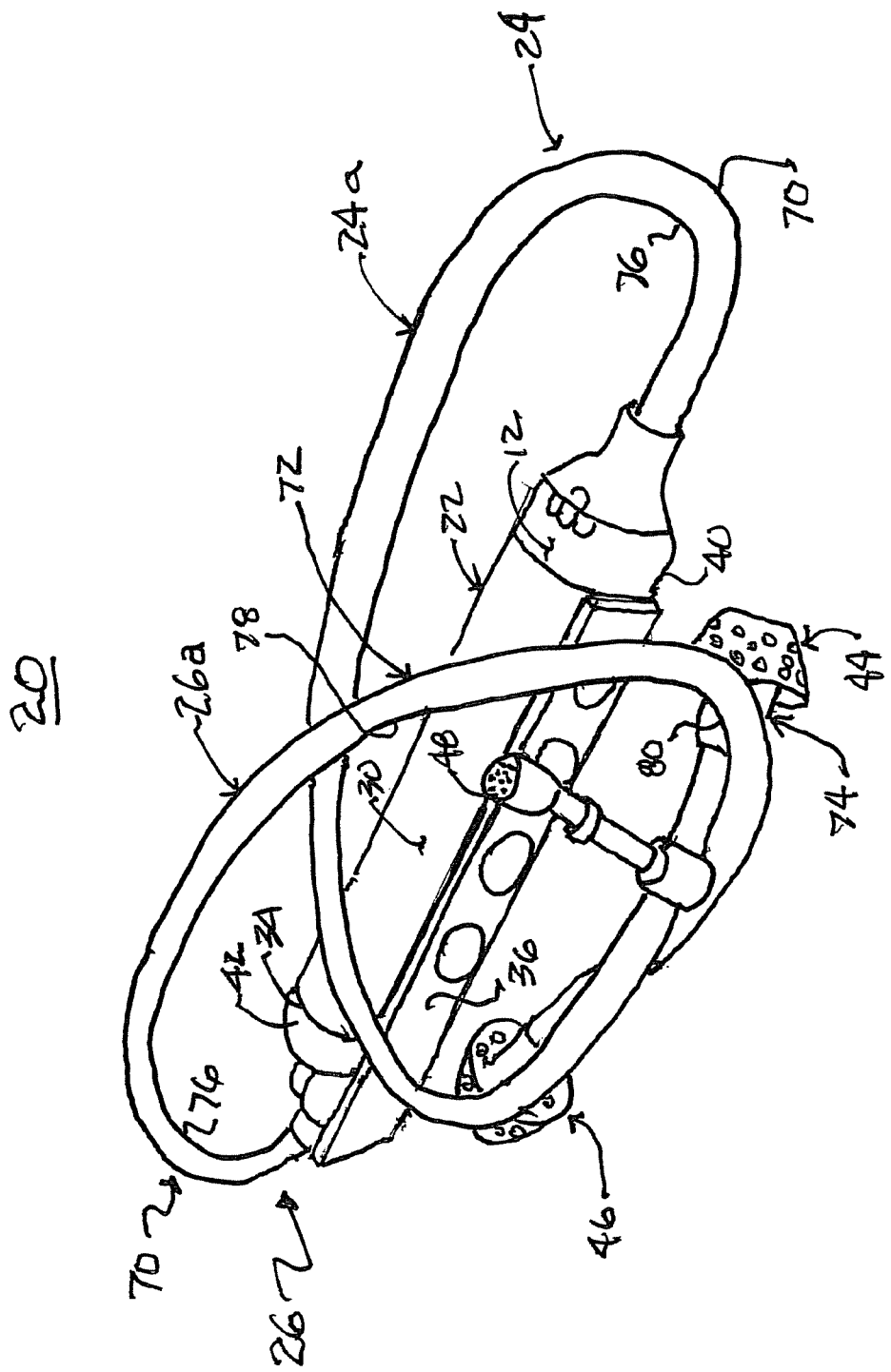
FIG. 1B is a rear side perspective view of the device of FIG. 1A in a storage state.

One embodiment of a mobile personal audio device in accordance with aspects of the present disclosure is shown at 20 in FIGS. 1A and 1B. In general terms, the device 20 is adapted for placement behind a head or neck of a user, and provides one or more audio-related modes of operation such as, for example, delivering audio inputs (e.g., music, spoken instructions, messages, etc.) to a user's ears (stereo and/or mono), facilitating audio communications (e.g., wireless cell phone interface), etc. With this in mind, the mobile personal audio device 20 includes, in some embodiments, a case 22, a first stem assembly 24, and a second stem assembly 26. The assemblies 24, 26 each include a tube 24a, 26a. Details on the various components are provided below. In general terms, however, the case 22 maintains various other components useful for producing and/or processing audio-related inputs and outputs. Several of these components are hidden in the view of FIGS. 1A and 1B, and include a power source 30 (referenced generally and best shown in FIG. 1C) such as a battery, a first speaker 32 (referenced generally), and a second speaker 34 (referenced generally). A microcontroller 36 (referenced generally and best shown in FIG. 1C) is also provided and is maintained, for example, by a circuit board. Regardless, the first tube 24a is attached to, and extends from, a first side 40 of the case 22, whereas the second tube 26a is attached to, and extends from, a second side 42 of the case 22. With this construction, the microcontroller 36 controls operation of the speakers 32, 34. The first tube 24a, in turn, serves to direct sound waves generated at the first speaker 32 to an ear of a user (for example via an audio interface piece or ear mold 44 having holes or perforations), and the second tube 26a delivers sound waves generated at the second speaker 34 to the user's other ear (via an ear mold 46, for example). Finally, in some embodiments, the device 20 includes a microphone 48 for sensing sounds generated by the user that in turn are processed by the microcontroller 36, for example when operating in a communications mode as part of a wireless cell phone interface. The microphone 48 can be carried by one of the tubes 24a or 26a as shown in the optional embodiment of FIGS. 1A and 1B, or can be disposed within the case 22 as described below. As described below, the device 20 can operate in a listen-only mode in which music or other audio outputs are delivered to both of the tubes 24a, 26a and the microphone 48 is not "active," and a communications mode in which the microphone 48 is operational.

The personal audio device 20 can assume a variety of forms apart from those shown and described in the figures. For example, in some embodiments, the audio device 20 incorporates or includes one or more the features described in U.S. Provisional Application Ser. No. 60/910,917 filed Apr. 4, 2007 and entitled "Multiple Tube Head or Neck Mounted Audio Device;" U.S. Provisional Patent Application Ser. No. 60/987,278, filed Nov. 12, 2007, entitled "Mobile Personal Audio Device," and U.S. Provisional Patent Application Ser. No. 61/019,471, filed Jan. 7, 2008, entitled "Handheld and Wearable Personal Audio Device," the teachings of each which are incorporated herein by reference. Alternatively or in addition, the audio device 20 incorporates, includes or is programmed to operate in accordance with the devices and systems described in U.S. Provisional Application Ser. No. 60/914,610 filed Apr. 27, 2007 and entitled "Automated Audio Operation Support Device and Methods," the teachings of which are incorporated herein by reference.

One construction of the case 22 is shown in greater detail in FIG. 1C. In general terms, the case 22 is sized for placement behind a user's head or neck, and includes a case body 50, a door 52, and an electronics assembly 54. The case body 50 is sized to selectively retain the power source 30. The door 52 is movably assembled to the case body 50 to permit user access to the power source 30. The case body 50 maintains other components of the drive 20, such as the first speaker 32 and the second speaker 34 (hidden and referenced generally in FIG. 1C). The electronics assembly 54 includes the microcontroller/circuit board 38, as well as, in some embodiments, a user interface assembly 56 described below. The case body 50 forms a shelf 58 to which the electronics assembly 54 is mounted, and electronic connection between the microcontroller 36, the power source 30, and the speakers 32, 34 are established. The shelf 58 is relatively flat (as compared to a more rounded shape of the case body 50 opposite the shelf 58) to more clearly indicate to a user a proper orientation of the case 22 when worn.

With respect to the embodiments illustrated in FIGS. 1A and 1B, the first and second tubes 24a, 26a are in many respects identical, and include or exhibit several common features. For example, the first tube 24a is hollow, extending from a first end 60 to a second end 62. The first end 60 is attached to the first side 40 of the case 22, and is open relative to the first speaker 32. With this arrangement, then, sounds or sound waves generated by the first speaker 32 readily progress into the first end 60 of the tube 24a, with the tube 24a directing the audio waves or signals to the second end 62. The second tube 26a has a similar relationship relative to the second side 42 of the case 22, and in particular the second speaker 34. Further, in some embodiments, each of the tubes 24a, 26a is imparted with a shape memory attribute whereby the tubes 24, 26 are readily deflectable to a user-selected extended state or position (FIG. 1A), and self-transition from the extended state to a collapsed state or position (FIG. 1B). With this construction, when the device 20 is not in use or otherwise being worn by a user, the tubes 24a, 26a effectively retract (e.g., self-coil) along or about the case 22, resulting in a compact configuration for easy storage (e.g., in the user's pocket). During use, however, the tubes 24a, 26a exhibit sufficient flexibility so as to be readily transitioned from the collapsed state for placement about the user's neck and head.

The imparted shape memory attribute is described below with reference to FIG. 1A and relative to the second tube 26a, it being understood that a similar construction can be employed with the first tube 24a. With this in mind, in some embodiments, the second tube 26a can be designated as defining or including a first segment 70, a second segment 72, and a third segment 74. As a point of reference, one or more of the segment(s) 70-74 can be separately formed and subsequently assembled, or the second tube 26a can simply be a continuous, homogenous structure having the curve(s) described below. The first segment 70 extends from the first end 60 and forms a first bend 76. The second segment 72 extends from the first segment 70 and forms a second bend 78. Finally, the third segment 74 extends from the second segment 72, terminating at the second end 62 and forming a third bend 80. The bends 76-80 are sized and shaped to promote desired physical interface with a user's head and neck in maintaining the second end 62 (and the ear mold 46 connected thereto) in or about a user's ear. In addition, the first segment 70 is reinforced so as to naturally self-transition from the enlarged curvature of FIG. 1A to the decreased curvature of FIG. 1B. That is to say, the first segment 70 will readily deflect (e.g., uncoil) along the first bend 76 in response to a user-applied force. However, the first segment 70 retains a natural affinity to return to the state or position of FIG. 1B. Stated otherwise, the first segment 70 is adapted to naturally transition from the extended state of FIG. 1A in which the second end 62 is displaced from the case 22 to the collapsed state of FIG. 1B in which the second end 62 is proximate the case 22. This shape memory attribute can be incorporated via a formed or molded configuration of the tube 26a (e.g., the tubes 24a, 26a can be a molded polymer, with the shape memory attribute created during molding by, for example, molding the storage state curvature to the first segment 70, creating the first segment 70 to have a greater wall thickness, etc.). Alternatively and/or in addition, a reinforcement body (e.g., coiled spring or tensioned cable) can be interiorly or exteriorly formed or applied to or about segment(s) of the second tube 26a (e.g., along the first segment 70) to enhance the natural affinity of the second tube 26a to assume the storage state/position of FIG. 1B. Regardless, in the storage state, the tubes 24a, 26a are effectively retracted (e.g., coiled) relative to the case 22.

Figure 2:
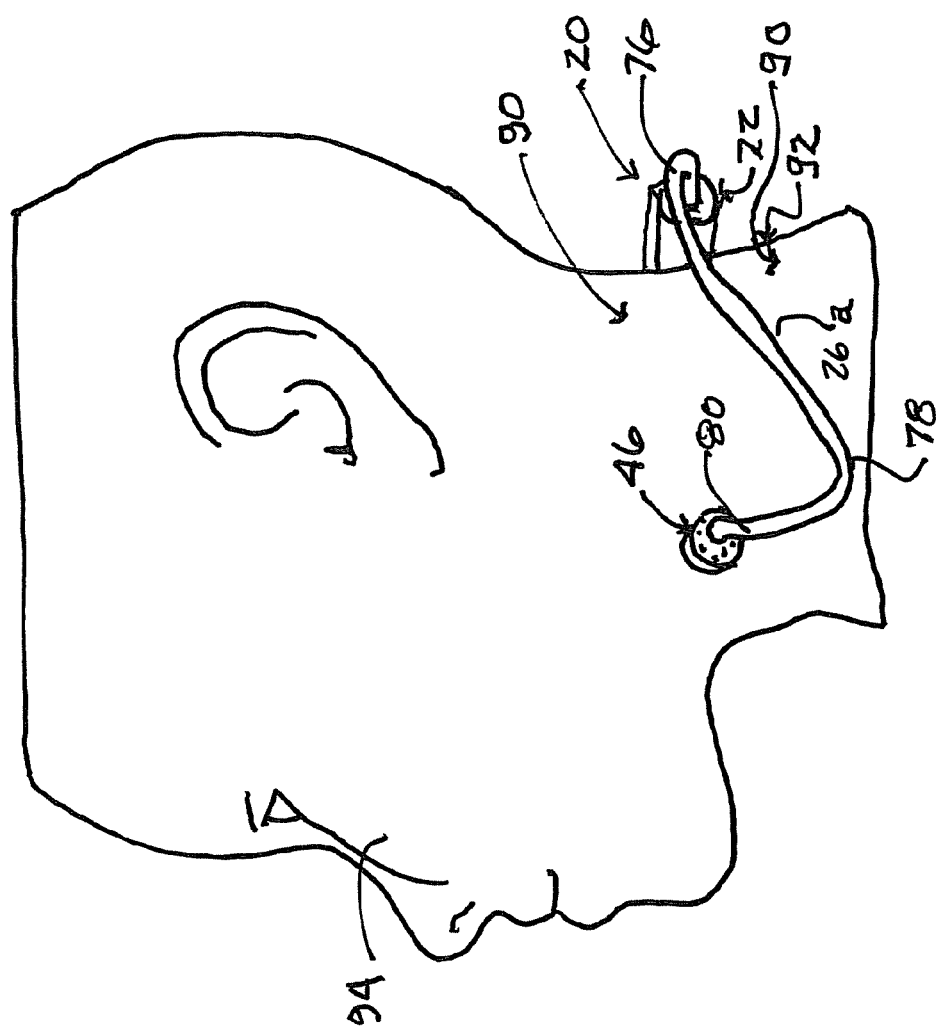
FIG. 2 is a side view of the device of FIG. 1A worn by a user in a non-operational mode.

In addition to promoting natural movement of the tubes 24a, 26a to the storage state, the shape memory attribute in combination with the selected bend(s) or curvature(s) 76-80 promotes convenient wearing of the device 20 by a user. For example, FIG. 2 illustrates the device 20 placed about the user's neck 90. The case 22 is placed at a back 92 of the user's neck 90. The tubes 24a, 26a extend about opposite sides of the neck 90, and toward the user's face 94. As a point of reference, the first tube 24a is hidden in the view of FIG. 2. The bends 76-80 promote the tubes 24a, 26a applying a slight pressure to the user's neck 90 and/or face 94 (e.g., cheeks) at one or more points such that the device 20 will not readily fall off of the user. As a point of reference, the arrangement of FIG. 2 relates to the user wearing the device 20 in an extended (or partially extended) state, but with the device 20 not generating audio sounds. The same curved collapsing tension effects of the tubes 24a, 26a will provide for inherent retention of the device 20 to the user's head when one or both of the tubes 24a and/or 26a are rotated toward the corresponding ear 96 during use, as described below.

Figure 3A:
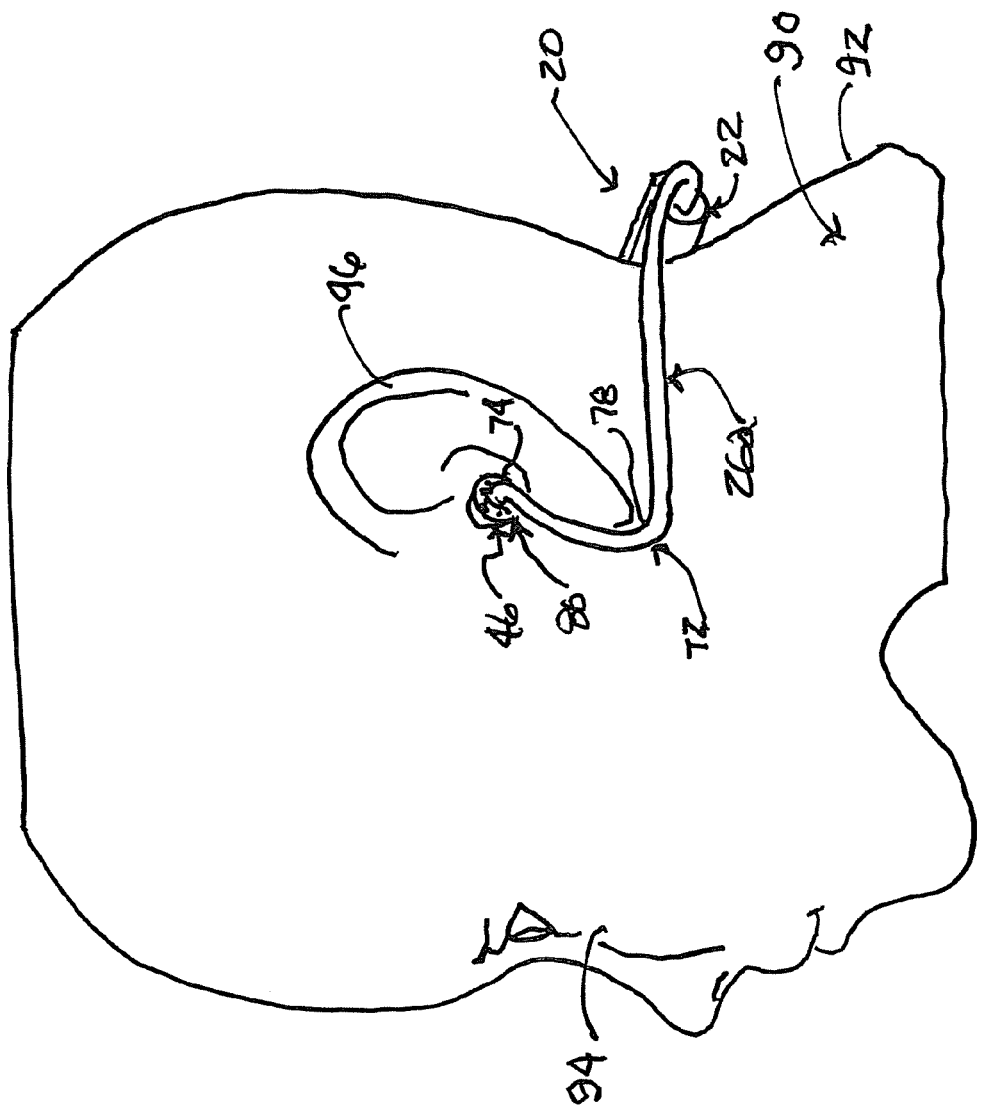
FIG. 3A is a side view of the device of FIG. 1A worn by a user in an operational mode.
Figure 3B:
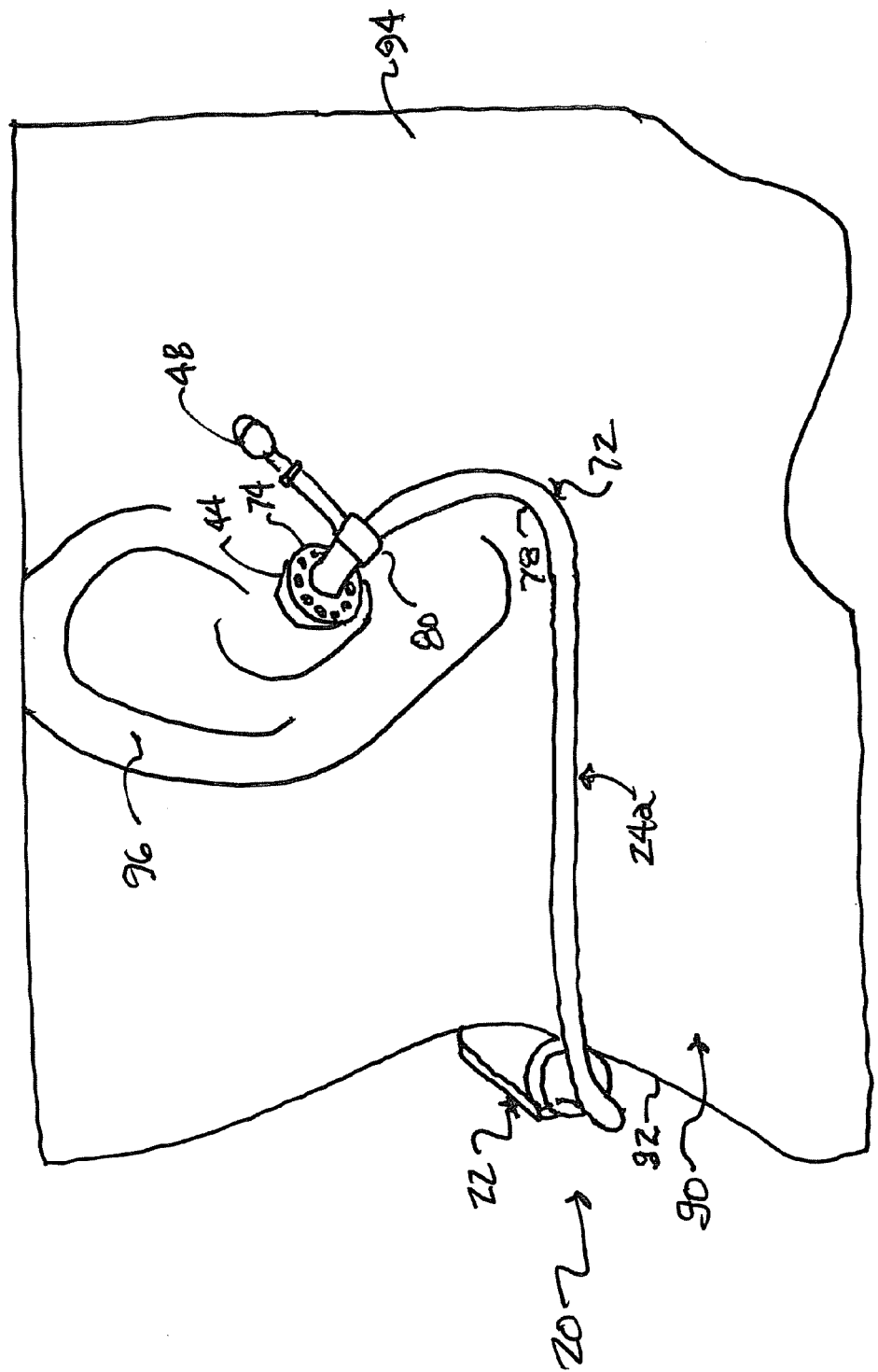
FIG. 3B is a side view of the arrangement of FIG. 3A from an opposite side of the user.

When the user desires to listen to audio outputs or otherwise interact with the device 20, one or both of the tubes 24a and/or 26a are maneuvered to a second extended position whereby the corresponding ear mold 44 and/or 46 are placed in a respective one of the user's ears 96 as shown in FIG. 3A. In the view of FIG. 3A, the ear mold 46 associated with the second tube 26a is placed in the user's left ear 96; the first tube 24a is partially hidden in FIG. 3A, it being understood that the corresponding ear mold 44 (FIG. 1A) can be placed in the user's opposite or right ear as shown in FIG. 3B. In the position of FIG. 3A, the second segment 72, and in particular the second bend 78, is placed into contact with the user's head and/or neck 90, with the third segment 74, and in particular the third bend 80, providing clearance about the ear 96 such that the ear mold 46 is easily and comfortably disposed in the corresponding ear canal. Due to the shape memory attribute described above, the first segment 70 is under tension in the deployed state of FIG. 3, imparting or creating a force on the second segment 72 that in turn ensures or facilitates at least a slight pressure contact between the second bend 78 and the user's head. Thus, when the tubes 24a, 26a are positioned to directly interface with the user's ears 96, the imparted shape memory attribute serves to "fixate" the tubes 24a, 26a relative to the user such that the ear molds 44, 46 will not readily or easily fall out of the user's ears 96. Notably, this same, tension-induced fixation to the user will be accomplished with a wide variety of head/neck sizes as the case 22 can be placed at any desired elevation relative to the user's neck 90 so as to position the tubes 24a, 26a at optimal locations for interfacing with the ears 96 regardless of the user's head size. Alternatively or in addition, the bends 76-80 force the corresponding ear mold 44, 46 to apply a slight pressure toward the user's ear canal, again to better ensure that the ear molds 44, 46 will not readily fall out of the user's ears 96 during use. When the device 20 is entirely removed from the user, the tubes 24a, 26a automatically self-revert to the collapsed state of FIG. 1B.

Returning to FIG. 1A, where provided, the microphone 48 is directly associated with the first tube 24a to facilitate use of the device 20 in a communication mode (e.g., as a wireless interface with a cell phone via Bluetooth technology or by incorporating cell phone capabilities into the device 20 itself). In some optional embodiments, the microphone 48 is maintained by an auxiliary tube 110 that extends from and is open to the first tube 24a at a point adjacent the second end 62 (e.g., proximate the third bend 80). The auxiliary tube 110 can be rigid, and can be attached to the first tube by a collar 112 or other structure (e.g., the auxiliary tube 110 can be integrally molded with the first tube 24a). Regardless, a wire 114 extends from the microphone 48, through the auxiliary tube 110, into the first tube 24a, and is electronically connected to the microcontroller 36. The microcontroller 36 is programmed to receive and process audio input from the microphone 48 when operating in the communication mode as described below.

As mentioned above, a size and shape of the auxiliary tube 110, as well as a location of the auxiliary tube 110 relative to the first tube 24a, are selected to desirably position the microphone 48 during use in the communication mode. The above-described tensioning attribute of the first tube 24a fixates the first tube 24 relative to the user's head (and thus the microphone 48 relative to the user's jaw 116 or mouth) in this secondary deployed position with the bend 78 gently pressing against the user's head (e.g., cheek). For example, and with reference to FIG. 4, the auxiliary tube 110 is sized and positioned such that in the communication mode, the first tube 24a is slightly rotated the displace the corresponding ear mold 44 from the user's ear 96 and position the microphone 48 in closer proximity to the user's jaw 116 and/or mouth. Alternatively, the auxiliary tube 110 can be sized to position the microphone 48 in close proximity to the user's jaw 116 and/or mouth when the ear mold 44 carried by the first tube 24a is within the user's ear 96.

Figure 5A:
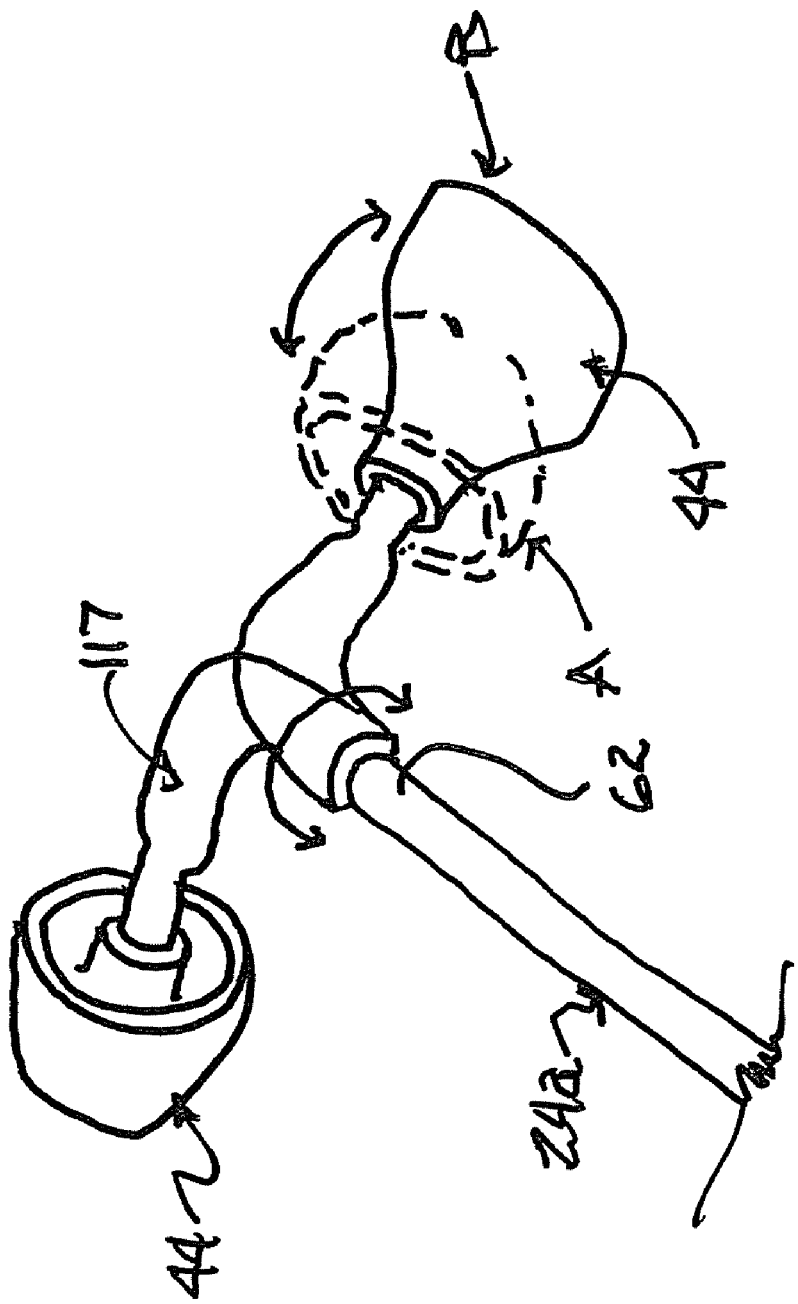
FIG. 5A is a perspective view of a portion of an embodiment stem assembly useful with the audio devices of the present disclosure.

In other embodiments, the microphone 48 is carried within the case 30, and the auxiliary tube 110 and the wire 114 through the first tube 24a eliminated. For example, FIG. 1C illustrates one possible location of a microphone 48' adjacent the first speaker 32 and positioned to be "open" relative to a channel defined by the first tube 24a. With this construction, audio input from the user (e.g., spoken words) are introduced into the first tube 24a at the second end 62 (FIG. 1A), for example via the ear mold 44, with the first tube 24a directing the audio input to the microphone 48'. With these and other similar configurations, the device 20 can incorporate additional features that promote positioning of the ear mold 44 when the first tube 24a is employed to transfer audio from the user to the microphone 48'. FIG. 5A, for example, illustrates the ear mold 44 being attached to the second end 62 of the first tube 24a by a coupling member 117. The coupling member 117 allows the ear mold 44 to be rotated relative to the first tube 24a for desired orientation relative to the user's mouth or ear. FIG. 5A further depicts an optional invertable feature of the ear mold 44. More particularly, the ear mold 44 can be inverted from an "in ear" state ("A" in FIG. 5A) to a sound gathering state ("B" in FIG. 5A) that more readily collects sound waves (akin to a funnel) for direction to and through the first tube 24a.

FIG. 5B illustrates another optional feature associated with device embodiments in which the microphone 48' (FIG. 1C) is carried in the case 30. In particular, a stand mechanism 118 is assembled at the third bend 80 of the first tube 24a, and includes a finger 119a pivotably mounted to a collar 119b. In a first state ("A" in FIG. 5B), the finger 119a is rotated toward the first tube 24a, and the collar 119b does not affect the natural shape of the third bend 80. In this position, then, the stand mechanism 118 will not interfere with placement of the ear mold 44 in the user's ear as described above. Conversely, in the second state ("B in FIG. 5B), the finger 119a projects away from the first tube 24a; further, rotation of the finger 119a causes the collar 119b to "straighten" the third bend 80. As a result, when the first tube 24a is rotated toward the user's mouth, the finger 119a is positioned to rest against the user's face, thus more optimally locating the ear mold 44 to collect sounds from the user's mouth.

Commensurate with the above description, and returning to FIGS. 1A-1C, the microcontroller 36 is programmed, in some embodiments, to operate differently depending upon the application desired by the user (e.g., a listen-only mode and a communication mode). For example, in the listen-only mode, the microcontroller 36 operates both of the speakers 32, 34 to generate an audio output that in turn is delivered to both of the ear molds 44, 46. Audio inputs, if any, received at the microphone 48, 48' are not signaled and/or not operated upon by the microcontroller 36 in the listen-only mode. Thus, in the listen-only mode, the microcontroller 36 can deliver a high definition audio output (e.g., stereo) to the user via both of the speakers 32, 34. In the communication mode, the microcontroller 36 performs cell phone operations, for example controlling use of the internal wireless interface between a user and a separate cell phone device carried by or nearby the user, (e.g., via Bluetooth technology incorporated into or connected to the device 20), or controlling use of internal cell phone components carried by the case 22. In the communication mode, then, the microcontroller 36 receives and processes audio input generated by the user at the microphone 48, 48'. Further, the microcontroller 36 provides audio output to the second speaker 34 (and thus the ear mold 46 attached thereto). With embodiments in which the first tube 24 is maneuvered away from the user's ear 96 to properly position the microphone 48, 48' relative to the user's jaw 116 and/or mouth, the microcontroller 36 does not generate an audio output at the first speaker 32. Rather, audio output is generated only at the second speaker 34 (e.g., mono sound generated through the wireless communication means). Alternatively, with embodiments in which the microphone 48, 48' is appropriately positioned relative to the user's jaw 116 with the first tube 24a/ear mold 44 still located in or at the user's ear 96, the microcontroller 36 can also deliver audio output via the first speaker 32.

Figure 6:
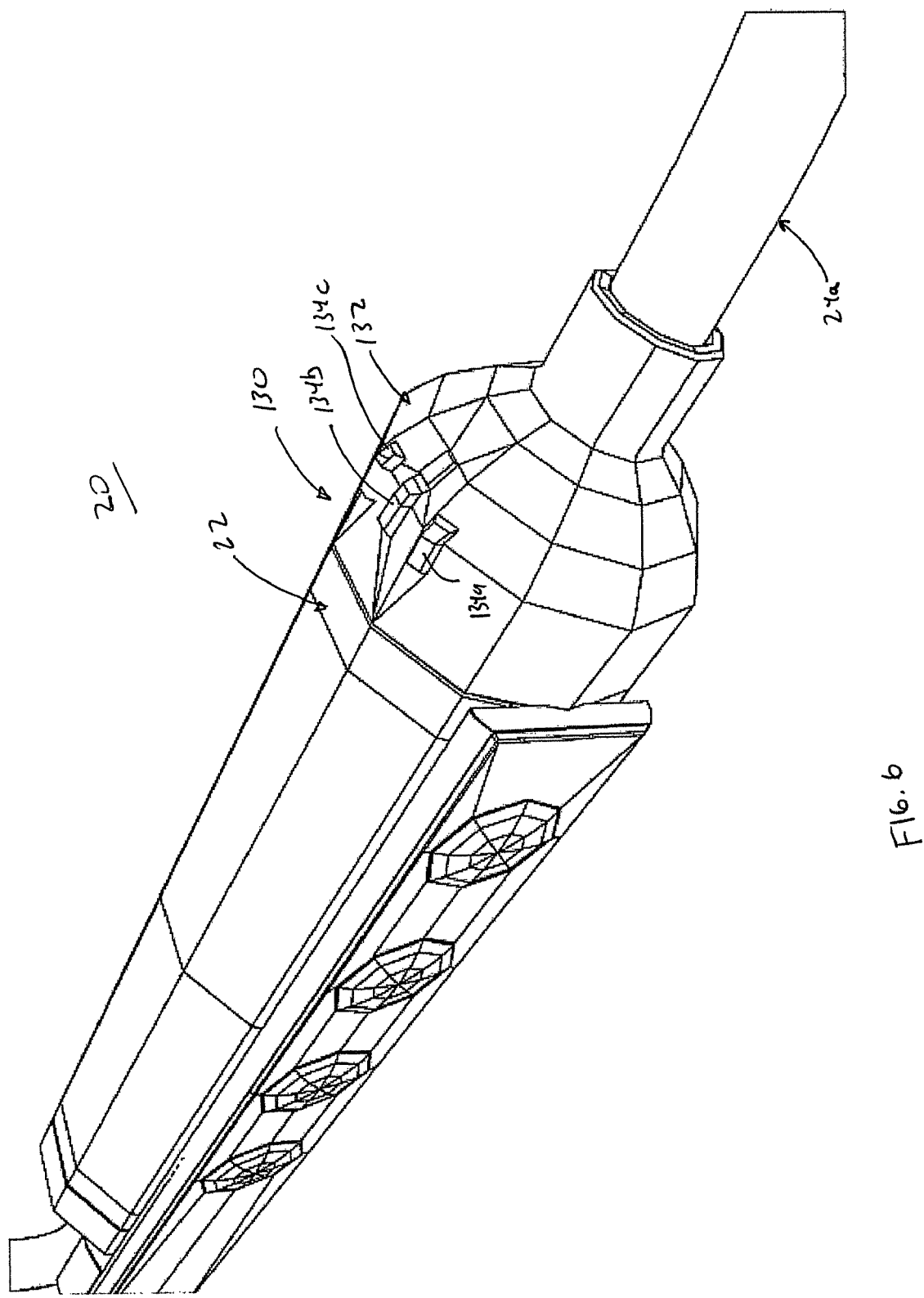
FIG. 6 is an enlarged perspective view of a portion of the device of FIG. 1A.

The device 20 can incorporate various features that promote automatic transitioning of the microcontroller 36 between the listen-only mode and the communicative mode. For example, in some embodiments, the user interface assembly 56 can include one or more user interfaces 120 (e.g., buttons) along a face of the case 22 that are otherwise electronically coupled to the microcontroller 36. Based upon user interaction with one or more of the interfaces 120, the microcontroller 36 will automatically operate in either the listen-only mode or the communication mode. Additionally or alternatively, the device 20 can incorporate a sensor system 130 as best shown in FIG. 6 and provided in some embodiments in the form of a switching device. For example, the switching device 130 can include a housing 132 movably assembled to the case 22 and attached to the first tube 24. In this regard, attachment between the housing 132 and the case 22 provides for two or more discrete, known positions of the two components 22, 132 relative to one another. With the one embodiment of FIG. 6, the housing 132 is rotatably attached to the case 22, and is rotatable between three set or locked positions indicated by protrusions 134a-134c. In the first position (protrusion 134a), the housing 132, and thus the first tube 24, is rotated relative to the case 22 in an "off" or "standby" position. This corresponds with the worn but "not activated" or partially-extended position of FIG. 2. When the switching device 130 is in the "off" or "standby" position, the microcontroller 36 operates in a "sleep" or "off" mode in which the microphone 48, 48' is deactivated and the speakers 32, 34 are not operated. However, the device 20 can be programmed to perform some communications-type features in the "off" or "standby" mode, such as receiving phone calls and notifying the user with vibration and/or sound.

Figure 4:
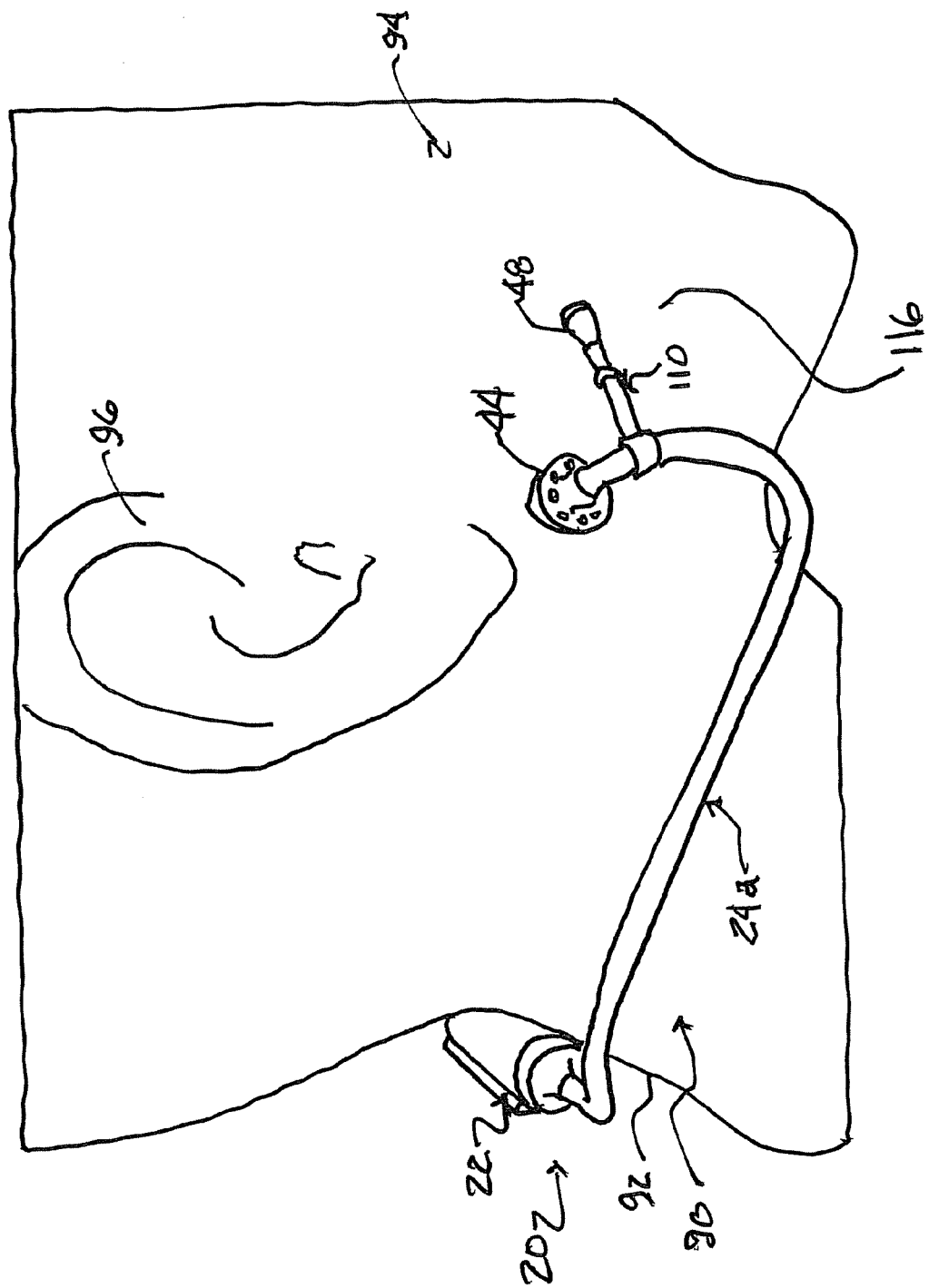
FIG. 4 is a side perspective view of the device of FIG. 1A worn by a user in a communication mode.

As the housing 132, and thus the first tube 24a, is rotated relative to the case 22 to the second position (corresponding with the second protrusion 134b), the first tube 24a is rotated to the communication or secondary extended position of FIG. 4 in which the microphone 48 (or the ear mold 44 through which audio input is delivered to the microphone 48' carried in the case 30) is in close proximity to the user's jaw/mouth. The switching device 130 generates a signal to the microcontroller 36 indicative of this positioning, with the microcontroller 36 being programmed to automatically operate in the communication mode in response to this signal. For example, the microcontroller 36 can "activate" the microphone 48, 48', pause delivery of music, and initiate cell phone operations in which audio outputs are directed from the wireless communication means and delivered to only the second speaker 34.

Finally, as the housing 132 is rotated to the third position (corresponding with the third protrusion 134c), the first tube 24 is rotated so as to place the corresponding ear mold 44 in the user's ear 96 (e.g., FIG. 3A). The switching device 130 generates a signal indicative of this third position, with the microcontroller 36 programmed to automatically operate in the listen-only mode in response to this signal. For example, the microcontroller 36 can deactivate the microphone 48, 48' and operate both of the speakers 32, 34 to generate sounds.

Notably, operational modes differing from those described above can be implicated by the settings/protrusions 134a-134c. Also, a wide variety of other configurations can be employed for the switching device 130. For example, the housing 132 can be axially slidable relative to the case 22 and define two or more discrete positions that otherwise correspond with desired operational modes. Alternatively, the desired operational mode can be initiated by a user via a touch control surface, a display integrated into the device 20, speech recognition programs, etc. In other embodiments, the switching system 130 can be eliminated.

Figure 7A:
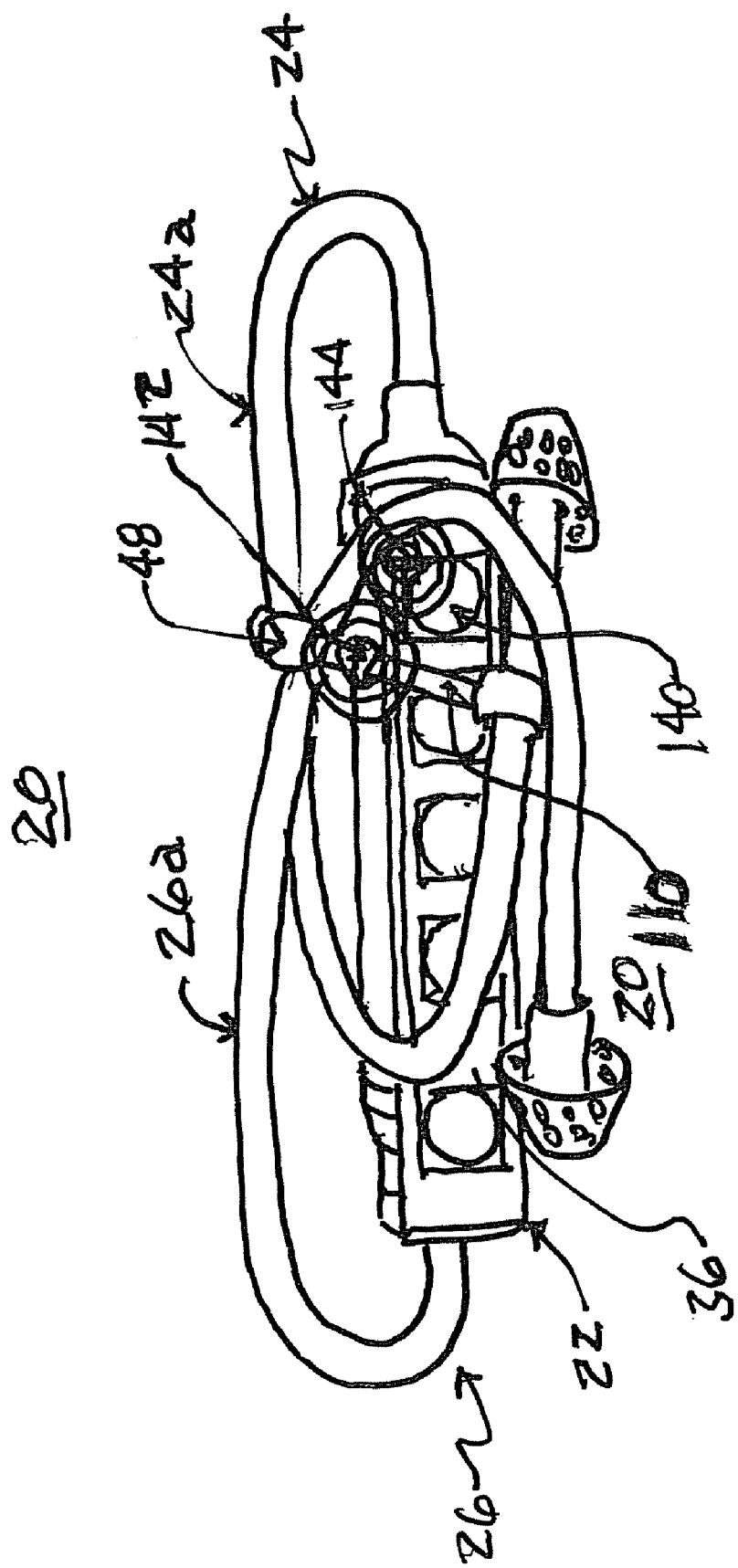
FIG. 7A is a rear view of the device of FIG. 1A in a storage state and illustrating components of an optional sensor system.
Figure 7B:
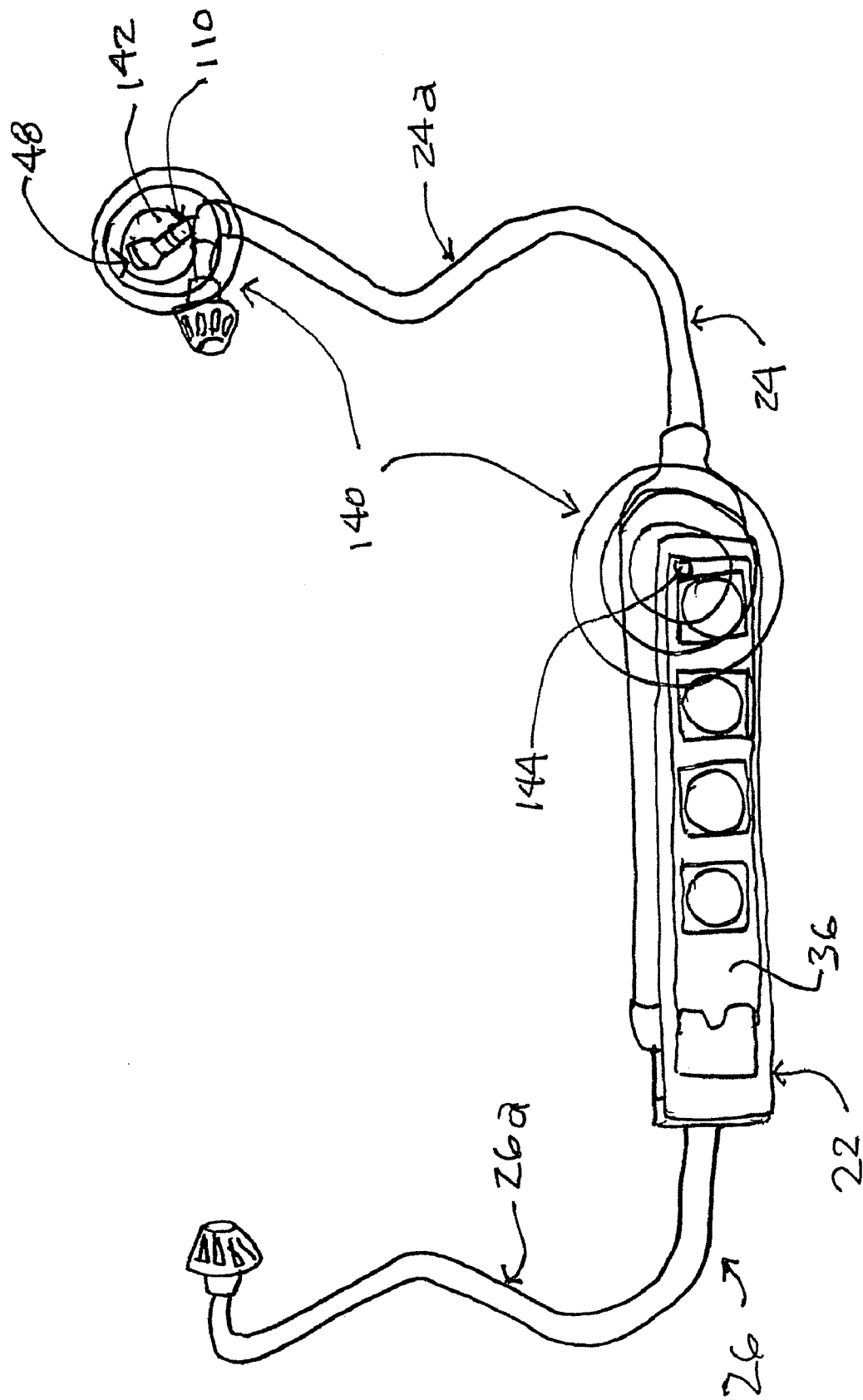
FIG. 7B is a rear view of the device of FIG. 7A in a deployed state.

In addition or an alternative to the above-described operational mode indicators, the device 20 can incorporate a sensor system that directs the microcontroller 36 to automatically "power down" the device 20 when not in use. For example, and as best shown in FIG. 7A a sensing system 140 can be provided that includes a transmitter component 142 and a detector component 144. The components 142, 144 combine to provide proximity-type sensing whereby the detector component 144 will "sense" the transmitter component 142 when the transmitter component 142 is located in close proximity to the detector component 144. With this in mind, the transmitter component 142 can be a metal ring or similar body attached or otherwise connected, molded or placed into one of the tubes 24a, 26a or the optional auxiliary tube 110 (as shown in FIG. 7A). The transmitter component 142 can be powered (via, for example, a separate wire) or can be an un-powered device. The detector component 144 is maintained by the case 22 and is electronically connected to the microcontroller 36. Further, the detector component 144 can be powered (via the power source 30). With this construction, when the corresponding tube 24, 26, or 110 (where provided) is in the collapsed state as shown, the detector component 144 will "sense" presence of the transmitter component 142 (schematically reflected by circles in FIG. 7A), and generate a corresponding signal to the microcontroller 36. In response, the microcontroller 36 is programmed to automatically operate in a "power off" "sleep," or "monitoring incoming communications" mode during periods of non-use. As the transmitter component 142 is moved away from the detector component 144 (i.e., the first tube 24a transitioned to an extended state as shown in FIG. 7B), the detector component 144 will no longer signal that the device 20 is in the collapsed state, allowing the microcontroller 36 to operate in the mode selected by the user. Alternatively, a number of other sensor system designs can be employed. In yet other embodiments, the sensor system 140 can be eliminated.

Figure 8B:
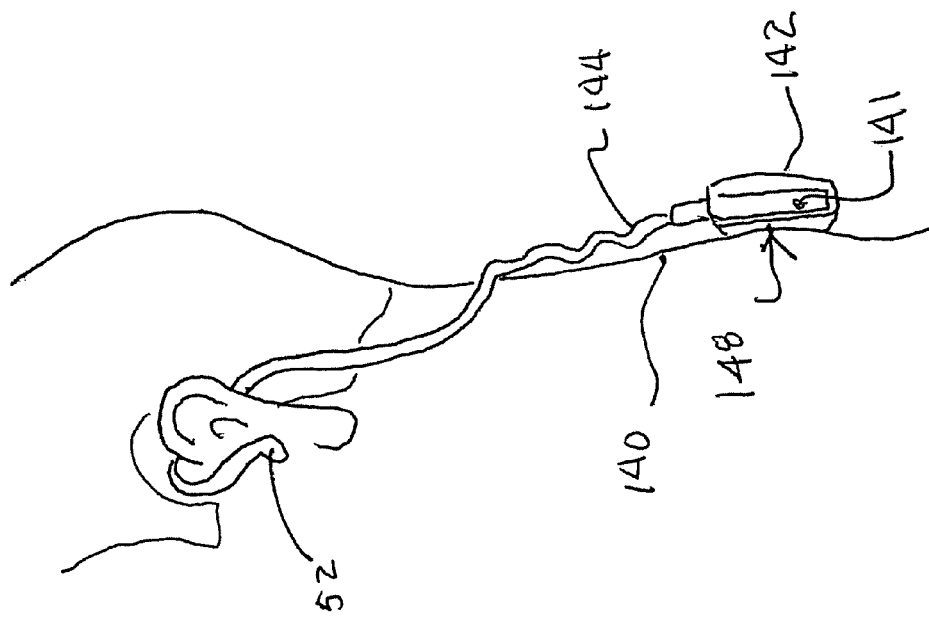
FIG. 8 is a schematic illustration of a user interface useful with the device of FIG. 1A.
Figure 8A:
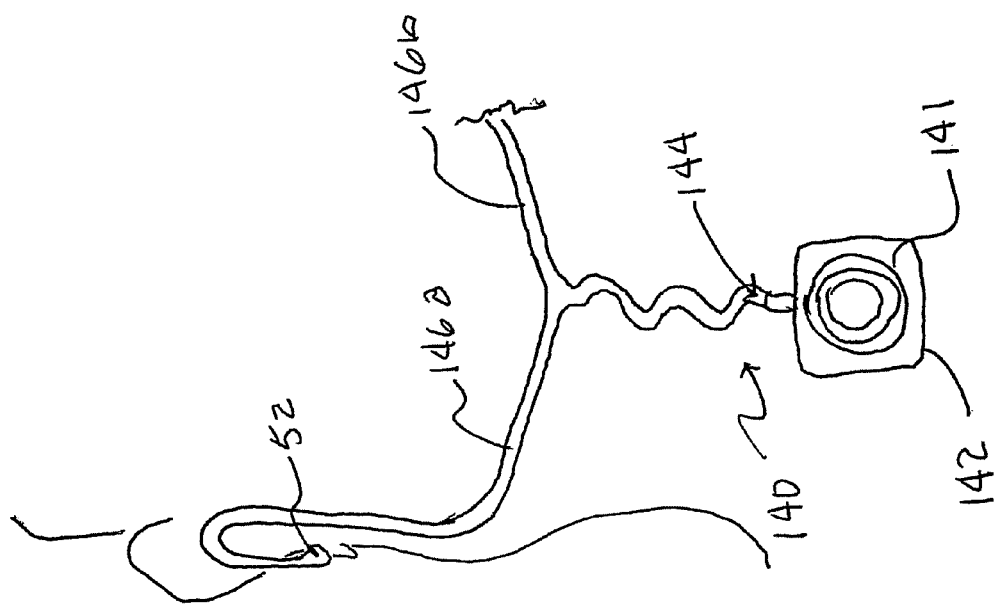

In addition to the microcontroller 36 (and corresponding circuit board) described above, the device 20 can include a number of other electronic-related components such as a Bluetooth/cell phone connector, a USB port/dock, an antenna, a flash memory, etc. In addition, the device 20 can include the user interfaces 120 as described above. In yet other embodiments, the user interfaces 120 can be provided as part of, or replaced with, a differing user interface assembly, such as a linear touchpad as described, for example, in U.S. patent application Ser. No. 10/999,168 filed Nov. 28, 2004 and entitled "Mobile, Hand-Held Personal Computer," the teachings of which are incorporated herein by reference. One exemplary linear touchpad arrangement 150 is shown in FIG. 8, and includes a series of interconnected pads 152. The pads 152 are readily perceived by a user when running his or her finger along the touchpad 150. With this in mind, the microcontroller 36 can be programmed to perform various, predetermined operational modes or routines in response to simultaneous user interaction with two (or more) of the pads 152. For example, simultaneous touching of two of the pads 152 can effectuate playing of certain, pre-selected music programs or styles, whereas other applications can be initiated via a combination of two different pads 152. Alternatively, the linear touchpad 150 can assume other forms and/or can be eliminated. For example, the user interface 120 can be a display screen that displays information generated by the microcontroller 36.

Figure 9A:
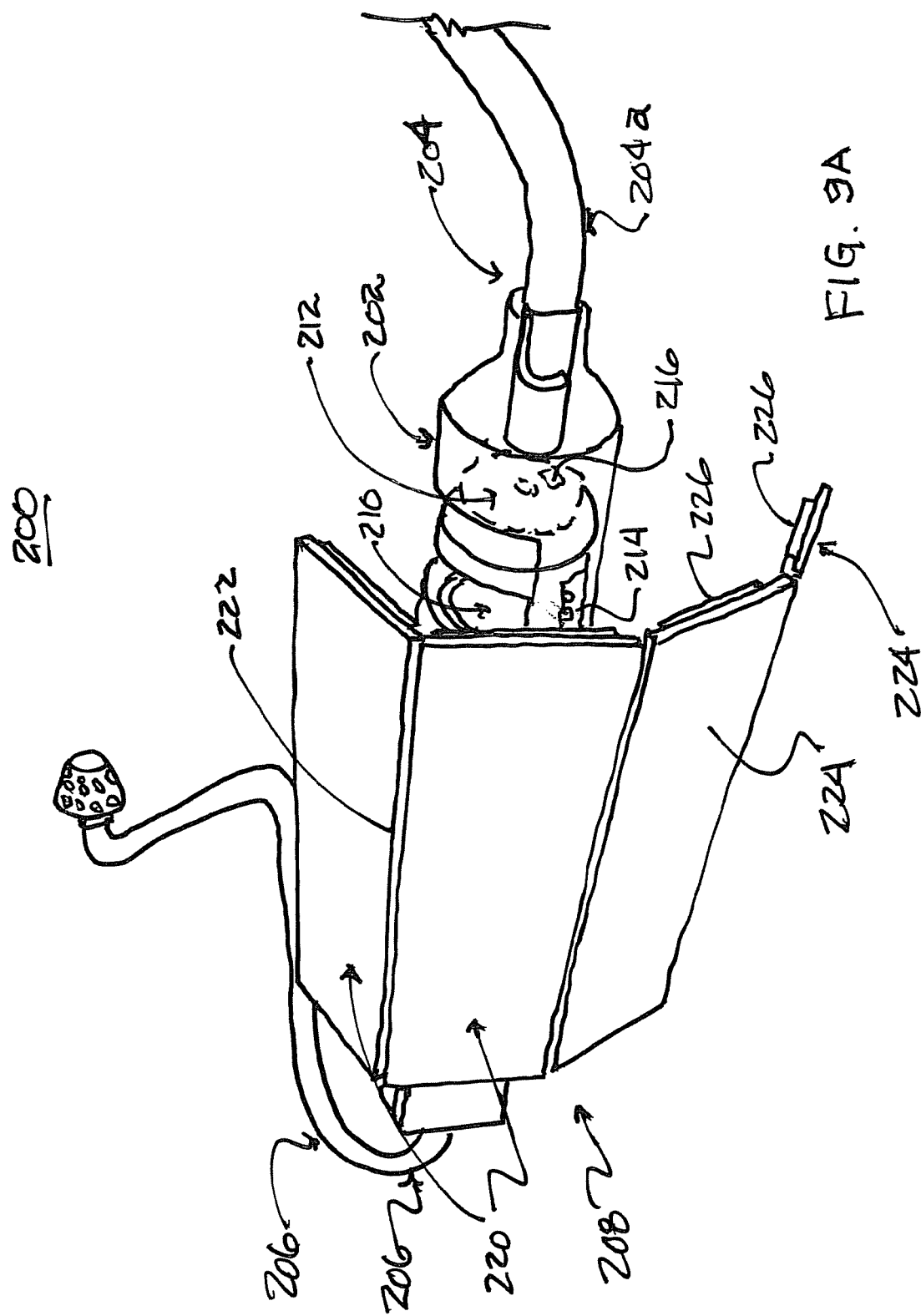

In yet other embodiments, a display screen or screens can be provided that wrap about a portion or entirety of the case 22. For example, FIG. 9A illustrates a portion of an alternative mobile personal audio device 200. The device 200 is akin to the device 20 (FIG. 1A) previously described, and includes a case 202, opposing first and second stem assemblies 204, 206, and a display system 208. The stem assemblies 204, 206 extend from the case 202 and can be identical to the stem assemblies 24, 26 (FIG. 1A) as previously described. Thus, the stem assemblies 204, 206 each include a tube 204a, 206a, respectively. Further, the case 202 maintains various other components, such as a power supply (e.g., battery) 210, speakers 212 (one of which is shown in FIG. 9A), and a microcontroller 214 (referenced generally). The display system 208 is assembled to the case 202, and is constructed and operates as described below. Optional LED devices 216 (one of which is shown in FIG. 9A) are also included, and serves to illuminate the corresponding tubes 204a, 206a to provide a distinct appearance or safety lighting (it being noted that LED 216 can be provided with any of the other audio devices of the present disclosure).

The display system 208 can assume a variety of forms, and in some embodiments includes a plurality of panel units 220 that are flexibly connected to one another (e.g., at living hinges 222) to effectuate a wrapped construction or arrangement about the case 202. In fact, in other embodiments, the panel units 220 collectively serve as an encasement for the other components (e.g., the power supply 210), such that the case 202 can be greatly reduced or eliminated. Alternatively, the panel units 220 can be discrete components, separately assembled to the case 202. Regardless, each of the panel units 220 includes a display screen 224 and a circuit board 226. The display screen 224 can be an Organic Light Emitting Display (OLED) device, although other low power display devices are also acceptable. The circuit board 226 provides circuitry adapted to operate the display screen 224 as well as to, in some embodiments, generate touch-sensitive zones along the display screen 224. With this construction, each of the panel units 220 provides a touch screen user interface, with user-entered input(s) being processed and acted upon by the microcontroller 214 (via electrical connection to the corresponding circuit board 226).

Figure 9C:
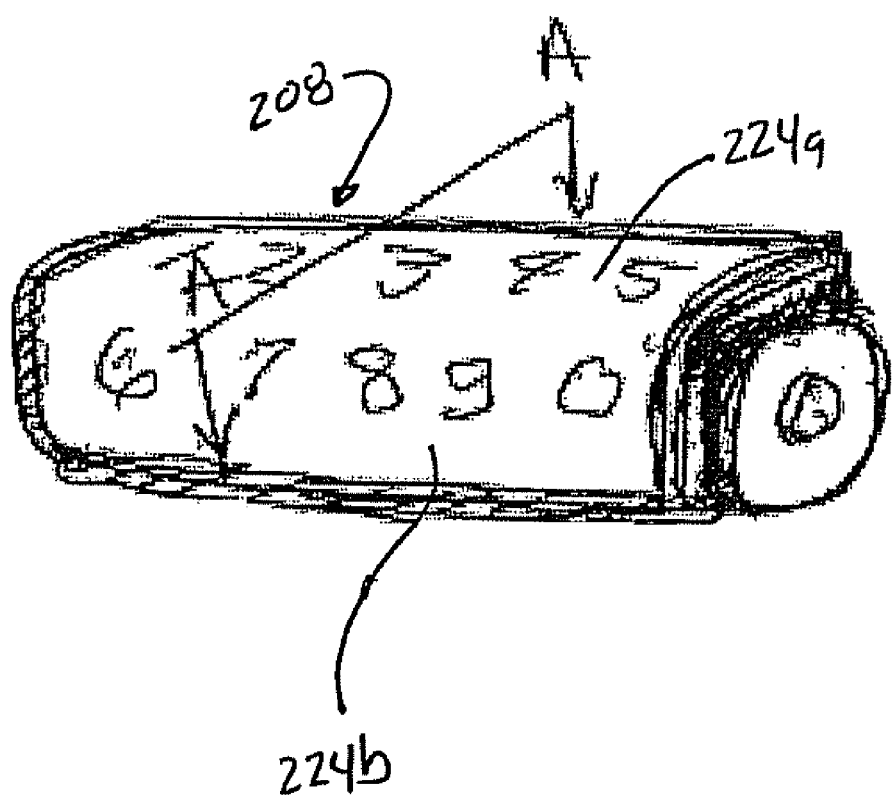
Figure 11A:
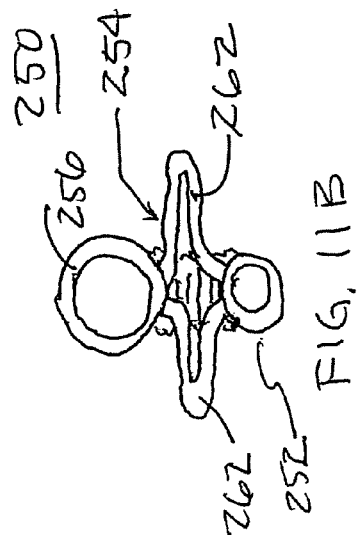
FIGS. 11A-11D are side views of an embodiment stem assembly useful with the audio devices of the present disclosure.
Figure 11B:
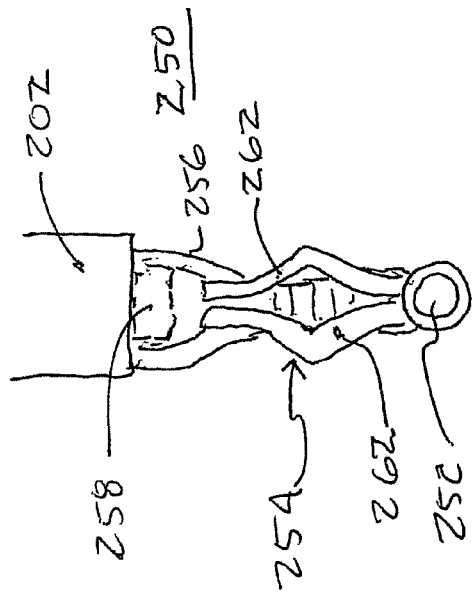
Figure 11C:
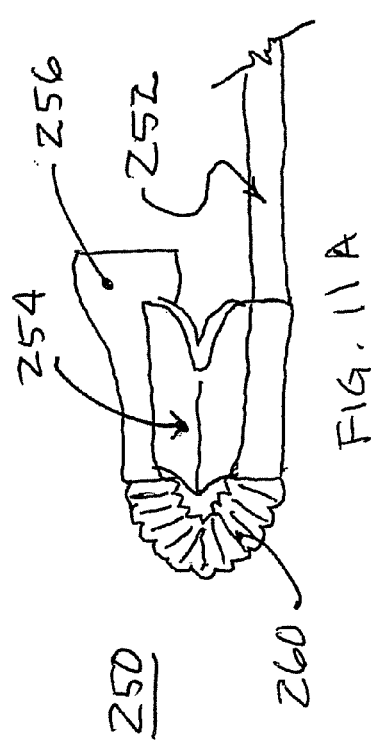
Figure 11D:
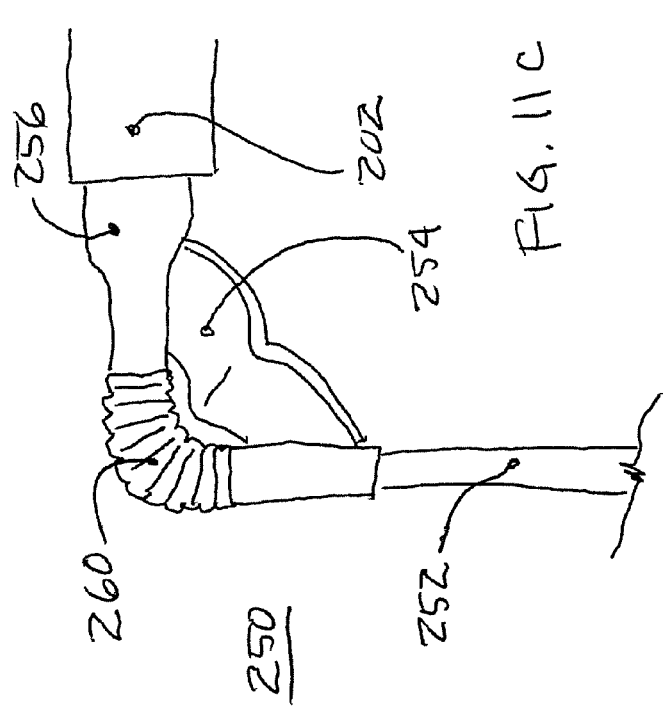

While FIG. 9A illustrates the device 200 as including four of the panel units 220, any other number, greater or lesser, is also envisioned. With the but one acceptable configuration illustrated, however, upon final assembly the display system 208 encompasses the case 202 as shown in FIG. 9B. In some embodiments, the panel unit(s) 220 provide a continuous, wrapped appearance upon final assembly. During use, the device 200 is worn and operated by a user as previously described. In this regard, the display system 208 operates to display various information to the user, as well as serving as a convenient user interface. In fact, in some embodiments, personal computer-type functioning can be provided. The individual panel units 220 can be operated independently of one another, or can provide a coordinated display and/or or user interface. For example, FIG. 9C illustrates one example of a coordinated display interface whereby a continuum of related, designated touch receptor zones (e.g., indicating user selection of a number from 1-10) is generated along two adjacent display screens 224a, 224b. A plethora of other display/user input appearances/operations can also be provided.

To better promote protection and/or viewing of one or more of the display screens 224 when the device 200 is in the storage state, the stem assemblies 204, 206 can employ an additional wrapping feature as shown in FIG. 10. More particularly, the tube 204a, 206a are formed to include a spiral segment 240 adjacent the case 202. The spiral segment 240 imparts a shape memory attribute to the corresponding tube 204a, 206a, creating a natural affinity for the tube 204, 206 to "automatically" revert to the collapsed state (reflected by dashed lines in FIG. 10) in the absence of an external force (e.g., when the device 200 is not being worn). The spiral segments 240 better ensure location of the tubes 204a, 206a away from one or more of the "outside" display screens (e.g., the display screens 224a and 224b in FIG. 10), and also provide cushioning and surface protection for the display screens 224 when the device 200 is stored, for example, in a user's pocket. The spiral segments 240 permit user movement of the tubes 204a, 206a to the extended state (reflected by solid lines in FIG. 10), and at least in part create the curved collapsing tension effects previously described.

A related wrapping feature or coupling device in accordance with the present disclosure is shown in FIGS. 11A-11D. A portion of a stem assembly 250 useful with any of the personal mobile audio devices of the present disclosure is provided, and includes a tube 252 and a tensioning web 254. A first end 256 of the tube 252 is attached to the case 202, and is "open" to a speaker (drawn generally at 258 in FIG. 11D). The tube 252 forms a flexible segment 260, with the tensioning web 254 being attached (or molded) to the tube 252 at opposite sides of the flexible segment 260. The tensioning web 254 can be formed of rubber and includes one or more walls 262 (FIGS. 11B and 11D) that, while flexible, are substantially inelastic and naturally revert to the retracted shape of FIGS. 11A, 11B, biasing the tube 252 to the collapsed state as shown. When an extension or deflection force is imparted onto the tube 252 (e.g., a user attempting to "unfold" the tube 252 for use), the tensioning web 254 permits this desired movement to the position of FIGS. 11C and 11D. When worn, the web 254 tensions the tube 252 against the user's face as above. Once this force is removed, however, the tensioning web 254 self-transitions the tube 252 back to the collapsed state of FIGS. 11A and 11B.

Figure 12:
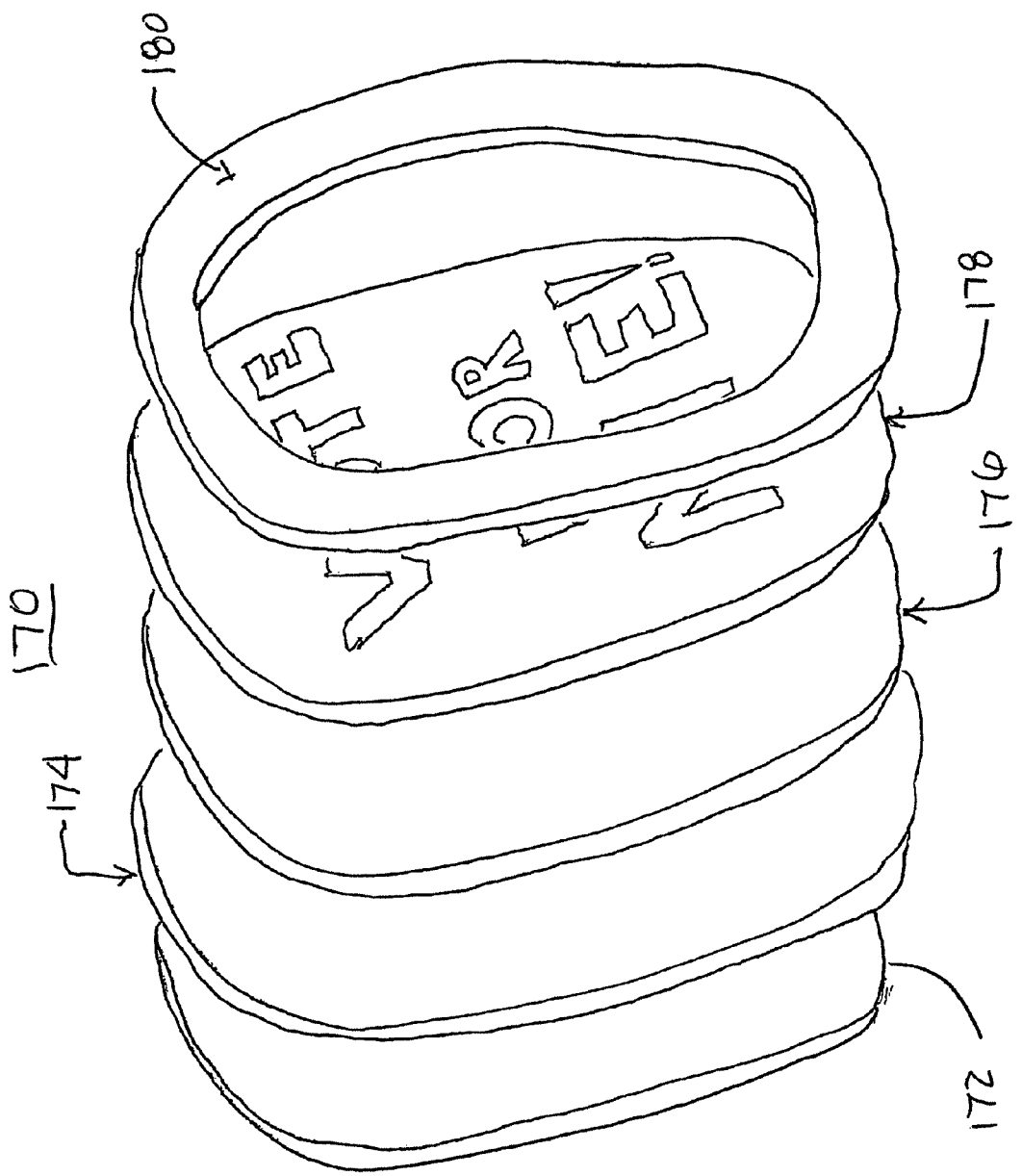
FIGS. 12A-12C illustrate another mobile personal audio device in accordance with principles of the present disclosure and in different modes of operation.
Figure 12B:
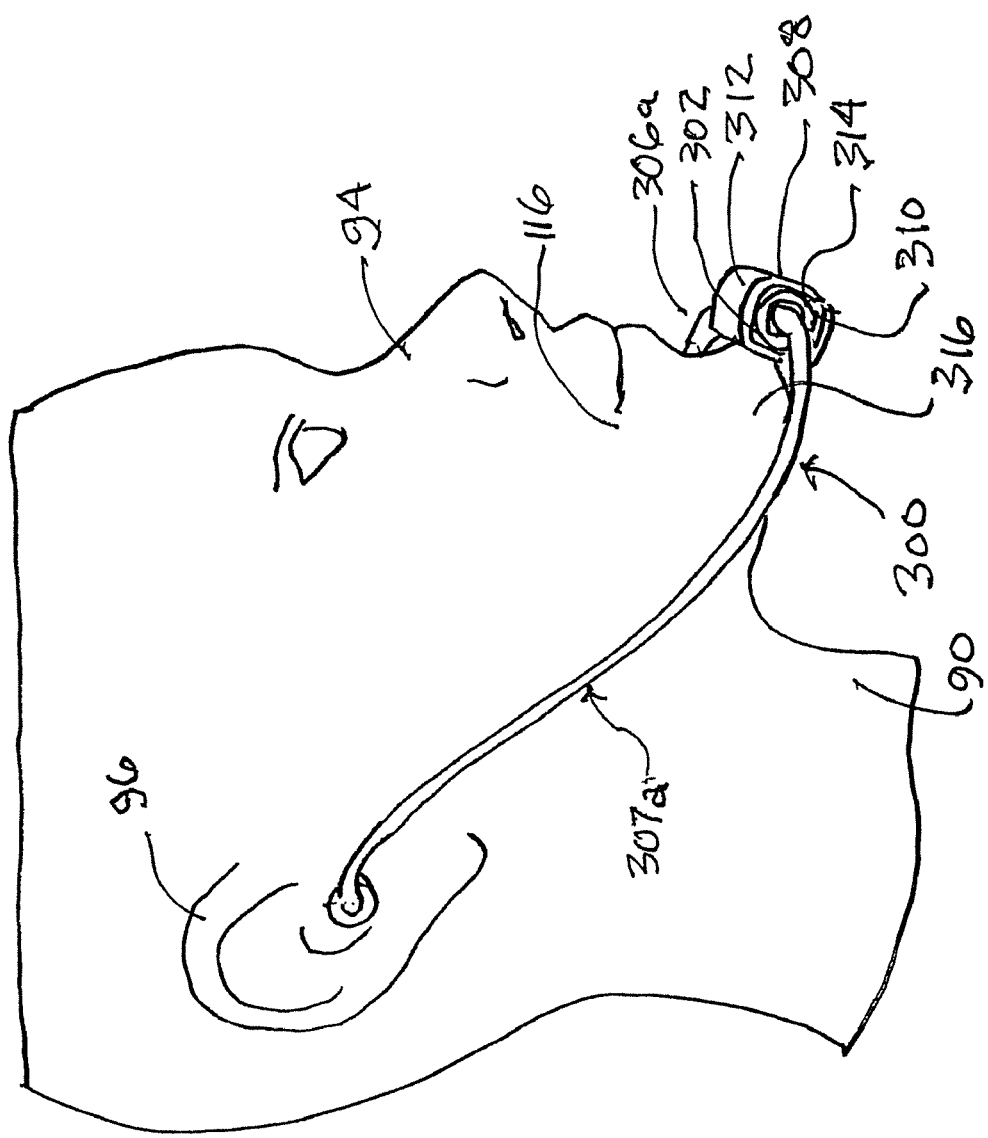

Regardless of an exact design of the stem assemblies, while the mobile personal audio device 20 (FIG. 1A), 200 of the present disclosure has been described for "wearing" along a back of the user's head or neck, in other configurations, a front-worn application is envisioned. For example, FIGS. 12A-12C illustrate an alternative mobile personal audio device 300 in accordance with the present disclosure and adapted for wearing/operation at the front of the user's neck 90 and/or face 94.

The device 300 is akin to the devices 20, 200 previously described, and includes a case 302, opposing first and second stem assemblies 304, 306, and a display system 308. The stem assemblies 304, 306 extend from the case 302 and can be identical to the stem assemblies 24, 26 (FIG. 1A) previously described. Further, the case 302 maintains various other components that are hidden in the views, including a power supply (e.g., battery), speakers, and a microcontroller. Further, FIG. 12B references generally a microphone 310 that is maintained by the case 302, alternatively by one of the stem assemblies 304 or 306, or an auxiliary tubing (not shown).

The display system 308 is akin to the display system 208 (FIGS. 9A and 9B), and generally includes one or more display screens 312 (e.g., OLED) wrapped about or defining the case 302. One or more circuit boards 314 are operated by the microcontroller (not shown) to dictate information displayed on the screen(s) 312.

During use, the device 300 can operate in multiple modes. With specific reference to FIG. 12A, the device 300 is worn by a user by placing the case 302 at a front of the user's neck 90 or face 94, with respective tubes 304a, 306a of the stem assemblies 304, 206 extending to a respective one of the user's ears 96. In the position of FIG. 12A, the case 302 is generally away from the user's face 94, and the device 300 can operate in a music (or audio-only) mode as previously described. The microphone 310 (FIG. 12B) is deactivated, with music/audio being generated at the speakers (not shown) and to the user's ears 96 via the tubes 304a, 306a.

In a communications mode as reflected in FIG. 12B, the case 302, and thus the microphone 310 maintained thereby, is moved toward the user's mouth/jaw 116 and the microphone 310 is "activated." With some constructions, the tubes 304a, 306a and the case 302 are constructed and positioned such that the case rests on a chin 316 in the communications mode. Regardless, the microphone 310 is in close proximity to the user's mouth/jaw 116 and is thus able to sense or collect sound waves generated by the user when talking, with the device 300 operating as a cell phone or as a wireless cell phone interface as previously described.

In the display mode of FIG. 12C, the case 302 is rotated toward the user's eyes 318. A separate support device (not shown) can be included, or the user can simply hold the device 300 in the position of FIG. 12C with his or her hand(s).

Regardless, the screen(s) 312 are in a line of sight of the user's eyes 318, and the device 300 operates to display information/content. The microphone 310 (FIG. 12B) can be active or deactivated in the display mode. The format of the displayed information can vary; in some embodiments, the case 302 can be rotated (relative to the tubes 304, 306) to allow an entirety of the "wrapped" display to be viewed. Even further, the microcontroller (not shown) can be programmed to automatically scroll an image displayed on the screen(s) 312 based upon a level the case 302 is held relative to the user (e.g., the device 300 can incorporate a point of reference sensor that signals elevational information relative to earth).

The device 300 can include one or more user input devices (not shown) through which the user can select a desired mode of operation. In other embodiments, the device 300 can include feature(s) that automatically dictate a mode of operation. For example, the device 300 can include a switching device that automatically implements a particular mode of operation depending upon a rotational position of the case 302 relative to one or both of the tubes 304, 306 as previously described. Alternatively, one or more proximity-type sensors can be provided that indicate whether the device 300 is in the position of FIG. 12A, 12B, or 12C and prompt the microcontroller to operate in the corresponding mode.

As will be clear from the above, the mobile personal audio device 20 (FIG. 1A), 200 (FIG. 9A), 300 of the present disclosure can effectuate a number of different operational modes desired by users. In simplest form, the device 20, 200, 300 provides a convenient, user-friendly device for listening to digital music (e.g., listen-only mode) or with an integrated cell phone. It yet other formats, the device 20, 200, 300 serves solely as a communication device or wireless cell phone interface. In other, preferred formats, the device 20, 200, 300 further facilitates Bluetooth communications with a separate cell phone held by the user (e.g., communication mode). In further embodiments, the modes of operation can include simultaneous playing of music in the communication mode at a desired volume level.

Another embodiment of a mobile personal audio device in accordance with aspects of the present disclosure shown at 400 in FIGS. 13A and 13B. In general terms, the device 400 is adapted to provide and be transitionable between a wearable format (FIG. 13A) and a handheld format (FIG. 13B), as well as to operate in different modes corresponding with the selected format. For example, in the wearable format or extended state, the device 400 is conveniently wearable by a user (reflected in FIG. 14A), and can operate to delivery audio inputs (e.g., music, spoken instructions, and messages, etc.) to both of the user's ears (stereo and/or mono). Additionally, in the handheld format or collapsed state, the device 400 can conveniently be held in a single hand of the user (reflected in FIG. 14B), and can operate to facilitate audio communications (e.g., wireless cell phone interface). Further, in the collapsed state, the device 400 is conveniently storable (e.g., in the user's pocket on the user's waist or belt, etc.). In other embodiments described below, the mobile personal audio device of the present disclosure provides a partially collapsed state in which the device can be held in a single hand of the user, with a display portion of the device in front of the user's face and an audio input extended toward the user's mouth (e.g., FIG. 25D).

With the above general description in mind, the mobile personal audio device 400 includes, in some embodiments, a base 402, a first stem assembly 404, and a second stem assembly 406. Details on the various components are provided below. In general terms, however, the base 402 maintains various other components useful for producing and/or processing audio-related inputs and outputs. Some or all of these components are hidden in the view of FIGS. 13A and 13B, and include a power source and a microcontroller or microprocessor as described above. Regardless, the first stem assembly 404 is attached to, and extends from, a first side 410 of the case 402, whereas the second stem assembly 406 is attached to, and extends from, a second side 412 of the case 402. Speakers (not shown) are provided for both of the stem assemblies 404, 406 (e.g., the speakers are maintained by the base 402 and/or by the respective stem assemblies 404, 406), and are controlled by the microprocessor. Further, the device 400 includes a microphone (not shown) for sensing sounds at the first stem assembly 404. In the extended state (FIG. 13A), the device 400 can operate to generate sounds at both of the stem assemblies 404, 406. Conversely, in the collapsed state (FIG. 13B), the device 400 can operate to generate sounds at the second stem assembly 406, while collecting audio input at the first stem assembly 404. Further, in other configurations, the device 400 is adapted such that when the second stem assembly 406 is in the collapsed state and the first stem assembly 404 is in the extended state, audio input can be received at the first stem assembly 404 while a display is present to the user (e.g., FIG. 25D as described below).

The mobile personal audio device 400 can assume a variety of forms apart from those shown and described in the figures, commensurate with previous descriptions. Even further, features described in U.S. Pat. No. 7,312,981 entitled "Mobile, Hand-Held Personal Computer," the teachings of which are incorporated herein by reference, such as a drawer and/or swappable modules, can be provided with the device 400.

In some embodiments, an ability of the device 400 to satisfactorily operate as a wearable device in delivering audio to the user's ears, as well as a handheld device in providing wireless communication is a function of the sizes and shapes of various components. For example, the base 402 includes a case 420 within which various components (e.g., microprocessor, speakers, etc.) are maintained. The stem assemblies 404, 406, in turn, each include a tube or stem 422, 424 that extends from the case 420, terminating at an audio interface piece 426, 428, such as an ear mold. As best shown in FIG. 14A, in the wearable format or extended state, the case 420 is sized for convenient placement behind a user's head or neck, with the stems 422, 424 (it being understood that the stem 424 is hidden in the view of FIG. 14A) extending a sufficient length from the case 420 to conveniently position the corresponding audio interface piece 426, 428 within a corresponding one of the user's ears. Alternatively, the device 400 can be worn with the case 420 in front of the user's neck, as shown in FIG. 14C. Conversely, in the handheld format or collapsed state (FIG. 13B), the audio interface pieces 426, 428 are located relative to the case 420 at positions convenient for use in a manner similar to a telephone handset (or conventional handheld cell phone) as shown in FIG. 14B.

Requirements for the above applications can be achieved by the single device 400 of the present disclosure by incorporating the specific selection of lengths in each of the three parts of the device 400 as derived from human form factor standards. The length and shape, as typified in the drawings, combine to create appropriate form and distance to meet both the ear-to-ear (FIGS. 13A and 14) and ear-to-mouth (FIGS. 13B and 14B) distances. They also provide quick reformatting for automated closure formats in one, easily modified device. The human form factor embodied by the dimensions of the case 420 and the stems 422, 424 are based on typical adult human head and neck characteristics including width of neck and/or distance between ears, distance from ear to mouth, and length of neck. For example, the length of the case 420 is not longer than the standard distance between the ears of an adult, as identified in human form factor standard references. Further, the stems 422, 424 are long enough to reach the user's ears with the case 420 maintained behind the user's neck/along the back of the user's neck, yet not longer than the standard distance between the shoulder and ear of an adult (i.e., e.g., typical distance between the right ear and the right shoulder of an adult, as identified in human form factor standard references) such that the device 400 can be worn in a comfortable hanging position, but yet not too long to cause the case 420 to contact the user's shoulder with turning movement of the user's head/neck. Further, the length of the stems 422, 424 (as well as a position of the stems 422, 424 relative to the case 420) is selected such that in the collapsed state, a distance between the audio interface pieces 426, 428 is commensurate with typical distance between the ear and mouth of an adult, as identified in human form factor standard references. In alternative constructions, the device 400 can include a plurality of interchangeable, different length stems that are easily assembled to the case to better accommodate a large or small user. The same measurement standards apply to a front viewing position or dictation mode as described below with reference to FIG. 25D. In general terms, the distance for achieving the minimal acceptable focal length for the user viewing a display provided with the base 402 is met by the length of the extended audio stem when the end of the stem is located by the user's mouth. These same format/size features can be incorporated into any of the mobile audio device embodiments of the present disclosure.

With the above constraints in mind, one embodiment of the base 422, as well as a portion of the first stem assembly 404 is shown in greater detail in FIG. 15. As referenced above, the base 422 includes the case 420 that maintains a power source 430 (e.g., battery), a microcontroller 432, a first speaker 434, a user interface 436, and a sensor system 438 (referenced generally). The microcontroller or microprocessor 432 is powered by the power source 430, and controls operation of the first speaker 434. In this regard, the first speaker 434 is arranged to direct generated sound waves to the first stem assembly 404, and in particular the stem 422. Though not shown in FIG. 15, the base 402 can further include a second speaker similarly controlled by the microcontroller 432 and positioned within the case 420 to direct generated sound waves to the stem 424 of the second stem assembly 406 (FIG. 13A). The user interface 436 is electronically coupled to the microcontroller 432 and can assume a variety of forms as described below. Finally, the sensor system 438 can also assume a variety of forms described below; in the one embodiment of FIG. 15, the sensor system 438 includes a switch 440 that projects from the case 420 and is electronically coupled to the microcontroller 432 to initiate various operational activities by the microcontroller 432.

The case 420 can be made of various materials and include or form one or more features that promote collapsible connection with the stem assemblies 404, 406 as described below. In addition, the case 420 can incorporate exterior contours that match with contour(s) of the stems 422, 424 to promote a compact arrangement in the collapsed state. To this end, the shape and/or dimensions of the case 420 are selected so as to not interfere with desired transitioning of the stems 422, 424 to the collapsed state.

The microcontroller 432 can also assume a variety of forms appropriate for performing the various audio-related functions described below. For example, the microcontroller 432 can be provided as part of a circuit board 442, and can be programmed to operate in at least a listen-only mode and a communication mode. In some embodiments, the microcontroller 432 can further be adapted (e.g., programmed or software) to perform speech recognition operations, and thus is optionally programmed to operate in a dictation mode.

Returning to FIGS. 13A and 13B, the first and second stem assemblies 404, 406 are, in many respects, identical, such that the following description of the first stem assembly 404 applies equally to the second stem assembly 406. With this in mind, the first stem assembly 404 includes the stem 422 as previously mentioned, along with a coupling device 446 (referenced generally). In general terms, the coupling device 446 pivotably couples the stem 422 relative to the case 420, permitting rotation of the stem 422 between the collapsed state (FIG. 13B) and the extended state (FIG. 13A).

In some embodiments, the stem 422 is akin to the tubes described above, establishing a channel through which audio waves are directed and extending between a first end 450 at which the audio interface piece 426 is mounted and a second end 452 maintained assembled to the coupling device 446. The tubular stem 412 can be formed of various materials (e.g., molded plastic) that are at least somewhat rigid and can be imparted with a shape memory attribute whereby the tubular stem 422 can be deflected from the set shape reflected in FIGS. 13A and 13B and self-transition back to the set shape as described above with respect to FIGS. 1A and 1B.

For example, the tubular stem 422 can form bends 454, 456 that promote desired placement of the corresponding audio interface pieces 426, 428 in the collapsed state for interfacing with one of the user's ears and the user's mouth as reflected in FIG. 14B. For example, with respect to the second stem 424, the bends 454, 456 spatially locate the audio interface piece 428 for placement in the user's ear when the case 420 is held in relatively close proximity to the user's face/cheek. With respect to the first stem 422, the bends 454, 456 spatially locate the audio interface piece 426 in relatively close proximity to the user's mouth while the opposite audio interface piece 428 is simultaneously located in the user's ear (and the case 420 is held in close proximity of the user's face/cheek). In this regard, the case 420 serves as a convenient grasping surface for the user, allowing the user to quickly achieve the conventional, intuitive telephone handset arrangement reflected in FIG. 14B.

As a point of reference, the stems 422, 424 can assume a wide variety of forms differing from those described above. For example, in other embodiments, the stems 422, 424 can have a more solid configuration (e.g., where the corresponding speaker is located or assembled to the stem 422, 424, the stem 422, 424 can be a solid body that encapsulates a wire running from the speaker).

Various embodiments of the coupling device 446 are described in greater detail below. In most general terms, the coupling device 446, in combination with one or more features of the case 420, maintains the corresponding stem 422 in a manner permitting movement of the stem 422 between the extended and collapsed states.

Returning to FIG. 13A, the first stem assembly 404 further includes, in some constructions, one or more microphones (not shown, but generally referenced at 460) at or about the audio interface 426. With this construction, one or more wires (not shown) extend through the stem 422 and electronically connect the microphone 460 with the microcontroller 432 (FIG. 15). Alternatively, the microphone(s) 460 can be carried or maintained by the case 420 (akin to the speaker 434 (FIG. 15) described above; in some embodiments, the speaker 434 serves as both a speaker and a microphone), with the stem assembly 404 directing sound waves received at the audio interface piece 426 through the stem 422 for sensing by the microphone 460. Regardless, the microphone(s) 460 facilitates operation of the device 400 in a communication mode (i.e., in the collapsed state of FIGS. 13B and 14B). For example, the communication mode can entail the device 400 operating as a wireless interface with a cell phone via Bluetooth technology carried within in the case 420 (and/or programmed into the microcontroller 432) or by incorporating cell phone capabilities into the device 400 itself.

Commensurate with the above descriptions, the microcontroller 432 (FIG. 15) is programmed, in some embodiments, to operate differently depending upon the application desired by the user (e.g., a listen-only mode, a communication mode, a standby mode, etc.). For example, in the listen-only mode, the microcontroller 432 operates both of the speakers 434 to generate an audio output that in turn is delivered to both of the audio interface pieces 426, 428 via the corresponding stems 422, 424. Thus, in the listen-only mode, the microcontroller 432 can delivery a high-definition audio output (e.g., stereo) to the user via both of the speakers 434. The formatting of this audio output can be generated by a digital music player-type device (or flash memory) carried within or connected to the case 420. As a point of reference, the listen-only mode of the microcontroller 432 corresponds with the extended state of the stems 422, 424 or the wearable format of the device 400 (FIG. 13A). An optional dictation mode of the microcontroller 432 corresponds with the first stem 422 extended and the second stem 424 collapsed. Optional sensor(s) monitored by the microcontroller 432 direct the microcontroller 432 to operate in the dictation mode. Regardless, the dictation mode can include the microcontroller 432 performing speech recognition operations (as described below with reference to FIG. 25D).

In the communication mode, the microcontroller 432 performs cell phone-type operations, for example controlling use of the internal wireless interface between a user and a separate cell phone device carried by or nearby the user (e.g., via Bluetooth technology incorporated into or connected to the device 400), or controlling use of internal cell phone components carried by the case 420. In the communication mode, then, the microcontroller 432 receives and processes audio input generated by the user at the microphone 460 (via the first stem assembly 404). Further, the microcontroller 432 generates audio output only at the speaker 434 associated with the second stem assembly 406 (and thus the audio interface piece 428 carried by the stem 424). As a point of reference, the communication mode of the microcontroller 432 corresponds with the collapsed state of the stems 422, 424 or handheld format of the device 400 (FIG. 13B). In the communication mode, then, the microcontroller 432 does not generate an audio output at the speaker associated with the first stem assembly 404.

In the standby mode, the microcontroller 432 does not operate the speakers 434 or process possible audio input received at the microphone 460. Instead, the microcontroller 432 operates in a sleep or off state. However, in some embodiments, the microcontroller 432 can be programmed to perform some communications-related features in the standby mode, such as receiving incoming phone calls and/or notifying a user of an incoming phone call with vibration and/or sound.

The device 400 can incorporate various features as part of the sensor system 438 (FIG. 15) that promote automatic transitioning of the microcontroller 432 to or between the listen-only mode and/or the communication mode. For example, the sensor system 438 can include one or more switches or sensors (differing from the switch 440 shown in FIG. 15) that sense whether one or both of the stem assemblies 404 and/or 406 are in the extended state of FIG. 13A and/or the collapsed state of FIG. 13B. For example, proximity sensors can be provided with the base 402 and one or both of the stems 422, 424; in the collapsed state (FIG. 13B), then, the proximity sensors will "sense" the relatively close proximity to one another. Alternatively, the sensor system 438 can incorporate a manual switch that is activated (or deactivated) depending upon a spatial position of one or both of the stems 422 and/or 424 relative to the case 420. Regardless, the switch(es) and/or sensor(s) signal corresponding information to the microcontroller 432. The microcontroller 432, in turn, is programmed to automatically operate in a predetermined mode depending upon the arrangement or format of the stem assemblies 404 and/or 406. For example, where the microcontroller 432 determines, via the sensor system 438, that the stem assemblies 404, 406 are in the extended state of FIG. 13A, the microcontroller 432 will automatically operate in the listen-only mode. Conversely, the microcontroller 432 will automatically operate in the communication mode or the storage mode, as selected by the user, when the microcontroller 432 determines, via the sensor system 438, that the stem assemblies 404, 406 are in the collapsed state.

Other features can be incorporated into the device 400 that facilitate automated operation of the microcontroller 432 in a predetermined mode. For example, and with reference to FIG. 15, with embodiments in which the switch 440 is provided, the switch 440 is positioned such that in the collapsed state of the stem assembly 404, a user-applied squeezing force to the stem 422 (i.e., squeezing the stem 422 toward the case 420) actuates the switch 440, with the microcontroller 432 automatically performing a predetermined operation in response to this actuation. As a point of reference, the stem 422 exhibits sufficient flexibility to slightly deform in response to the squeezing force, and will self-revert to the pre-set shape upon removal of the squeezing force. Thus, the shape memory attribute of the stem 422 permits momentary flexing contact with the switch 440. In response to a signal from the switch 440, the microcontroller 432 can be programmed to automatically perform one or more predetermined actions, such as "answering" an incoming phone call, terminating a current phone call, activating or deactivating a speech recognition feature of the device 400, etc.

Other sensor or switch-based features alternatively incorporated into the device 400 can determine or indicate positioning of the stem assemblies 404, 406 in the extended state (FIG. 13A) and the collapsed state (FIG. 13B). Further, the case 420 can incorporate a twist-type assembly as described above.

Figure 16:
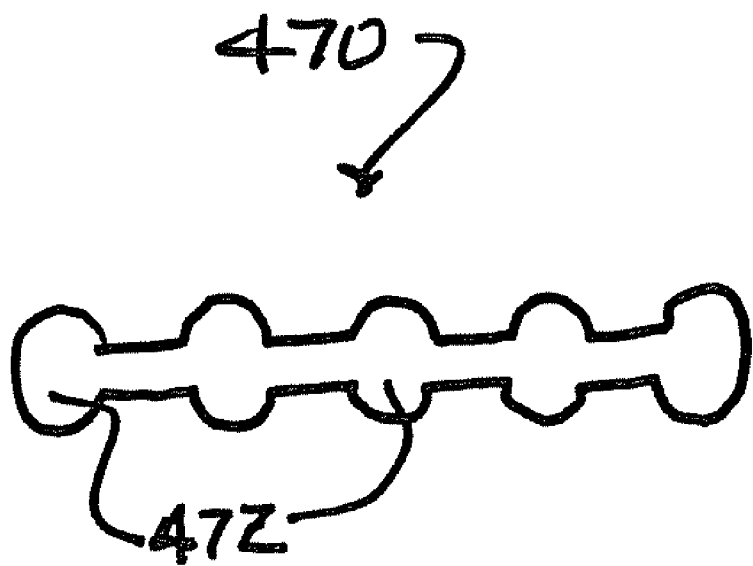
FIG. 16 is a simplified view of a linear touchpad useful with the device of FIG. 13A.

Operation of the microcontroller 432 in a desired mode can be further effectuated via the user interface 436 referenced in FIG. 15. The user interface 436 can assume a wide variety of forms and can, for example, include one or more buttons that are otherwise electronically coupled to the microcontroller 432. In yet other embodiments, the user interface 436 can be, or can further include, a differing user interface assembly such as a linear touchpad as described, for example, in U.S. patent application Ser. No. 10/999,168 filed Nov. 28, 2004 and entitled "Mobile, Hand-Held Personal Computer," the teachings of which are incorporated herein by reference. Once exemplary linear touch pad arrangement 470 shown in FIG. 16, and includes a series of interconnected pads 472 that are formed along the case 420 (FIG. 15). The pads 472 are readily perceived by a user when running his or her finger along the touch pad 470. With this in mind, the microcontroller 432 (FIG. 15) can be programmed to perform various, predetermined operational modes or routines in response to simultaneous user interaction with two (or more) of the pads 472. For example, simultaneous touching of two of the pads 472 can effectuate playing of certain, pre-selected music programs or styles, whereas other applications can be initiated via a combination of two different ones of the pads 102. Alternatively, the linear touch pad 470 can assume other forms and/or can be eliminated. For example, the user interface 436 can be a display screen that displays information generated by the microcontroller 432.

In yet other embodiments, a display screen or screens can be provided that wrap about a portion of entirety of the case 420 as describe above (e.g., FIGS. 9A-9C).

Returning to FIG. 15, and as alluded to above, the coupling device 446 can assume a variety of forms, and in some embodiments, includes a coupling body 480, a pivot pin 482 and a connector 484. The coupling body 480 rotatably mounts the stem 422 with a corresponding component of the case 420 via the pivot pin 482. The connector 484, in turn, serves to maintain a sound wave-transmissive continuity between the stem 422 and the case 420 regardless of a rotational position of the stem 422 relative to the case 420.

Figure 17A:
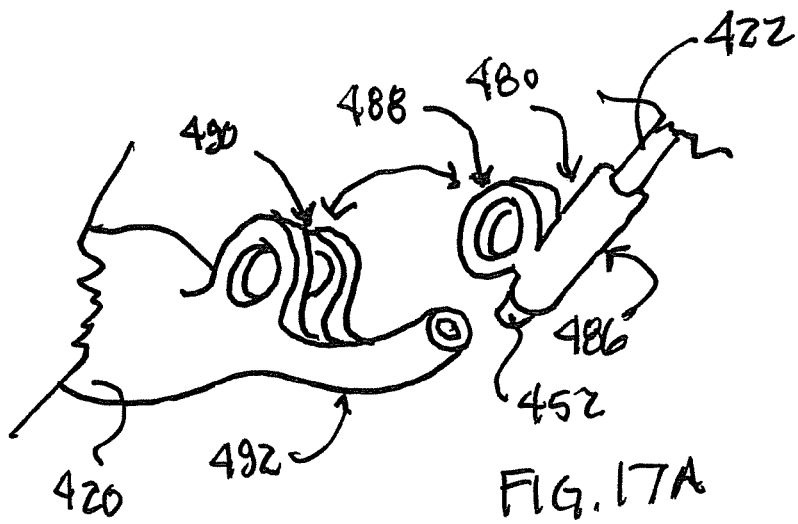
FIG. 17A is an enlarged, exploded view of a portion of the device of FIG. 13A, illustrating assembly between a case component and a coupling device component.

With additional reference to FIG. 17A, the coupling body 480 includes a tubular segment 486 and a ring 488. The tubular segment 486 is sized to coaxially receive and maintain the stem 422 (adjacent the second end 452). The ring 488 extends from the tubular segment 486 and is adapted for assembly to the case 420. More particularly, the case 420 forms one or more hubs 490 (two of the hubs 490 are illustrated in FIG. 17A) sized to matingly receive the ring 488. The pivot pin 482 assembles the ring 488 relative to the hubs 490, such that the coupling body 480 can pivot or rotate relative to the case 420, with the pivot pin 482 establishing a pivot point. Alternatively, a wide variety of other constructions and/or mechanisms can be employed to provide rotatable connection between the stem 422 and the case 420.

Figure 17B:
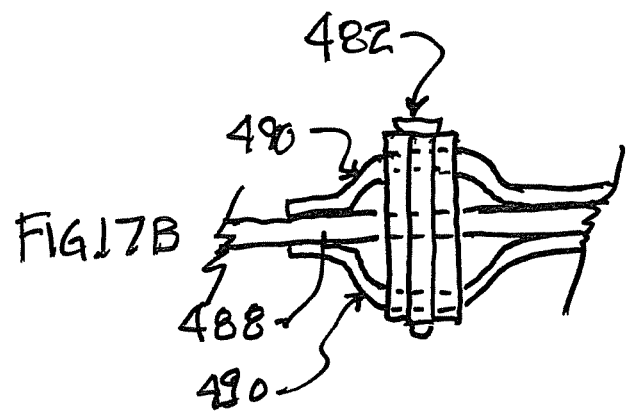
FIG. 17B is a cross-section view of the device of FIG. 15 taken along the lines 17A-7B.

In some constructions, the pivot pin 482 is formed of rubber or similar material. This optional configuration is intended to provide the desired tension of the stem 422 against the user's head (in the wearable format) and automatic device closure or removed from the head. The rubber pivot pin 482 provides tensioning beyond the flexing provided by the shape memory attribute of the stem 422. Optionally, the pivot pin 482 provides the user with the ability to switch the tension induced by the pivot pin 482 via user selection and assembly of the pivot pin 482 having a desired durometer. Further, the removable pivot pin 482 allows a user to quickly change the stem 422 for aesthetics, cleanliness, or size change for best fit or comfort. In this regard, the assembly and tensioning associated with a particular pivot pin can be identified by a color or other indicia. Along these same lines, installation of the coupling device 446 can be easily effectuated, in some embodiments, by incorporating an oversized expansion pin configuration as reflected in FIG. 17B. The pivot pin 482 is placed in an undersized hole in the ring 486 to expand its circumference and fix its position. This maintains the multi-part assembly of the device 400. The rubber pivot pin 482 is installed in the closed or "just past" closed position to provide "automatic" closing tension when the device 400 is removed from the user's head. In some embodiments, the pivot pin 482 has a star shape (FIG. 3) that assists in maintaining a grip of the pivot pin 482 for torque motion and hinge memory toward the closed or collapsed state, and for holding the device 400 to the user's head by "pinning" the ear cavity.

Figure 17C:
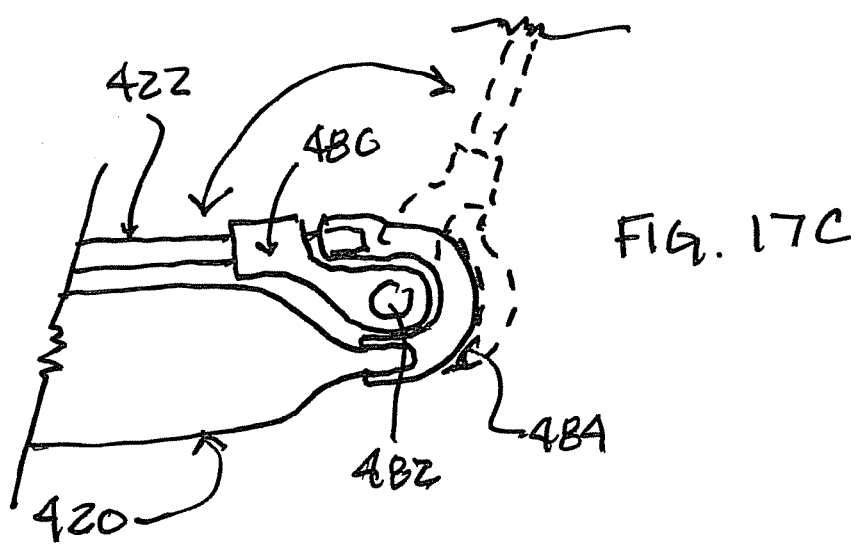
FIG. 17C is an enlarged view of a portion of an alternative coupling arrangement useful with the device of FIG. 13A.

The connector 484 is, in some embodiments, a tube configured for assembly to the second end 452 of the stem 422, as well as to a port 492 formed by the case 420. As best shown in FIG. 15, the port 492 can assume a variety of forms, and generally is a rigid, hollow body having a prescribed curvature. An interior 494 of the port 492 is "open" to the speaker 434 such that sound waves generated at the speaker 434 progress through the interior 494. With this in mind, the connector 484 is sized to be slidably received over the port 482 (alternatively, within the port 482) such that the connector 484 maintains an "open" connection with the interior in both the collapsed state (shown with solid lines in FIG. 15) and the extended stated (shown for the connector 484 with dashed lines in FIG. 15). Thus, sound waves generated at the speaker 434 readily progress through the port 492, the connector 484 and into the channel formed by the stem 422. The connector 484 can be relatively rigid, having a curvature conforming to that of the port 492 to facilitate the sliding interface. Alternatively, and as shown in FIG. 17C, the connector 484 can be flexible, deflecting with movement of the stem 422 yet continuously maintaining the "open" communication between the speaker 434 (FIG. 15) and the channel of the stem 422 in the collapsed state (shown with solid lines in FIG. 17C) and the extended state (shown with dashed lines in FIG. 17C).

Alternatively, the coupling device 446 can assume a wide variety of other forms. For example, a rubber or similarly material ring can be employed for a simple solid pin hinge design using compression. FIG. 18 illustrates an alternative coupling device 500. The coupling device 500 includes a coupling body 502 and a retention ring 504. The coupling body 502 is tubular, configured for assembly to the stem 422 and a port 506 formed by the case 420. The port 506 is similar to the port 492 (FIG. 15) described above, and establishes a continuous opening or passage relative to the speaker 434. The tubular coupling body 502 is sized for slidable assembly over the port 506, and a rigid curvature corresponding with that of the port 506. Finally, the retention ring 504 is akin to a gasket, maintaining an audio sealed relationship between the coupling body 502 and the port 506. With this configuration, then, the coupling body 502 can slide along the port 506, effectively transitioning the stem 522 between the collapsed state (shown with solid lines in FIG. 18) and the extended state (shown with dashed lines in FIG. 18), with an unobstructed passage being at all times maintained between the speaker 434 and the channel of the stem 422. The retention ring 504 serves to prevent overt movement of the coupling body 502 relative to the port 506, as well as to minimize possible loss of sound through the coupling body 502/port 506 interface.

A number of other coupling arrangements of the stem assemblies 404, 406 relative to the base 402 are also envisioned by the present disclosure incorporating a transitioning mechanism differing from the folding approach associated with the previously-described embodiments. For example, FIGS. 19A and 19B illustrate an alternative embodiment mobile personal audio device 520 in accordance with aspects of the present disclosure. The device 520 is akin to the device 400 (FIGS. 13A and 13B) previously described, and include a base 522, a first stem assembly 524, and a second stem assembly 526. The base 502 maintains various components (e.g., power supply, microcontroller, speakers, and optionally one or more microphones). In this regard, the microcontroller is adapted to perform audio applications (i.e., the listen-only mode described above) and communication applications (i.e., the communication mode described above such as a wireless telephone interface) as previously described. The stem assemblies 524, 526 are movably connected to the base 522, and are transitionable from an extended state (FIG. 19A) in which the device 520 can be worn by a user and delivers high definition sound and a collapsed state (FIG. 19B) in which the device 520 is conveniently held in a user's hand and can operate to perform communication operations.

Figure 20A:
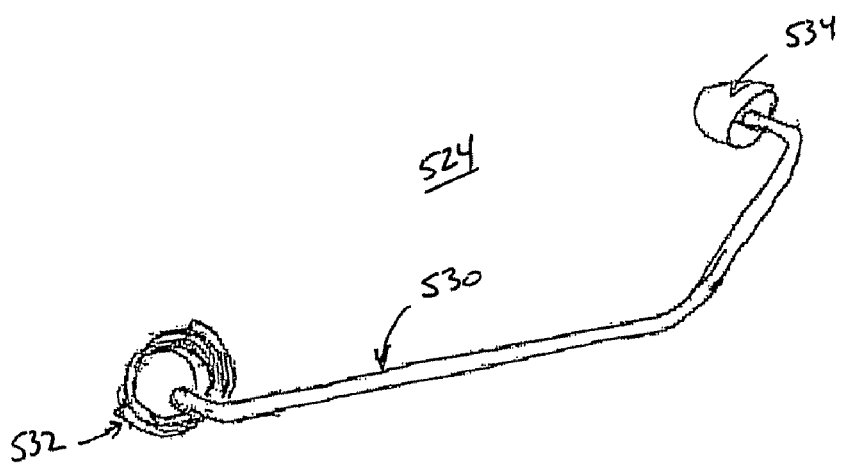
FIGS. 20A-20C illustrate various components of the device of FIG. 19A.
Figure 20B:
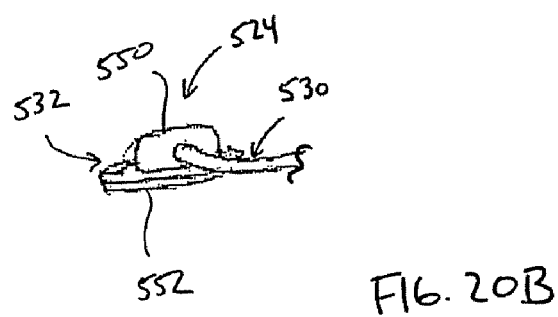

With additional reference to FIGS. 20A and 20B, the stem assemblies 524, 526 can be identical, each including a stem or tube 530 and a coupling device 532. The stem 530 is a tubular body with shape memory attributes, akin to the stem 422 described above. Thus, the stem 530 carries an audio interface piece 534, for example an ear mold, for delivering audio output to, and optionally receiving audio input from, a user. The coupling device 532, in turn is configured to movably connect the stem 530 relative to the base 502.

Figure 20C:
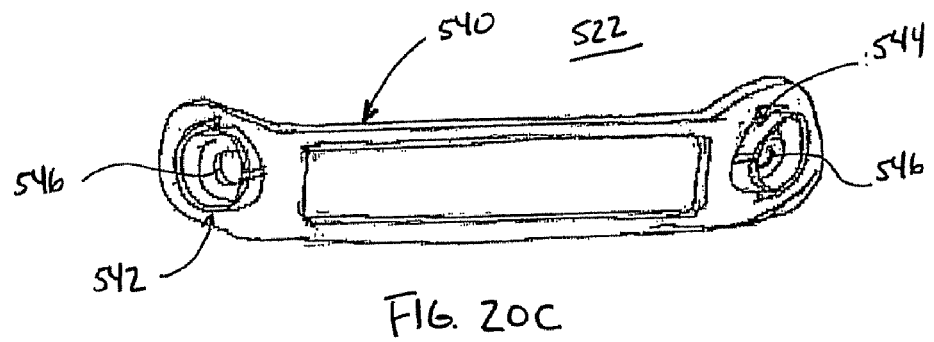

More particularly, and as shown in FIG. 20C, the base 522 includes a case 540. The case 540 forms or includes first and second sockets 542, 544. An aperture 546 is centrally formed within each of the sockets 542, 544, and is otherwise "open" to a speaker (not shown) maintained within the case 540. With this in mind, the sockets 542, 544 are configured to rotatably maintain the coupling device 532 associated with a corresponding one of the stem assemblies 524 or 526. More particularly, the coupling device 532 includes a cone 550 and a flange 552 (best shown in FIG. 20B). The stem 530 is mounted to the cone 550. In this regard, the cone 550 is hollow. Upon assembly of the flange 552 within the corresponding socket 542 or 544, then, a continuous opening is established between the speaker and the channel of the stem 530 via the aperture 546 and the cone 550. Further, the flange 552 is rotatably maintained within the socket 542 or 544 (akin to a John Guest-type swivel connector) thereby allowing the stem assembly 524, 526 to readily move (i.e., rotate) from the wearable, extended state or format of FIG. 19A to the handheld, collapsed state of FIG. 19B. To this end, the case 540 can be contoured or shaped in accordance with a shape of the stems 530 to promote a more compact arrangement of the stems 530 about the case 540 in the collapsed state.

Figure 21:
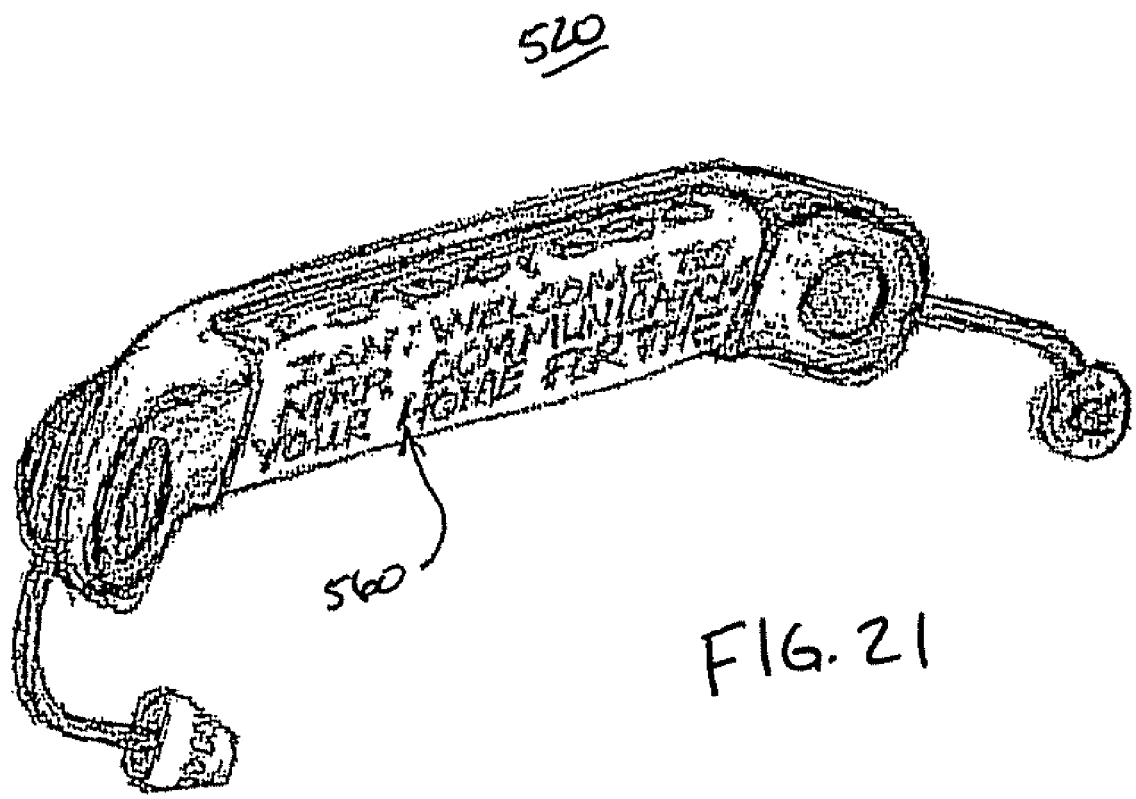
FIG. 21 is a side perspective view of the device of FIG. 19A, illustrating an available display.

The device 520 can further incorporate one or more of the features previously described. For example, the device 520 can optionally include sensor(s) and/or switch(es) that initiate automated operation of the microprocessor (not shown), one or more user interfaces, a display system, etc. For example, FIG. 21 illustrates an example wrapped-type display 560 provided with the device 520.

Figure 22B:
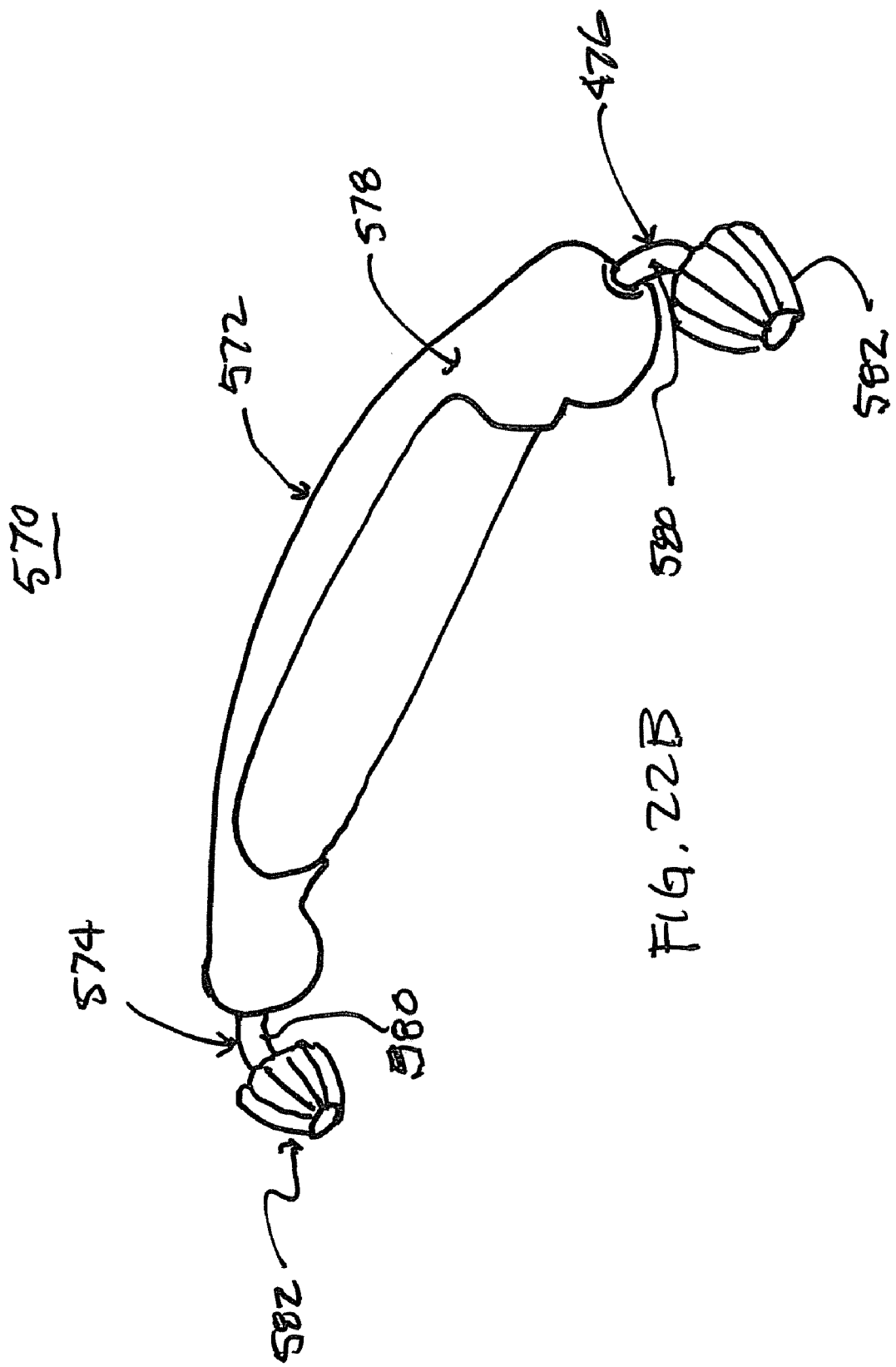
FIG. 22B is a perspective view of the device of FIG. 22A in a handheld, collapsible format.

Yet another embodiment mobile, personal audio device 570 in accordance with principles of the present disclosure is shown in FIGS. 22A and 22B. The device 570 is akin to the device 400 (FIGS. 13A and 13B) previously described and includes a base 572, a first stem assembly 574, and a second stem assembly 576. The base 572 includes a case 578 that maintains various other components described above including, for example, a microcontroller, a power supply, and speakers. The stem assemblies 574, 576 are connected to the case 578, and each include a stem 580 (e.g., a shape-retaining tube) carrying an audio interface piece 582 (e.g., an ear mold). In this regard, the stem assemblies 574, 576 are mounted to the case 578 to be transitionable from an extended, wearable state (FIG. 22A) and a collapsed, handheld state (FIG. 22B). In contrast to previous embodiments, transitioning of the stems 580 between the extended and collapsed states entails sliding extraction or retraction of the corresponding stem 580 within or relative to the case 578.

More particularly, and as best shown in FIGS. 23A-23C, the case 578 forms first and second passages 590, 592 that are sized to slidably receive a corresponding one of the stems 580. The passages 590, 592 are open relative to an exterior of the case 578 at an opening 594. With this in mind, the stem assemblies 574, 576 each include a stop body 596 assembled to the stem 580. The stop body 596 is sized for slidable engagement within a corresponding one of the passages 590, 592, but has an outer dimension greater than that of the opening 594. With this arrangement, the stem 580 cannot be entirely extracted from the case 578 due to contact between the stop body 596 and the case 578 as shown. Regardless, a continuous, open channel is established between a speaker carried by the case 578 and a corresponding one of the stems 580. To better inhibit undesired twisting of the stems 580 relative to the case 578, the passages 590, 592 and the stop body 594 can have a square-like shape in transverse cross-section as illustrated in FIG. 22C, although other configurations are also acceptable.

Figure 24:
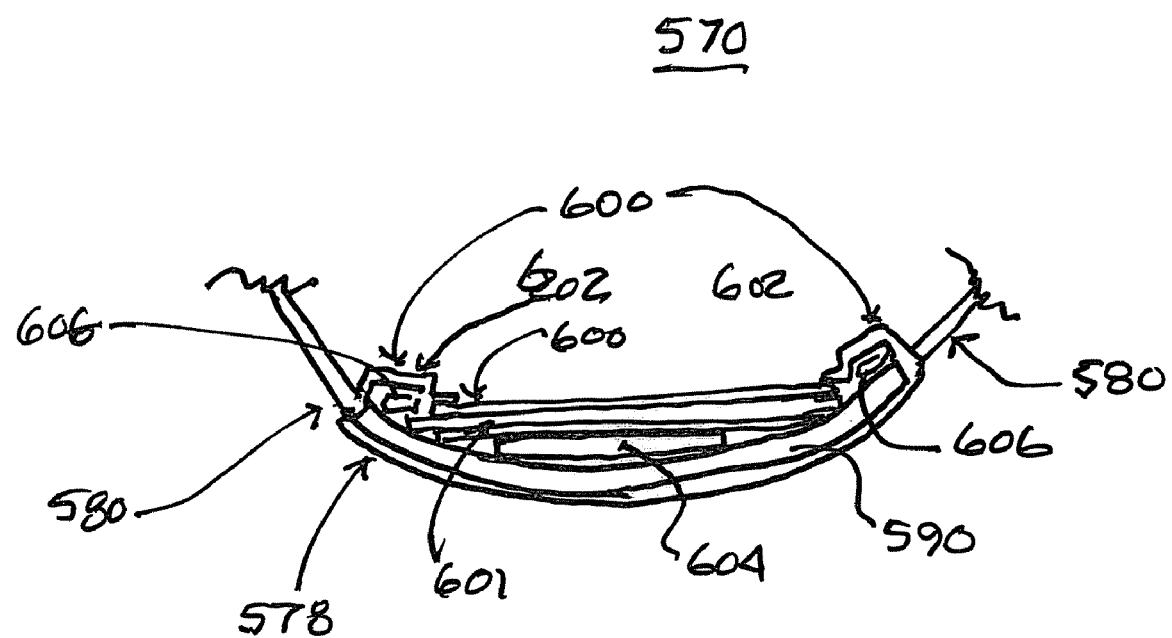
FIG. 24 is a cross-sectional view of a portion of the device of FIGS. 22A and 22B.

The device 570 can incorporate one or more of the additional features described above. For example, as shown in FIG. 24, the base 572 can include an OLED display with touch pad capabilities 600 (in communication with a microcontroller 601) that may or may not wrap about the case 578. FIG. 24 further illustrates locations of speakers 602 and a power source 604 in accordance with some embodiments. Finally, the device 570 can include docking ports 606 that permit convenient mounting of the device 570 to a docking station or stand as described below.

Figure 25A:
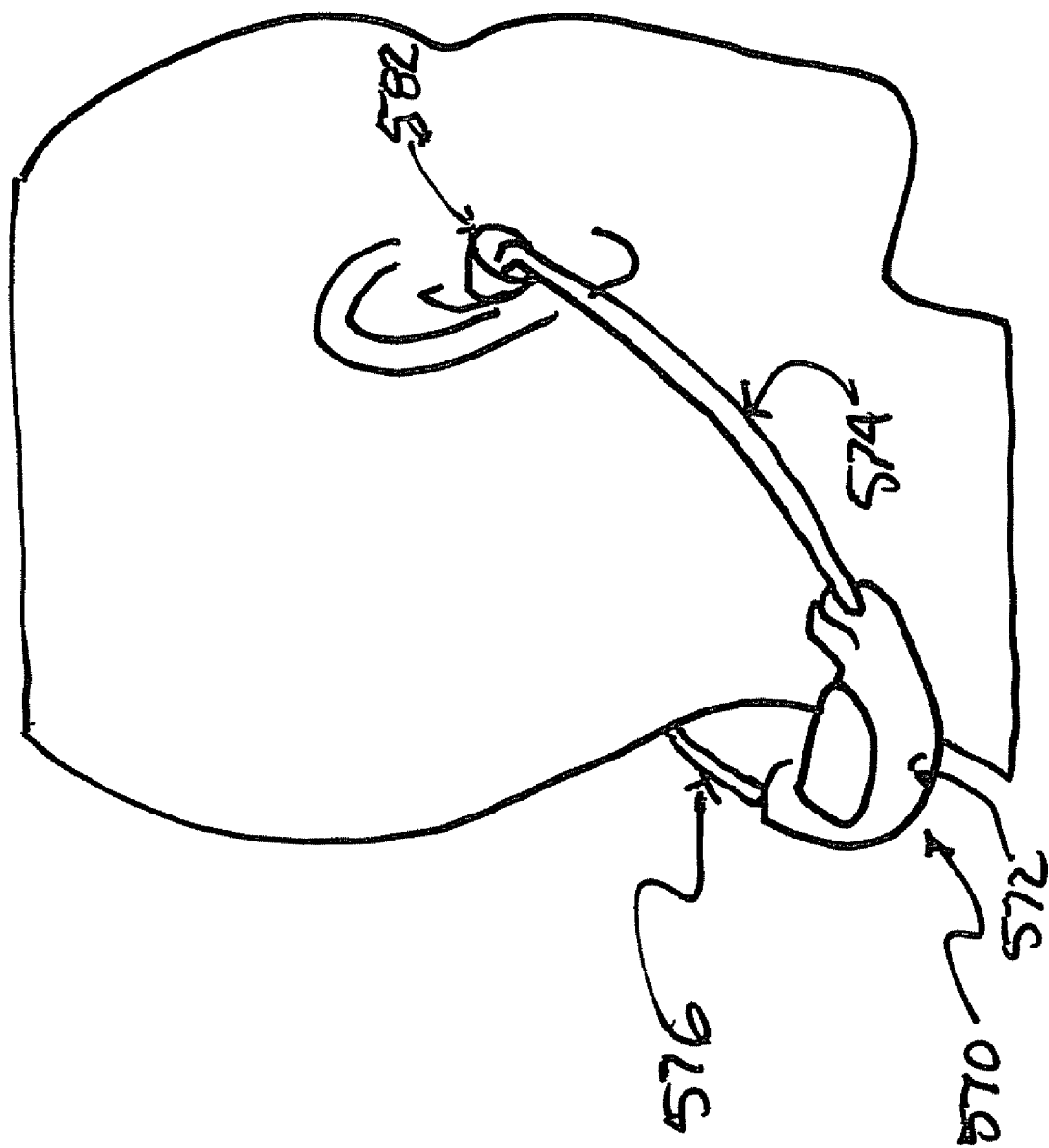

FIG. 25A illustrates the device 570 in the extended state and worn by a user, with the base 572 located behind the user's head/neck. FIG. 25B illustrates an alternative wearable format in which the base 572 is located in front of the user's neck. FIG. 25C illustrates the device 570 in a collapsed, handheld state or format, positioned by a single hand (not shown) of the user such that audio interface piece 582 of the first stem assembly 574 is located near the user's mouth, and the audio interface piece 582 of the second stem assembly 576 is located in or adjacent the user's ear. It will be understood from previous explanations that the first stem assembly 574 carries or is open to one or more microphones such that audio input from the user's mouth is received by the device 570.

Figure 25D:
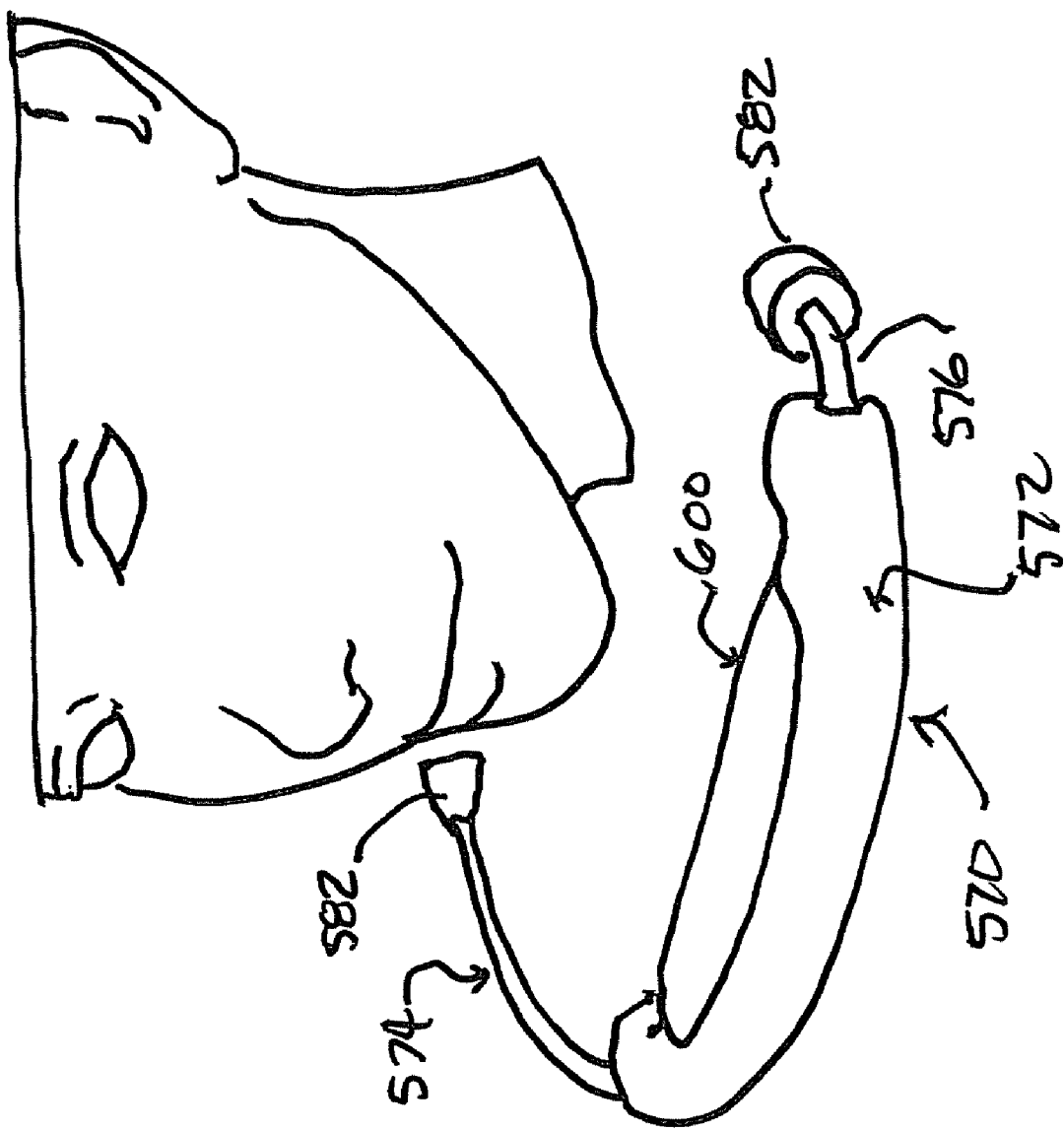

FIG. 25D illustrates the device 570 in a partially collapsed state. In particular, the first stem assembly 574 is in the extended state and the second stem assembly 576 is in the collapsed (e.g., retracted) state. The audio interface piece 582 of the first stem assembly 574 is located near the user's mouth, whereas the base 572 is held in a single hand (not shown) of the user with the display 600 being viewable by the user. With embodiments in which the device 570 is provided with speech recognition capabilities (e.g., programming provided with the microcontroller 601), the device 570 can perform speech recognition operations in the partially collapsed state (e.g., dictation mode) in which spoken words or commands by the user are received at the first stem assembly 574 (via the corresponding audio interface piece 582) in operating the device 570, such that the device 570 performs dictation operations. In this regard, the spoken word(s) or commands can be viewed by the user at the display 600 while speaking into the audio interface piece 582 of the first stem assembly 574. Optionally, the device 510 can be programmed to provide highlighted display(s) to the user as described, for example, as described in U.S. application Ser. No. 11/111,398, filed Apr. 21, 2005 and entitled "Speech Recognition Computing Device Display with Highlighted Text," the teachings of which are incorporated herein by reference. Alternatively or in addition, the device 570 can include one, two, or more microphones at the audio interface piece 582 of each of the stem assemblies 574, 576 to provide linear array noise canceling microphones to improve speech recognition while the display 600 is held in front of the user's face. Further, FIG. 25D reflects that in some embodiments, the audio interface piece 582 of the first stem assembly 574 is inverted (e.g., manually inverted by the user) to better "gather" audio input from the user.

Figure 26:
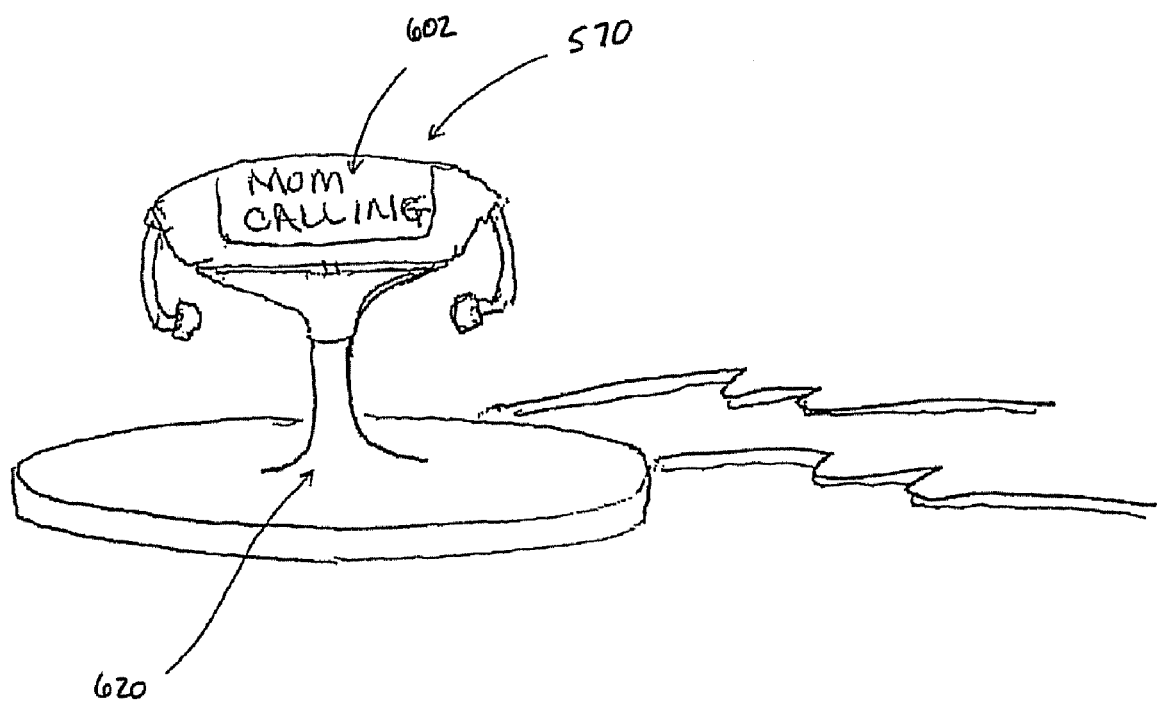
FIG. 26 is a perspective view of the device of FIGS. 22A and 22B mounted to a docking stand in accordance with principles of the present disclosure.

One example of the device 570 mounted to a docking stand 620 as shown in FIG. 26. As illustrated, the stand 620 is configured to arrange the device 570 in the stored state such that the display 600 is readily visible. As a point of reference, any of the other device embodiments described above, can equally be configured for use with a docking system/stand akin to the relationship shown in FIG. 26. Alternatively, the device 570 (or any of the other device embodiments described herein) can be self-standing (e.g., on a table top) with the stem assemblies 574, 576 in the extended state, positioning the display carried by the base 572 for easy viewing. The device 570 is optionally programmed such that when docked in the stand 620, the device 570 will automatically operate as a speaker phone while remaining assembled to the stand 620.

Figure 27:
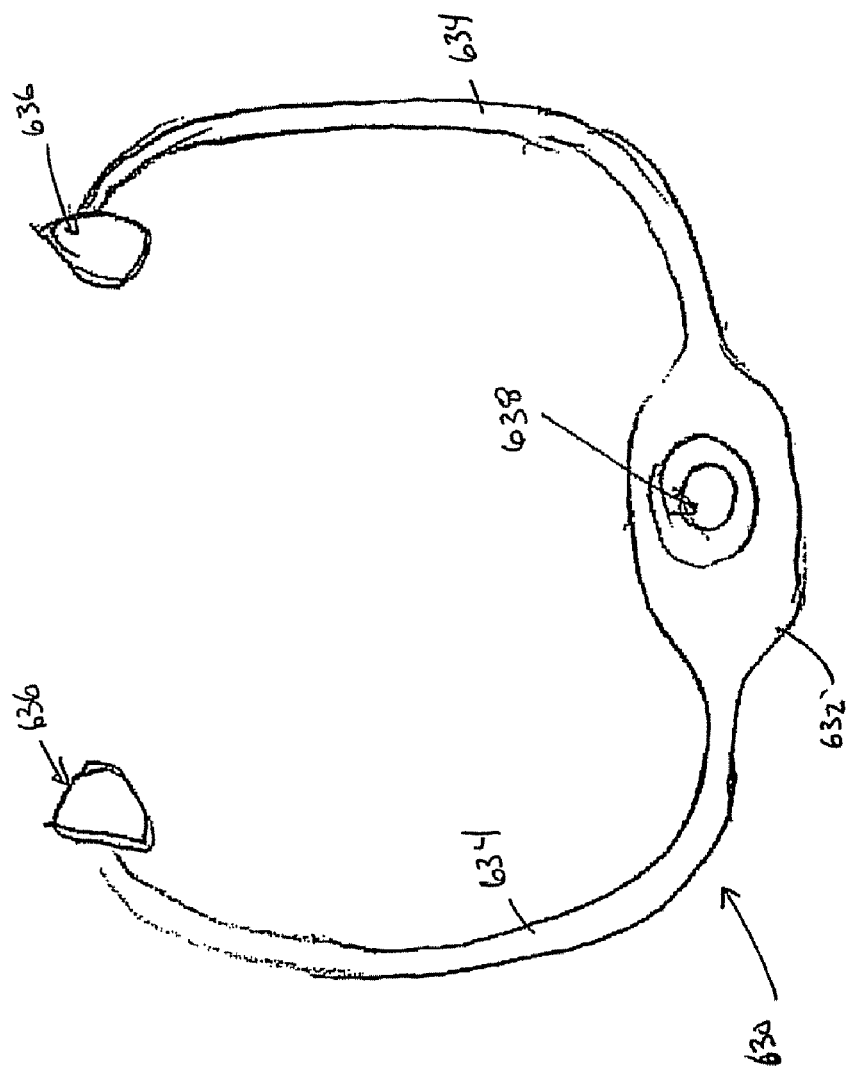
FIG. 27 is a simplified top view of another embodiment audio device in accordance with the present disclosure.

An additional, alternative embodiment mobile audio device 630 in accordance with the present disclosure is shown in FIG. 27. The device 630 can assume any of the constructions described above, and includes a case 632, opposing stem assemblies 634 carrying respective audio interface piece 636, a microcontroller (not shown), and speakers (not shown). In addition, the device 630 includes a conductive speaker 638, and thus can assume any of the forms described in U.S. Provisional Application Ser. No. 60/034,812 filed Mar. 7, 2008 and entitled "Three Speaker Wearable Audio Device," the teachings of which are incorporated by reference. The conductive speaker 638 can be incorporated with any of the devices of the present disclosure.

Figure 28:
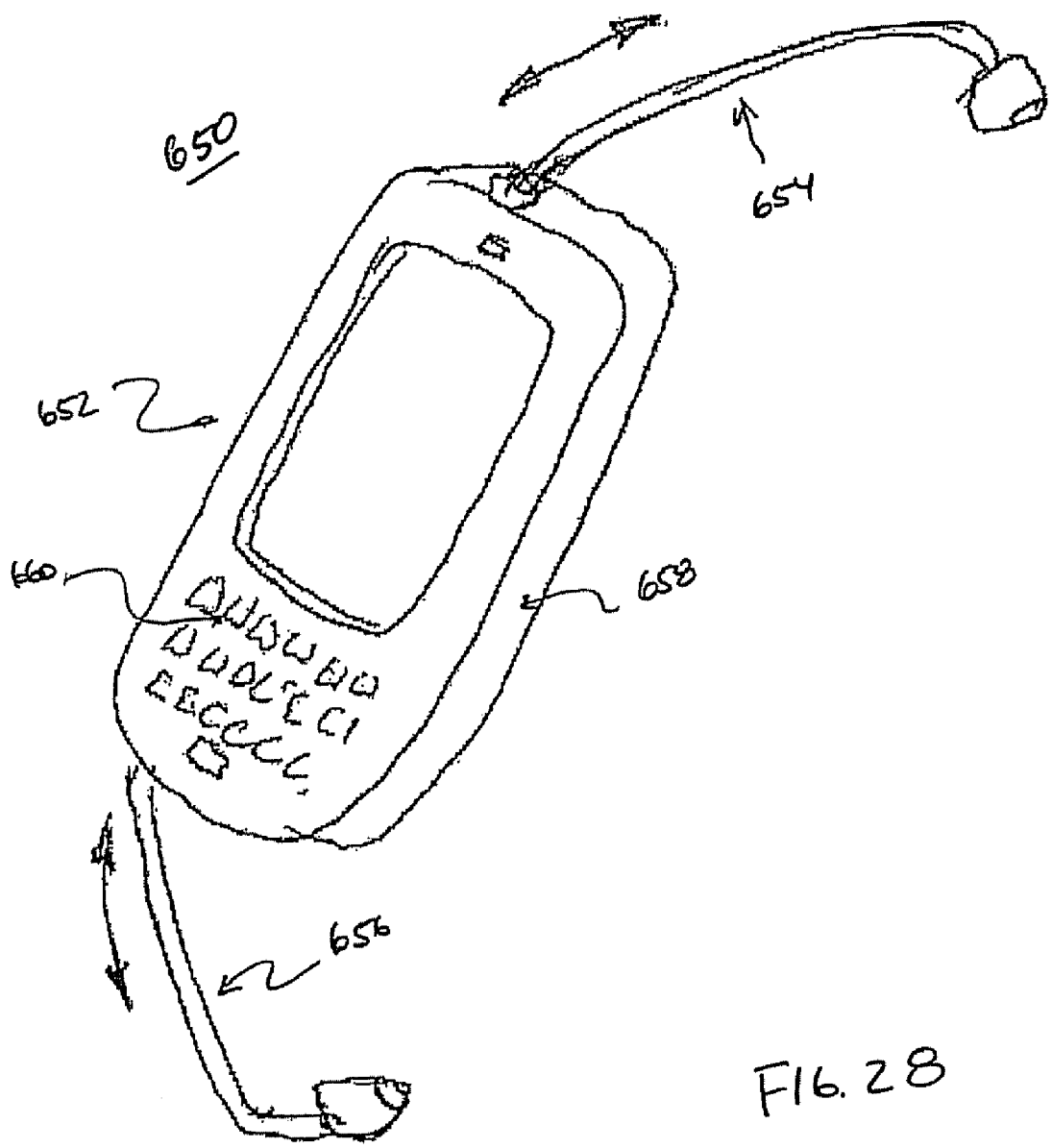
FIG. 28 is a perspective view of an alternative mobile personal audio device in accordance with principles of the present disclosure.

While the personal mobile audio devices have been described above as incorporating various components for providing wireless telephonic interface with a separate cell phone (e.g., Bluetooth technology, antennae, etc.), in other embodiments, the personal mobile audio device in accordance with the present disclosure can operate as a standalone cell phone (in addition to the listen-only mode features described above). For example, FIG. 28 illustrates an embodiment personal mobile audio device 650 including a base 652 and first and second stem assemblies 654, 656. As with previous embodiments, the stem assemblies 654, 656 are movably connected with a case 658 of the base 652, providing both an extended state and a collapsed state. In addition, however, the base 652 includes cell phone components, referenced generally at 660, allowing the device 650 to perform cell phone operations in the communication mode.

Figure 29A:
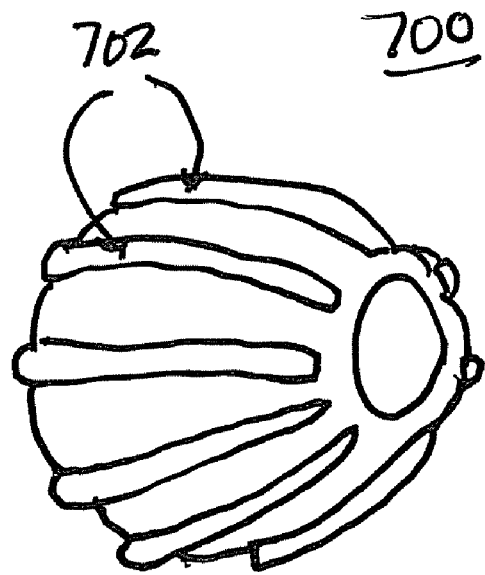
FIGS. 29A and 29B illustrate audio interface pieces useful with the devices of the present disclosure.
Figure 29B:
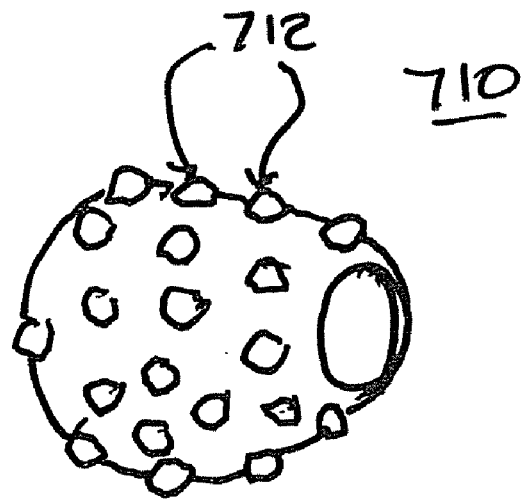

An additional optional feature common to all of the device embodiments described above relates to the format for configuration of the ideal interface (e.g., the audio interface piece 536 shown in FIG. 13A). As indicated above, the audio interface piece useful with the devices of the present disclosure can assume a conventional ear mold-type form in which a series of holes are formed through the molded piece through which sound waves travel. In other embodiments, the audio interface piece can incorporate bumps or ridges to deliver and receive audio outputs and inputs. For example, FIG. 29A illustrates an embodiment audio interface piece 700 incorporating a series of ridges 702. FIG. 29B illustrates another embodiment audio interface piece 710 incorporating a series of bumps 712. The audio interface pieces 700, 710 are akin to ear molds, yet permit ambient audio while in the user's ear. The ridges 702 or bumps 712 function in a manner similar to the holes used with conventional ear molds, permitting a desired mix of ambient audio and device-generated audio, but preventing blocking of ambient audio noise due to excessive surface contact. In other embodiments, one or more holes can be formed in addition to the ridges 702 or bumps 712. Further, and as previously described, the audio interface pieces 700, 710 may be inverted to facilitate gathering of audio.

The mobile personal audio devices of the present disclosure are very small, hide-behind-neck or hide-in front-neck mobile device. In some constructions, the device is configured to be held in place by two molded tubes providing stereo sound from a single case containing speakers, wireless, processing, power supply, optional USB or other docking means, and data storage components. The tubes automatically coil when the device is removed from the head. This makes it easy to pocket. Optionally, it can be designed to automatically turn on/off or awake/sleep when the device is on-head. When the right or first tube is rotated toward the ear/mouth, it automatically switches between music/communication applications. This same tube has a microphone at the end at just beyond the ear mold feature. The tube protects the microphone wire but still permits music to flow through the tube. The ear mold feature acts as a cheek stand to place the microphone in an ideal position. The device remains held on the head in both locations by the tube's molded pressure. The device has intuitive user features, whereby positioning of the tubes automatically directs function and status. The device is comfortable, wearable, partially hidden, and provides a hands-free format. Automatic stereo-to-mono speakers operate based upon a desired application. Ideal microphone positioning is promoted for improved audio interface. The device is durable, protecting the microphone wire and eliminates speaker wires while centralizing all other electrical components. Where desired, the ear molds associated with the device are removable and can be selected based upon a desired end use. For example, depending upon the amount of expected ambient audio variables, the ear molds can have more or less perforations/holes to permit surrounding audio while listening.

Although the present disclosure has been described with reference to preferred embodiments, workers skilled in the art will recognize that changes can be made in form and detail without departing from the spirit and scope of the present invention.

What is claimed is:

1. A mobile personal audio device comprising:
   a case sized for placement along a user's neck;
   a power source maintained within the case;
   a first speaker maintained within the case at a first side thereof;
   a second speaker maintained within the case at an opposite, second side thereof;
   a microcontroller maintained within the case and programmed to perform one or more audio-related operations, the microcontroller being electronically connected to the speakers and the power source; and
   first and second stem assemblies extending from the first and second sides of the case, respectively, each of the stem assemblies including a tube having a first end adjacent and open to a corresponding one of the speakers and terminating at a second end, wherein each of the stem assemblies are configured such that the corresponding tube is positionable in a user-selected extended state in which the corresponding second end is displaced from the case and a collapsed state in which the corresponding second end is in close proximity to the case;
   wherein the device is configured such that in the extended state, the case is locatable at the back of the user's neck, the tubes extend along opposite sides of the user's head for selective placement of the second ends near a respective one of the user's ears, and the microcontroller operates to cause the speakers to generate audio sound waves that are delivered to at least one of the user's ears via the second end thereof.

2. The device of claim 1, wherein the device is configured such that in the collapsed state, the device is removed from the user's head and the stem assemblies operate to self-transition the tubes along the case.

3. The device of claim 1, wherein the stem assemblies are configured such that in the extended state and the device is worn by a user, the stem assemblies self-tension the corresponding tube against a user's head.

4. The device of claim 1, wherein the device is configured such that in the extended state a distance between the respective second ends correlates with a human form factor of ear-to-ear, and in the collapsed state, the distance correlates with a human form factor of ear-to-mouth.

5. The device of claim 1, wherein each of the tubes are flexible and have an imparted shape memory attribute.

6. The device of claim 5, wherein the first tube includes a first segment extending from the first end and a second segment extending from the second end, the imparted shape memory attribute including a bend along the first segment.

7. The device of claim 6, wherein the bend generates a tension in the first tube when transitioned from the collapsed state to the extended state such that when worn by a user in the extended state, the tension forces the second segment toward the user's head.

8. The device of claim 1, wherein each of the stem assemblies further includes:
a coupling device movably connecting the first end of the corresponding tube to the case.

9. The device of claim 8, wherein the coupling device pivotably connects the corresponding tube to the case.

10. The device of claim 8, wherein the coupling device is configured to permit selective insertion of the corresponding tube within the case.

11. The device of claim 10, wherein the coupling device slidably connects the corresponding tubes to the case.

12. The device of claim 1, further comprising:
a sensor system electronically connected to the microcontroller and configured to detect arrangement of the device in at least one of the extended and the collapsed states.

13. The device of claim 12, wherein the microcontroller is programmed to perform a powering down operation in response to a signal from the sensor system indicative of the device transitioning from the extended state to the collapsed state.

14. The device of claim 12, wherein the microcontroller is programmed to change a mode of operation in response to a signal from the sensor system.

15. The device of claim 12, wherein the sensor system is configured to indicate positioning of the tubes in the extended state, and further wherein the microcontroller is programmed to automatically operate in the listen-only mode in response to a signal from the sensor system indicative of the tubes being transitioned to the extended state.

16. The device of claim 12, wherein the sensor system is configured to indicate positioning of the tubes in the collapsed state, and further wherein the microcontroller is programmed to automatically operate in a communication mode in response to a signal from the sensor system indicative of the tubes being transitioned to the collapsed state.

17. The device of claim 1, further comprising:
a microphone associated with the tube of the first stem assembly and electronically connected to the microcontroller.

18. The device of claim 17, wherein the microcontroller is programmed to operate in listen-only mode in which audio output is generated by the first and second speakers, and a communication mode in which audio input from a user is received at the microphone and processed by the microprocessor in performing a communication operation.

19. The device of claim 18, wherein the microphone is maintained in the case.

20. The device of claim 18, wherein the microcontroller is programmed to operate as a wireless telephone interface in the communication mode.

21. The device of claim 17, wherein the microcontroller is programmed to perform speech recognition operations.

22. The device of claim 21, further comprising a display screen carried by the case, and further wherein the microcontroller is programmed to perform a user dictation operation in displaying spoken words on the display screen.

23. The device of claim 1, wherein a size and shape of each of the case and the tubes are based upon form factors of an adult human head and neck.

24. The device of claim 1, further comprising:
at least one of a Bluetooth connector, a USB port, an antenna, and a flash memory maintained by the case.

25. The device of claim 1, further comprising an MP3 player jack coupled to the case and electronically connected to the microcontroller.

26. The device of claim 1, further comprising:
a user interface maintained by the case and electronically connected to the microcontroller.

27. The device of claim 26, wherein the user interface includes at least one of a linear touchpad and a display screen.

28. The device of claim 26, wherein the user interface is a display screen, and further wherein the microcontroller is programmed to prompt a scrolling display on the display screen based upon a point of elevation sensor.

29. The device of claim 1, further comprising cell phone components maintained by the case such that the device is operable as a cell phone.

30. The device of claim 1, further comprising:
an LED device carried by the case and positioned to illuminate the tube of the first stem assembly.

31. The device of claim 1, further comprising:
an audio interface piece carried at the second end of the tube of the first stem assembly, the audio interface piece configured to be manually invertable.

32. The device of claim 1, further comprising:
an audio interface piece carried at the second end of the tube of the first stem assembly and configured for insertion in a user's ear, wherein an exterior surface of the audio interface piece forms at least one of bumps and ridges.

* * * * *